(12) United States Patent
Hook et al.

(10) Patent No.: US 8,842,841 B2
(45) Date of Patent: Sep. 23, 2014

(54) CRYPTOGRAPHIC METHOD AND SYSTEM

(71) Applicant: Lock Box Pty Ltd, South Yarra (AU)

(72) Inventors: David Geoffrey Hook, Ascot Vale (AU); Richard Hans Harvey, Ringwood East (AU); Peter Kai Dettman, Morphettville (AU)

(73) Assignee: Lock Box Pty Ltd, South Yara (AU)

( * ) Notice: Subject to any disclaimer, the term of this patent is extended or adjusted under 35 U.S.C. 154(b) by 0 days.

(21) Appl. No.: 13/969,071

(22) Filed: Aug. 16, 2013

(65) Prior Publication Data

US 2014/0164776 A1    Jun. 12, 2014

Related U.S. Application Data

(63) Continuation of application No. PCT/AU2013/000145, filed on Feb. 19, 2013.

(30) Foreign Application Priority Data

Feb. 20, 2012    (AU) ................................ 2012900626

(51) Int. Cl.
*H04L 9/08*    (2006.01)
*H04L 9/32*    (2006.01)

(52) U.S. Cl.
CPC ............ *H04L 9/0822* (2013.01); *H04L 9/3263* (2013.01); *H04L 9/3247* (2013.01)
USPC ........... 380/284; 380/277; 380/278; 380/283; 713/171

(58) Field of Classification Search
CPC .......... H04L 9/08; H04L 9/0822; G06F 21/10
USPC ................... 380/284, 277, 278, 283; 713/171
See application file for complete search history.

(56) References Cited

U.S. PATENT DOCUMENTS

| | | | |
|---|---|---|---|
| 7,320,076 B2 | 1/2008 | Caronni | |
| 7,395,436 B1 * | 7/2008 | Nemovicher | 713/193 |
| 7,792,300 B1 | 9/2010 | Caronni | |
| 2004/0034776 A1 * | 2/2004 | Fernando et al. | 713/171 |
| 2004/0175000 A1 | 9/2004 | Caronni | |
| 2005/0154890 A1 * | 7/2005 | Vembu | 713/171 |
| 2005/0251491 A1 * | 11/2005 | Medina et al. | 705/71 |
| 2007/0011301 A1 * | 1/2007 | Ong et al. | 709/224 |
| 2010/0017606 A1 | 1/2010 | Bradley et al. | |
| 2010/0299522 A1 * | 11/2010 | Khambete | 713/168 |
| 2011/0106909 A1 | 5/2011 | Gladwin | |
| 2011/0126006 A1 | 5/2011 | Dowdy et al. | |
| 2013/0101121 A1 * | 4/2013 | Nordholt et al. | 380/279 |
| 2013/0318347 A1 * | 11/2013 | Moffat | 713/168 |

FOREIGN PATENT DOCUMENTS

| | | |
|---|---|---|
| WO | 03/014899 A1 | 2/2003 |
| WO | 2009/086669 A1 | 7/2009 |
| WO | 2011/109865 A1 | 9/2011 |

* cited by examiner

*Primary Examiner* — Saleh Najjar
*Assistant Examiner* — Peiliang Pan
(74) *Attorney, Agent, or Firm* — Sughrue Mion, PLLC

(57) ABSTRACT

The present invention relates to the field of security of electronic data and/or communications. In one form, the invention relates to data security and/or privacy in a distributed and/or decentralised network environment. In another form, the invention relates to enabling private collaboration and/or information sharing between users, agents and/or applications. Embodiment(s) of the present invention enable the sharing of key(s) and/or content between a first user and/or agent and a second user and/or agent. Furthermore, embodiment(s) of the present invention have application in sharing encrypted information via information sharing services.
A number of inventions, aspects and embodiments are disclosed herein.

25 Claims, 5 Drawing Sheets

CRYPTOGRAPHIC METHOD AND SYSTEM

CROSS REFERENCE TO RELATED APPLICATIONS

This application is a Bypass Continuation of PCT/JP2013/000145, filed on Feb. 19, 2013, which claims priority from Australian Patent Application No. 2012900626, filed on Feb. 20, 2012, the contents of all of which are incorporated herein by reference in their entirety.

FIELD OF INVENTION

The present invention relates to the field of security of electronic data and/or communications.

In one form, the invention relates to data security and/or privacy in a distributed and/or decentralised network environment.

In another form, the invention relates to enabling private collaboration and/or information sharing between users, agents and/or applications.

In one particular aspect, embodiment(s) of the present invention enable the sharing of key(s) and or content between a first user and/or agent and a second user and/or agent. Furthermore, embodiment(s) of the present invention have application in sharing encrypted information via information sharing services.

It will be convenient to hereinafter describe the invention in relation to the sharing of data and/or communications between a first user and/or agent and a second user and/or agent however, it should be appreciated that the present invention is not limited to that use only.

BACKGROUND ART

Throughout this specification the use of the word "inventor" in singular form may be taken as reference to one (singular) inventor or more than one (plural) inventor of the present invention.

The inventors have identified a number of limitations with using third party "cloud" service or storage providers for sharing information, especially if user information is confidential, sensitive or private. These limitations include security, privacy and control. In particular, the reliance on a trusted third party(s) (TTP) and/or passwords.

"Cloud" providers include Software-as-a-Service (SaaS) providers, Platform-as-a-Service (PaaS) providers, Infrastructure-as-a-Service (IaaS) providers and any other providers that offer information sharing services such as customer management services, storage services, messaging services, file sharing services, electronic data vaults, virtual data rooms, collaboration tools, screen sharing tools, content management systems, social websites, social networks, instant messaging, group-chat, forums, network management, content syndication, gaming, remote systems control and monitoring, geo-location, Voice over IP (VoIP), telephony, video conferencing, identity services and/or any other information sharing middleware or "cloud" based applications.

Problems with trusted third parties mostly arise because of the way they centralise their services in order to achieve business goals such as efficiency, supportability, account control, market adoption etc. These problems, which may include inadequate security, nominal privacy and/or lack of control by the end-users, are evidenced by the ongoing and increasing number of hacks, data breaches, audit failures and criticisms in formal security reviews. The broad reasons why third-party providers find it difficult to "lock-down" server-side infrastructure and operations include:

Controls—Server-side security relies on "controls" to prevent mishaps, breaches and/or abuse in the delivery of services. However, controls are considered rarely adequate because of the complexities of too many people (staff, administrators, contractors, help desk personal etc.) having too many privileges (running, maintaining, administering, supporting etc.) across too many systems (including technologies, platforms, versions, topologies, business units, organisations etc.) with enforcement mostly by voluntary procedures (e.g. operations, development, testing, incident handling, patching, configuration, recovery, auditing). Controls are considered to cost money and effort, often with little perceived business benefit, and so are rarely broad, strong or given priority. Even if they are in place, they cannot guarantee against mistakes, malicious behaviour or being deliberately bypassed (or disabled) if they get in the way of "business imperatives".

Change—Compounding these challenges is ongoing changes within any organisation. There are changes in technology (new systems, new platforms, new functionality and endless upgrades and patches etc.), changes in business operations (as a result of new markets, new partners, new opportunities/threats and acquisitions/divestments), and changes in staff (including their roles, responsibilities and priorities whenever there are re-organisations, new hires, resignations or promotions etc.). All this is considered bad for security. Even worse, security budgets may be limited, and so security analysis, measurement and remediation may be patchy, inadequate, take long periods to implement or be seen as too expensive to pursue.

Verification—Even if controls are in place, the server-side nature of the service is considered to make it nearly impossible for end-users to validate the effectiveness of the controls or even to know if any breach has occurred. In effect, these controls are "voluntary" and end-users have no choice but to completely "trust" the security and privacy of their information to their service provider. Even if a user suspects a breach or other unauthorised activity, the service provider may not willingly, or have the capacity, to provide logs or forensic data about the activities in question.

Internal Threats—Even if controls are adequate and could be properly verified, this may not remove the risk of internal threats, as administrators may always have the means to view user information and/or override any controls that users put on their information. For example, administrators may have the means to access user data and/or be able to manipulate security data such as alter information about users, impersonate users, set controls, change rights, alter groups, change memberships, view log files, access keys, reset passwords, utilised network inspection devices etc. They may even have means to avoid controls/detection and/or cover-up inappropriate activity.

Provider Misuse—Even if administrators can be controlled, user data may still be abused at the business level, such as when information is used by the service provider for its own commercial purposes. For example, the service provider, or associated partners, may sell, track, archive, backup, aggregate, resell, correlate, target and/or otherwise take advantage of end-user information. The lack of privacy (that end-users have with their own data) is evidenced by service provider Terms of Service which may claim a right to use or access user data for any purpose that the service provider deems necessary to run their service.

Outsourcing—The above problems of controls, change, verification, internal threats and provider misuse may be further aggravated by outsourcing, as problems may compound with each outsourced organisation involved in the delivery of a service.

Even if the above TTP/centralisation risks could be minimised, most service providers rely on passwords for authenticating user access. Problems with passwords include poor security (e.g. password guessing, password stealing etc), ongoing maintenance (e.g. registration, provisioning, de-provisioning, password reminders, password reset etc.) and poor practices by end users (passwords are often forgotten, of poor quality, re-used etc.). Passwords may be considered weak and subject to attacks including guessing, "brute force" attacks and/or "phishing" attacks. In particular, it is considered very poor practice to share passwords as they cannot effectively be controlled or changed in the case that there is a change in the set of users needing to know the password. Thus, sharing of passwords should be avoided in any system that facilitates sharing of information.

Further, there are many problems associated with recovering from lost or forgotten passwords. These problems may include administrative overheads, security risks and/or loss of user's data. In password based systems, recovery relies on supplying or resetting the server-side password using either an automatic procedure, such as following a password reset via an email link, or a manual procedure, such as an administrator issuing a new password. Automatic password reset procedures, especially those that rely on just an email address, are considered to have poor security as they perform minimal validation, for example they are relatively susceptible to an attacker using a compromised account. Manual password reset procedures are considered to have poor security as they are relatively susceptible to weaknesses with administrators, such as using social engineering techniques to trick administrators, accidental mistakes by administrators or malicious activity by rogue administrators.

As a result of the above risks, third-party service providers, especially "cloud" storage providers, are rarely considered to be able to meet the requirements of strong security and privacy. This is further evidenced by their standard service agreements which generally absolve the service provider from any liability, obligation or responsibility for anything that might go wrong e.g. misuse, leaks, loss, damage, disclosure, data breaches etc. Similarly their privacy policies may come down to "best efforts" and/or may be non-binding.

FIG. 1a illustrates a typical prior art system. Users authenticate themselves to a Provider using a password and sharing of Data relies on the Provider enforcing access controls appropriately on the Data. Such systems are not considered to have strong security or privacy as they use passwords (with consequential risks as described above) and/or rely on the Provider as a TTP (with consequential risks as described above) and/or use password reset for recovering credentials (with consequential risks as described above).

Overall, most prior art approaches to security management tend to try to protect every aspect of the infrastructure where data may reside e.g. networks, servers, routers, hosts etc. This may be increasingly difficult as the world becomes more interconnected, as new technologies emerge, as complexity of systems increase, as attackers get more sophisticated, etc. Further, security tends to be centrally managed, because of the necessity to manage every aspect of security e.g. patch management, configuration management, entitlements management, role management, privilege management, authentication management etc. Centralisation may lead to other problems, such as the reliance on trusted administrators and/or trusted third parties which becomes even more difficult as the number of involved organisations increases.

An alternative approach is to protect the data using encryption. Encryption effectively "locks up" data in a tamperproof package protecting it where ever it is. The security of encrypted data thus needs to have less reliance on the security of the infrastructure it transits and/or is stored. In practice, user-to-user encryption also requires the management of keys, trust and other aspects. However, the current prior art is considered to be piece meal in that only particular aspects of the encryption problem have been solved, and not an integrated approach.

FIG. 1b illustrates a typical prior art system commonly used for personal or backup reasons. In the client application, Password Based Encryption (PBE) makes use of a password to encrypt user data locally e.g. by directly using the password or using a key derived from the password. The encrypted Data is then stored by the Provider and the encryption safeguards the Data from abuse or failures by the Provider. However, when such systems are used for sharing, they are not considered to have strong security or privacy as they require the sharing of passwords (with consequential risks as described above).

FIG. 1c illustrates a typical prior art system that allows users to encrypt and decrypt information with the assistance of a Key Server. Centralisation of keys is often used to overcome difficulties with key management including key generation, storage, duplication, distribution, access, protection, rollover, rotation, recovery, removal, and revocation. However, this centralisation requires that a TTP maintains the Key Server (with consequential risks of having effective controls as described above). In particular, Key Servers inherently have very concentrated control (possession of many keys) which may make them a target for attack. Further, the TTP controlling the Key Server may not necessarily be trusted in wider environments, for example, with diverse and/or large numbers of users and/or multiple collaborating organisations, especially over the wider internet. Also, many Key Servers only require password related authentication (with consequential risks as described above).

FIG. 1d shows an example of prior art systems that make use of public key cryptography (PKC) to enable users to share data encryption keys. Web of Trust (WoT) system may make use of endorsers to support trust in public keys. Public Key Infrastructure may make use of one or more trusted organisations to have reliable and secure processes to support trust in certificates containing public keys. However, such systems rely on a trusted third party(s) to facilitate the issuance and/or endorsement and/or distribution of public keys and/or certificates. This may give rise to a number of problems, for example:

PKI and WoT systems may have limitations in their trust models. In the case of PKI a Certification Authority (CA) issues certificates containing public keys and users have no choice but must trust the practices and procedures of the organisation running the CA, in particular the proof-of-identity that was used to issue a user their (public key) certificate. In the case of WoT, users must trust other users who endorse/notarise/counter-sign self-signed public keys.

PKI and WoT systems may have issues with security. Security issues with PKI relate to its dependence on a centralised TTP (risks described above). Security problems with WoT relate to the unreliable nature of "crowd sourced" trust as well as the difficulty of revoking public keys that have been compromised. Additionally, though WoT model allows anyone to issue certificates, the discovery and distribution generally relies on centralized keyservers or certificate repositories or public directories to store certificates and respond to queries and which introduces the problem that these keyservers/repositories/directories need to be run by a TTP (with consequential risks as described above).

PKI and WoT systems may have issues with privacy. Privacy issues in PKI relate to personal data divulged to the PKI Service during certificate issuance and/or as a result of certificates being publically available, such as in a directory and/or public website. Privacy issues relating to WoT relate to the visibility of counter signed signatures, especially if made visible in a directory and/or public website, which can reveal entire social networks about the owner.

PKI and WoT systems may have issues with cost, complexity and/or adoption. In the case of PKIs, adoption may be limited because of regional and/or organisational restrictions that CA's have to verify identity. In the case of WoT, adoption may be restricted because of limitations in the technology and/or the very technical and manual nature of communities having to build up their trust relationships.

Systems built using PKI or WoT may heavily rely on the continuity of credentials. For example, if credentials are lost and/or revoked, then keys being protected by those credentials may be lost, which may result in the loss or compromise of encrypted data.

In summary, prior art encryption approaches may have many limitations. For example, the management of trust, credentials, certificates, keys etc. Password Based Encryption (PBE) approaches are considered to have numerous problems relating to managing passwords. Keyserver approaches are considered to have numerous problems relating to the difficulty of securing and managing all the keys in a single or relatively small number of places. Public/private key approaches are considered to have numerous problems relating to trusting a central server to reliably obtain a trusted public key(s) or certificate(s).

Thus, overall, in the field of security management, there is an ongoing need to protect electronic data, particularly data being transferred and/or shared between users. Such users, who may be anywhere over the wider internet, would like to get improved security and privacy from service providers, especially when transferring and/or sharing information that may be sensitive or confidential. In particular, end-users would like to use "cloud" services and other communications solutions, but in a way that is protected from and/or relatively independent from those third party providers themselves.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

SUMMARY OF INVENTION

It is an object of the embodiments described herein to provide improved private and/or secure communications between users and/or applications in a distributed and/or decentralised network environment.

It is a further object of the embodiments described herein to overcome or alleviate at least one of the above noted drawbacks of related art systems or to at least provide a useful alternative to related art systems.

In a first aspect of embodiments described herein, there is provided a method of, apparatus and/or application adapted to enable the provision of keys between a first user and a second user for enabling data security, comprising providing a first key adapted for enabling encryption of data, encrypting a first further key and enabling access to the encrypted first further key by the second user and providing to at least the second user, the first key encrypted with the first further key and in a manner independent of the data.

In a preferred embodiment, there is provided:
  a credential layer adapted to establish the existence of certificate-based credentials for each user; and/or
  a trust layer adapted to enable communication via the data store of the encrypted data between the users and/or to enable the exchange of encrypted certificates; and/or
  a control layer adapted to manage symmetric keys and other system information protected by encryption; and/or
  a sharing layer adapted to encrypt content or other end user information.

In essence, the first aspect is predicated on the realisation that, unlike prior art systems which tend to have relatively centralised administration where keys are distributed and controlled by a trusted third party or security and privacy is achieved by a secured communication system (including secured intermediaries), the inventors have found that security and privacy can be achieved in a more decentralised system including relatively untrusted environment(s) by empowering users to provide keys and control the access to data and keys themselves by the use of encryption applied to the data as well as the keys. Because data and keys are encrypted, the environment, through which users exchange data or keys, is not dependent on the security and privacy of intermediate systems and thus are workable in a decentralised manner. Keys and data may be independent of each other. Furthermore, security and privacy are enhanced by providing a layered architecture. Security and privacy are even further enhanced by providing layers which are not necessarily dependent on each other. For example, the present invention may reflect any one or any combination of layers of credential management, trust management, key management and content management. Still furthermore, unlike prior art systems which utilise third party certification of credentials, embodiments of the present invention establish trust between users directly by virtue of mutual exchange of certificates. In other words, rather than relying on the veracity of the public key as in prior art systems, embodiments of the present invention utilise user-to-user verification. Thus, the trust is not bound to the public key, but to the user-to-user interaction. Still furthermore, in accordance with embodiments of the present invention, if a public key or certificate is transferred in the user-to-user exchange, the public key or the certificate may be kept private between the users.

In a second aspect of embodiments described herein, there is provided a method of, apparatus and/or application adapted to enable user access to another application or system or service, the access being provided by at least one credential, comprising, in conjunction with at least one credential stored in an encrypted form and in a manner accessible by the user, facilitating a user access request, and providing a response which facilitates decryption of the stored credential corresponding to the response.

Further aspects of embodiments of the present invention are also described within the specification. Some of the further aspects are disclosed hereinafter.

In one further aspect of embodiments described herein, there is provided a method of, apparatus and/or application adapted to enable at least two agents to access encrypted data in a distributed network environment, wherein the distributed network comprises at least a first data store and a second data store, comprising: using a first key to encrypt first data in the first data store; enabling a first agent to access the first data store via a first key; providing the first key to a second agent; replicating the first encrypted data in the second data store; and enabling the second agent to access the replicated first data in the second data store via the first key.

In essence, this further aspect is predicated on the realisation that agents in a distributed network may access encrypted data by replicating the encrypted data to end-system data stores. In this case, information remains encrypted at-rest, particularly on end-systems, protected by appropriate keys and only decrypted as required. A number of advantages are disclosed in Sections 2.2.5, 3.2.3, 4.6.1, 4.8, 5.1.2 and 5.4 of the following description.

In a second further aspect of embodiments described herein there is provided a method of, apparatus and/or application adapted to provide at least one certificate in a distributed network environment, wherein the distributed network comprises at least a first certificate store and a second certificate store, in which a first agent is enabled to access the first certificate store; the first agent distributing the certificate(s) to a second agent and enabling the second agent to store the certificate(s) in the second certificate store.

In essence, this second further aspect is predicated on the realisation that agents may automatically distribute, update and/or remove certificates in end-system certificate stores in order to enable certificate-based applications. This may occur independent of any centralised authority. A number of advantages are disclosed in Sections 2.2.2, 2.2.4, 3.3 and 5.1 of the following description.

In a third further aspect of embodiments described herein there is provided a method of, apparatus and/or application adapted to provide at least one symmetric key between at least two agents in a computer network, the first key being used to enable access to encrypted information in a data store, comprising enabling a first agent to obtain a first key; the first agent enables the second agent to obtain the first key; the second agent using the first key to access the encrypted information; and the first agent managing the lifecycle of the keys used to enabled access to the encrypted information.

In essence, this third further aspect is predicated on the realisation that each data owner may effectively be a key publisher and/or key authority. Since embodiments of the present invention provide a virtual peer-based system over arbitrary storage systems, keys may be distributed by data owners without the need for centralised key-servers and/or administrators. A number of advantages are disclosed in Sections 3.3.8, 4.4, 4.6.2 and 5.2 of the following description.

In a fourth further aspect of embodiments described herein there is provided a computer network architecture and/or method comprising at least a first agent and a second agent interlinked by a separate data store to enable the exchange of encrypted first data between the first agent and the second agent, the first agent using the data store to pass encrypted control information to the second agent, the first and second agent thereafter exchanging the encrypted first data.

In a fifth further aspect of embodiments described herein there is provided a method of, apparatus and/or application adapted to encrypt information for sharing between a first agent and a second agent, in a system using asymmetric cryptography and via a data store, comprising the first agent generating a first key; the first agent encrypting the first key with a public key of the second agent; the first agent providing the encrypted first key to the data store, the encrypted first key being retrievable by the second agent; the first agent encrypting the information with the assistance of the first key; and the encrypted information being provided to the data store.

In a sixth further aspect of embodiments described herein there is provided a method of, apparatus and/or application adapted to facilitate communication between user(s) using a data storage service, the data storage service storing system information related to enabling the communication, comprising providing end-to-end encryption in respect of system information.

In essence, these further aspects are predicated on the realisation that agents may use protocols to decentralise management and may use end-to-end encryption to protect system data using substantially the same mechanisms normally used to manage and protect end-user data. For example, the techniques used for the end-to-end sharing of user content may be applied to the end-to-end transfer of management messages and/or security information such as keys, certificates and/or capabilities. A number of advantages are disclosed in Sections 2.3, 2.5.2, 3.1, 3.2, 3.3, 3.4, 3.5.4, 3.5.5, 4.2, 4.3, 4.4, 4.6, 5.1 and 5.2 of the following description.

In a seventh further aspect of embodiments described herein there is provided a method of and/or communication system apparatus adapted to use asymmetric cryptography enabling communication of encrypted data between at least two users via a data store, comprising a first layer adapted to establish the existence of certificate-based credentials for each user; and a second layer adapted to enable communication via the data store of the encrypted data between the users and to enable the exchange of encrypted certificates.

In essence, this seventh further aspect is predicated on the realisation that the establishment of certificate-based credentials may be managed by a credentials layer which may enable another layer related to the exchange of encrypted information and this information may include certificates. Other layers may also be provided as herein disclosed. A number of advantages are disclosed in Sections 2, 4.2, 4.5 and 4.7.4 of the following description.

In an eighth further aspect of embodiments described herein there is provided a method of, apparatus and/or application adapted to manage encrypted information in a data store by an intended user, comprising providing the intended user with a key, providing the intended user with cryptographic authorisation and the authorisation being necessary to communicate with the data store.

In essence, this eighth further aspect is predicated on the realisation that a data store may granted based on a cryptographic authorisation such as an attribute certificate, rather than checking that the requesting user is a user in an authorisation list. A number of advantages are disclosed in Sections 2.5.2, 2.6.1, 3.3.14, 3.3.15, 3.3.16, 3.5.6, 4.4.4, 4.5.2 and 4.6.1 of the following description.

In a ninth further aspect of embodiments described herein there is provided a method of, apparatus and/or application adapted to provide introduction message(s) between two users for establishing secure communications between the two users; comprising a first user obtaining a first certificate for incorporation into the introduction message; encrypting at least a portion of the introduction message with an access code; storing the encrypted introduction message; communicating the access code to a second user; using the access code, and the second user decrypting the portion of the encrypted introduction message in order to enable communication with the first user.

In essence, this ninth further aspect is predicated on the realisation that in establishing bilateral relationships which may include the encrypted exchange of certificates and the initiation of this exchange may make use of an out-of-band means between a first user and a second user which may also include a verification process. The certificates may be private certificates and/or unrelated certificates. This verification process may enable a vetting process for example to establish proof of identity. A number of advantages are disclosed in Sections 3.4, 4.1.2, 4.2.2, 4.5.1 and 4.6.1 of the following description.

In a tenth aspect of embodiments described herein, there is provided a method of, apparatus and/or application adapted to enable the sharing of storage data between a first user and a second user, comprising, in a data store, providing first storage data, stored in at least two separate parts, the at least two parts both being individually encrypted, one part including a key adapted for enabling the encryption of the second part, and the at least two parts being accessible by the first and the second users via the data store.

In essence, this tenth further aspect is predicated on the realisation that encrypted data can be separated into parts and then shared between users using any combination of intermediate data stores.

In still more further aspects of embodiments described herein there is provided, in combination, a system as herein disclosed and a storage system, security system, content management system, a messaging system, an electronic mail system, a file sharing system, a systems management system and/or a collaboration system.

In an embodiment of the present invention, relatively autonomous co-operating peer-oriented agents (the components) may securely and/or privately exchange and/or transfer data (the requirement) using asymmetric and/or end-to-end cryptography (the enablers) to provide collaboration and/or privacy-enabling capabilities (the functions) with strong security, privacy, control and/or decentralised management (the benefits) over minimal-trust and/or relatively "blind" and/or third-party storage and/or transport and/or certificate services (the environment).

In another embodiment of the present invention, agents (which may be relatively autonomous and/or self-managing and/or distributed) may use encryption, keys and protocols to enforce, control and/or manage security and/or privacy (e.g. identity, access, authorisation, membership, confidentiality, integrity, representation, credentials etc.) supported by optional facilitating system services (e.g. certificate signing, revocation, credential backup, enrolment, storage, notifications etc).

In yet another embodiment of the present invention, agents enable end users and/or applications to leverage strong client-side cryptography for strong security, privacy and control of data, in a way that is easy to use for those users and/or applications. This may encompass transparent handling and recovery of certificate-based credentials, decentralised management and advanced cryptographic capabilities e.g. rotating keys, digital signatures, client-side key management, revocation etc.

Other aspects and preferred forms are disclosed in the specification and/or defined in the appended claims, forming a part of the description of the invention.

Overall, the present invention(s) enables many advantages and features compared to prior art in many ways, for example, without limitation:

Administration—requirements may be minimal as management and/or control may be decentralised and performed by agents and/or the end user (instead of via centralised administrators as is the case in prior art).

Anonymity—may be preserved as end users and/or agents may only be known via a "label" not necessarily associated with anyone or anything. The system may provide further levels of anonymity, for example, with the use of self-generated certificates and/or attribute certificates supplied by a box owner to perform specific actions.

Applications—may leverage the certificate management and/or key-management aspects of the present invention to add an extra layer of privacy, security, control, management etc (without relying on centralised infrastructure as is the case in prior art).

Availability—may be significant by making use of third party "cloud" storage and/or sharing services as well as geographic replication (unlike prior art peer-to-peer services which may require end-systems to be online for certain management functions).

Authenticity—may be possible using digital signatures which allows for proof of originator of information being shared and/or exchanged. This may be very important to ensure that information being exchanged hasn't been forged, substituted or falsely planted.

Balance of power—may reside with the end-users (as opposed to centralised administrators). This is because information is protected using encryption and the end user and/or agent uses keys to control nearly all aspects of management with the relative inability of central administrators of intermediate systems to override or compromise user data, influence user interactions or take advantage of user content.

Boundaries—may be very tightly defined. For example security boundaries may be limited to the set of users that have keys (and not implicitly defined by any network, server or other system administrators as is the case in prior art). Trust boundaries may be limited to the set of contacts that a given user has personally verified (as opposed to the domain defined by a third party in prior art). Information sharing boundaries may be compartmentalised to the particular information stored in a given box or workspace (unlike prior art which simply sets third-party changeable boundaries via rules, such as access control lists).

Closed domains—may effectively be created for each situation that requires information sharing. All related information, such as meta-data may be contained within the domain, determined exactly by the possession of appropriate keys (without leakage as occurs in prior art which may use "secret" but discoverable web links).

Compartments—may be enforced through the use of encryption and keys so that any compromise is strictly limited to that particular box or, in the case of a user compromise, the community(s) that that user belongs (unlike prior art in which a compromise may allow access to significant amounts of data and/or user information).

Control—may be significant as a data owner has exclusive power to authorise access to encrypted information through the delivery of keys to authorised parties. This control effectively cannot be overridden or intercepted by administrators, intermediate service provider(s), hackers or any other party.

Credential recovery—may be achieved without necessarily being dependent on a centralised third party. This is because after revocation, a user needs to convince the same people who originally invited them to share information, to do so again. This also reduces the risks of social engineering attacks as even if a user is revoked and an attacker takes their place, the attacker still needs to convince other people in each sharing domain they are the person that has been revoked.

Decentralisation—may be significant as nearly all control, processing, trust and management is effectively pushed "outwards" to the client application. This enables decentralised management including decentralised access, authorisation, certificate, content, credential, entitlements, identity, key, provisioning, privacy, privilege, recovery, rights, role, security, storage and trust management. This may have further benefits such as reducing central administration costs, reducing central help desk demands etc.

Dependence—on centralised services may be minimal. Centralised services may only need to provide optional facility services. Their functions may be limited to certificate signing, revocation checking and/or storage of encrypted information.

Efficiency—may be achieved in several ways as a result of having client-side processing. Examples include compressing end-user data, performing most processing and cryptographic functions client-side, automating the distribution of certificates and handling of revocation, minimising the use of public key operations through the use of wrapping keys etc.

Enforcement—may be strong and end-to-end without relying on centralised infrastructure. This is because data is "armoured" client-side with strong encryption so that data is considered protected anywhere, anytime whether "in transit" or "at rest" across any intermediate system.

Heterogeneous—operation may be possible as different types of technologies, providers and components may be integrated seamlessly together. For example, embodiments of the present invention may include certificates from different certificate authorities, storage from different storage providers, authentication using different types of credentials (e.g. from identity systems, smart card systems, PKI's, WoTs), different types of data stores (e.g. cloud servers) and/or different applications (e.g. file sharing systems, document systems, messaging systems, collaboration systems, instant messaging systems, conferencing systems, queuing systems etc).

Integrity—may be assured through the use of digital signatures. For example to ensure that shared information has not been modified or tampered with.

Loose Coupling—from infrastructure or third parties may be achieved as the system may be considered relatively "host-proof", "location-proof" and/or "provider-proof". For example, it may be relatively easy to replace intermediate storage and/or transport and/or remote service providers.

Management—may be decentralised and strictly contained to the participants in any sharing group or community. This avoids the use of "super users" or any other overriding administrative or management or centralised roles.

Membership—need not be centrally administered as end-users may dynamically build groups in context of the sharing required via the distribution of keys. This capability-based approach may remove many types of complexities with centrally managed groups e.g. unpredictable, transient, complex, overlapping, disjoint, dormant, out-dated etc.

Multi-tenancy—may be safely achieved because each key or permit is completely independent of other keys or permits. Therefore content being shared by any set of users by virtue of possession of a key or permit, is effectively isolated and independent from all other content and other sets of users regardless of how and where it is stored intermediate to end-systems.

Offline protection—may be achieved via end-systems locally storing encrypted information. Recovery of encrypted data while offline is also possible because even if credentials are lost, data may still be recovered by obtaining relevant box keys or sharing keys from other box members or at-rest keys if they were backed up to a box.

Overlay—concepts may be applied to existing applications and/or infrastructure with an extra "layer" of strong security, privacy and/or control. For example, encrypting messages before sending them via an email or instant message system, encrypting a stream before sending them via a voice or screen sharing session etc.

Passphrase recovery—may be achieved without involving a centralised provider. This may be implemented via a passphrase recovery code entrusted to a custodian, such as via a box, which avoids giving the power of credential reset to any intermediate provider. Alternatively, the passphrase recovery code may be provided by email and/or mobile text (Short Message Service, SMS) and is relatively safe because, on its own, it is considered not useable without the corresponding encrypted passphrase blob which is stored in any manner accessible by the end user. This may significantly reduce help desk costs, as password resets may constitute much of the cost of support.

Peer-based operation—may be attained because agents may be relatively autonomous while still being able to utilise intermediate store-and-forward and/or storage mechanisms. Embodiments of the present invention may require minimal need for Trusted Third Parties (TTPs) which may give significant security and privacy advantages.

Provisioning—may be controlled with the use of sub-boxes. This may give the benefits of managed-users being setup and contained inside a contained and/or private world which is controlled by the business, including allocating of credentials, privileges etc.

Policies—may be defined and enforced client-side (rather than server-side). This means that intermediate system administrators are relatively powerless to change or override them.

Protection—may be substantial as end users may protect their own information using end-to-encryption. This means that information stored or in transit in the "cloud" exist only as encrypted "blobs" making it meaningless to intermediate administrators, service providers, hackers or other transitory party.

Privacy—may be enforced instead of being reliant on promises by intermediate providers. This is because the use of end-to-end encryption and other techniques effectively makes intermediate providers "blind" to what information is being shared, who is sharing with whom, and any other behavioural or social network patterns between participants.

Privileges—may be bestowed without the need for explicit enforcement by intermediate parties. For example, attribute certificates may be used to convey rights such as read-only, upload/download, update or any other privileges without a central party needing to maintain or affect those privileges.

Recovery—of keys may be decentralised, self-enforcing, and more secure than centralised approaches of prior art. This is because regaining credentials is not sufficient to regain previous access. Regaining access further requires obtaining keys to each box that a user previously had access to. Regaining box keys is then dependent on re-establishing trust with the owner of the box, or at least one box member in the case of a box-owner trying to regain access back to their own box. This layered, iterative and decentralised approach may be considered preferable to prior art centralised key server approaches which may rely on all-powerful administrators.

Resilience—of the system may be noteworthy as the system may be relatively resistant to rogue clients and/or rogue service providers. Abuse of client-side features requires access to a user's machine. Abuse of server-side services may only obtain unauthorised access to encrypted data or deny service. In neither of these cases it is considered that the actual plain-text data would be compromised.

Responsiveness—may be obtained via asynchronous notifications. This means that interactions such as make contact, invitations, changes in content etc. may appear in near real-time and/or relatively instantaneously.

Revocation—may be used to enhance assurance of credentials. Further, revocation may be managed by end users. Many prior art systems may not provide for revocation, or may only provide revocation in a cumbersome way, for example WoT systems. Providing revocation, particularly timely revocation, is considered essential to handle the case that credentials are lost or compromised. Also, the ability for end-users to get trusted custodians to invoke revocation is far preferable to prior art systems that rely on central administrators who may be susceptible to social engineering attacks and other risks.

Rights management—may be enforced client-side by leaving information encrypted locally and having a special application, such as a reader, that only decrypts information, optionally in parts, as required. In this case, policy based rights management may be enforced.

Risk—may be significantly reduced as security need not necessarily depend on every link, machine, network, administrator and other infrastructure intermediate to end-systems. In essence, this is because the data is "locked-down" (data-centric security) rather than relying on every piece of infrastructure intermediate to end-systems to be "locked-down" (infrastructure-centric security).

Scalability—may be significant as most processing is performed client-side and so significant central hardware is not required to support relatively large numbers of users. Also, encryption is relatively efficient through the use of symmetric keys and the limiting of public key operations through the use of wrapping keys. Further, making use of third party storage for user information and/or messages, which the agent interacts with directly, means that only a relatively small amount of system information may need to be kept centrally, e.g. credential backup, registration information, etc. This may greatly reduce the amount of information managed by the system services that needs to be stored, failed over, backed up, archived etc.

Secrecy—may be inherent in the system as information being exchanged is hidden by encryption and/or interactions between parties may be relatively difficult to deduce. Secrecy may be enhanced by using anonymised certificates and/or avoiding using an external notification service such as email.

Security—of the system may be relatively strong through the use of strong cryptography and best-practice operations, such as end-to-end encryption, strong cryptographic keys, certificate-based authentication, mutual (client authenticated) Secure Sockets Layer (SSL)/Transport Layer Security (TLS), duty specific credentials (i.e. separate certificates for signing, encryption, communications and certificate management), multi-factor vetting of contacts etc.

Self-Management—may be authoritative as nearly all management is performed client-side and is peer-based. This may be in contrast to most prior art where any management actions or control settings by end-users may be overridden by centralised administrators.

Trust—may be more tightly controlled yet more encompassing than may be the case in prior art systems. Trust may be tightly defined via bi-lateral exchanges between users on an "as needs" basis. Trust may be relatively independent of technology as certificates being exchanged may not be necessarily related, associated or compatible. This means that embodiments of the present invention can work with multiple PKI's and or WoT systems simultaneously without the need for CA cross certification, border CAs or trust translation mechanisms by third parties.

Virtualisation—may be achieved in several ways. Because each agent may act as a server e.g. a certificate server, a key server etc each agent may be considered a "virtual appliance" which has the benefits of server functionality without necessarily a group of administrators looking after it. Also, because agents can overlay any remote service e.g. storage service, with a layer of security and privacy, then the result may be considered a "virtual private cloud" which has the benefits of trusted users having their own "private cloud" without the expense or difficulty in building such a "private cloud" as known in the prior art.

Throughout this specification the words "storage data", without limitation, comprises anything in a digital form.

Throughout this specification, the words "data store", without limitation, comprises one or more medium for storage data. Examples comprise, without limitation, disk(s), disk array(s), device(s), peripheral(s), bus(s), service bus(s), repository(s), database(s), memory, memory stick(s), service(s), cloud service(s), storage service(s), sharing service(s), collaboration service(s), network service(s), intermediary service(s), broker service(s) etc.

Throughout this specification, the word "certificate", without limitation, comprises any electronic document which uses a digital signature to bind a public key with an identity. Examples comprise, without limitation, digital certificate(s), identity certificate(s), issued certificate(s) for example from a certification authority, self-signed certificate(s), public certificate(s), private certificate(s), trust certificate(s), Certification Authority (CA) certificate(s), X.509 certificate(s), PGP signed keys etc.

Throughout this specification, the word "key", without limitation, comprises any representation used in association with or operable on an encryption algorithm that enables encryption or decryption of information. Examples comprise, without limitation, cryptographic keys, asymmetric key(s), symmetric key(s), wrapping key(s), master key(s), secret key(s), public key(s), private key(s), authorisation key(s), password key(s), passphrase key(s), one-time password key(s), ticket(s), token(s), etc.

Throughout this specification, the word 'agent', without limitation, comprises a user, an application, an executable, a function executed by software, a program, a system, a sub-system, a library, a service, a plug-in, an extension, a proxy on behalf of another agent, a separate device such as a plug-in device, an expansion card, a network connected device or any other integrated hardware with access to processing means, or any other hardware and/or software entity. Examples comprise, without limitation, analytical agent(s), autonomous agent(s), collaboration agent(s), communications agent(s), control agent(s), cooperative agent(s), cryptographic agent(s), data-mining agent(s), delegation agent(s), distributed agent(s), intelligent agent(s), interface agent(s), learning agent(s), management agent(s), monitoring agent(s), negotiation agent(s), networking agent(s), peer agent(s), personal agent(s), predicative agent(s), processing agent(s), proxy agent(s), reactive agent(s), self-organising agent(s), simulation agent(s), smart agent(s), social agent(s), etc.

Throughout this specification, the word 'user' may comprise an 'agent' and/or an application associated with content.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Embodiments of the present invention may be utilised by apparatus, system(s), user(s) and/or application(s) to privately and/or securely use and/or share and/or transfer information. Such information may be arbitrarily stored for example using remote services and fully controlled client-side, for example within trusted and/or private communities.

1 OVERVIEW

Figure 1A:
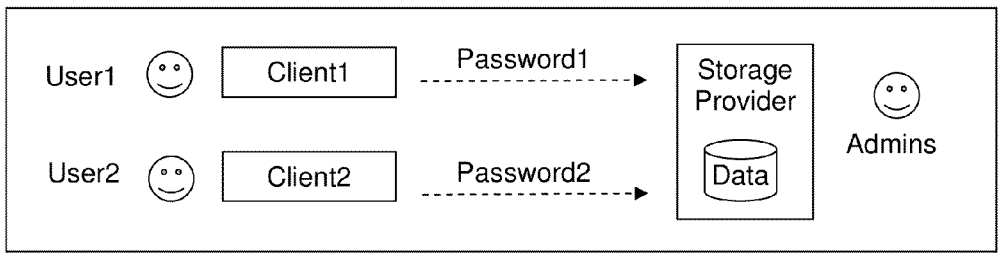
FIGS. 1a through 1d illustrate various prior art arrangements.
Figure 1B:
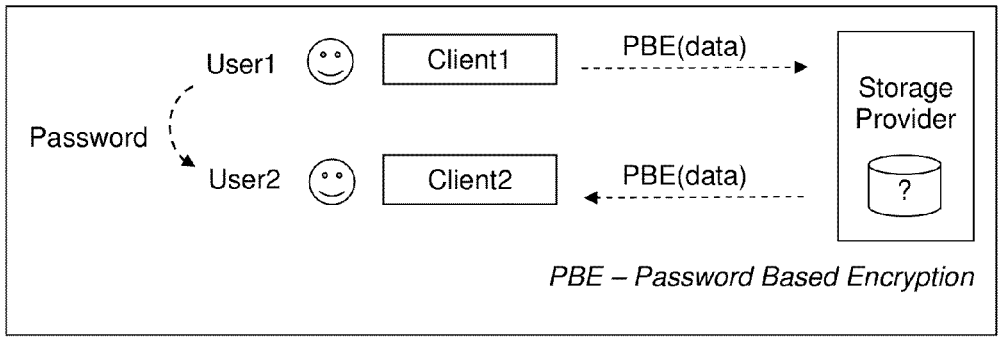
Figure 1C:
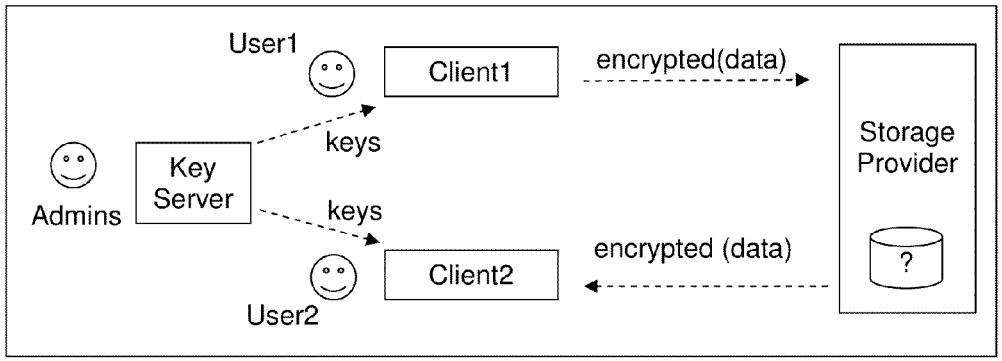
Figure 1D:
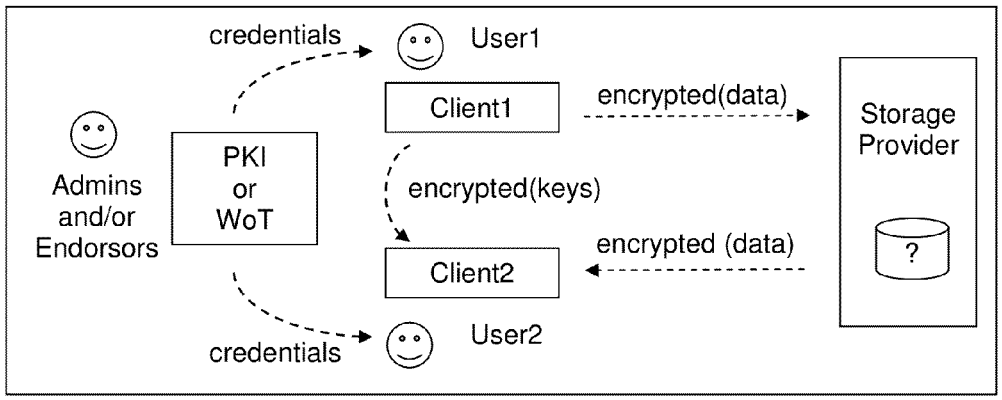
Figure 2:
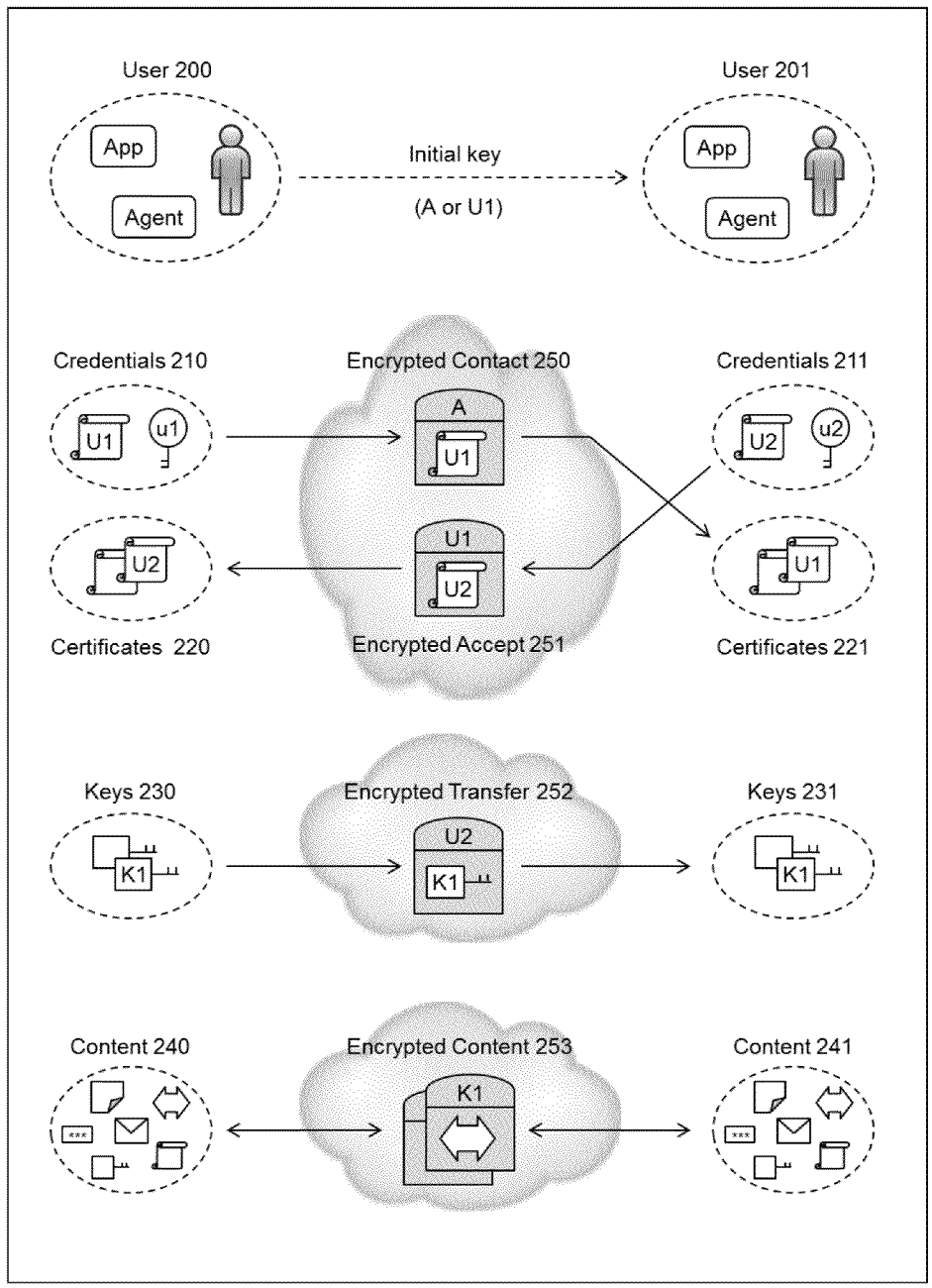
FIG. 2 illustrates an overview of an embodiment of the present invention.

FIG. 2 illustrates an overall introduction to embodiments of the present invention. More detailed definitions, relationships, operations, use cases and advantages are provided in subsequent sections. In practice, any one or any combination of the details described and/or illustrated may be implemented.

In accordance with embodiments of the present invention, security and privacy may be achieved in a more decentralised system including relatively untrusted environment(s) by empowering users to manage credentials, certificates and/or keys on the client-side and control the access to data and keys themselves by the use of encryption applied to the data as well as the keys. Because data and keys are encrypted, preferably separately, the environment, through which users exchange data or keys, is not necessarily dependent on the security and privacy of intermediate systems and thus are workable in a decentralised manner. Data is not necessarily encrypted with the same keys. Keys may reused to encrypt different data. Different keys may be used to encrypt different sets of data thereby isolating and separating those different sets of encrypted data.

In embodiments of the present invention, keys and encrypted data may be transferred and/or exchanged between users not necessarily in any order. To enable transfer and/or exchange of content between users it may be necessary to identify a user to another user(s). For example identification may be known authentication, certification, personal contact or any other means considered acceptable by users. Once identification has been established it is possible to utilise key exchange and/or data exchange.

Furthermore, security and privacy are enhanced by providing a layered architecture. Security and privacy are even further enhanced by providing layers which are not necessarily dependent on each other. For example, the present invention may reflect any one or any combination of layers of credential management, trust management, key management and content management. User-to-user encryption is enhanced by an integrated approach such as the layered architecture disclosed herein.

Even though FIG. 2 only shows two users, the embodiment is equally applicable to any number of users resulting in the possession of a key by each user who wishes to communicate (encryption) together. For example, if a first user and a second user possessed key1, they could communicate together. If a third user and a fourth user possessed key2, they could communicate together. The first user and third user would need to both possess either key1 or key2 or a fresh key3 in order to communicate with each other.

A first user (e.g. User 200) who wishes to establish a trusted relationship with a second user (e.g. User 201), provides an initial key (e.g. key A or certificate U1) to the second user.

The initial key may be provided in many different forms and/or many different ways. For example, the first user may send the second user an encrypted key (e.g. Encrypted Contact 250), which may exist as an encrypted blob transiting intermediate and/or cloud systems, and also the first user makes contact with the second user out-of-band with the associated bootstrap key (e.g. key A). As another example, the first and second users may decide to use an existing key which can be used as a bootstrap key and already in the position of both users (e.g. key B not shown but known to both users). The bootstrap key may be a password, or code or public key or public certificate or personal certificate or any other suitable key. The second user may decrypt using the bootstrap key to decrypt the received encrypted blob in order to obtain the initial key (e.g. U1).

In a preferred embodiment, the first user provides to the second user two communications each via a separate channel. This may provide an increased level of trust and security.

Alternatively, if the first and second users already have a trusted relationship, the first user may provide the initial key (e.g. U1) directly, for example using any suitable means.

The result of the provision of the initial key is that the second user has a key which can be used in the following communication from the second user to the first user.

Now that the first and the second users both have possession of an initial key, a type of handshake process can be completed between the first and second users.

The second user provides a second encrypted key (e.g. Encrypted Accept 251), which may exist as an encrypted blob transiting intermediate systems (independent of application, network topology or operating system) using the second user's own key (e.g. Key U2) encrypted with the initial key (e.g. Key U1). The second user thus provides the second encrypted key to the first user. The first user is able to decrypt the second encrypted key by using the initial key or an associated key such as a private key associated with the initial key.

At this point, the first and the second users have both undertaken mutual decryption and/or verification, for example using a digital signature, from the other user which may be used to confirm the handshake process. Also, both users are in possession of keys (e.g. U1 and U2) which enables a cryptographically secure channel between them.

The first user may provide a third key (e.g. K1) to the second user in the form of a third encrypted key (e.g. Encrypted Transfer 252). The third encrypted key is generated using the second key (e.g. U2) to encrypt the third key. The second user is able to decrypt the third encrypted key by using their own key (e.g. U2) or associated key, such as a private key (e.g. u1) associated with their own key.

In accordance with embodiments of the present invention, any number of additional layer(s) of key(s) may be used subsequent to the third key as necessary.

The result of the communications between users as described above is that both the first and the second users have in their position the third key which may be used in subsequent communications (e.g. Encrypted Content 253) to encrypt and share the same or different content (e.g. Content 240 and/or Content 241).

Embodiments of the present invention are also applicable to one or more further users in which case the steps described above may be undertaken between each further user and the first user (or a user who has or generates the initial key) who generated and/or controls the third key.

In accordance with embodiments of the present invention, once each further user has undertaken the steps with the first user to obtain the third key, the further user may initiate communication with the second user (or vice versa) or any other user who has possession of the third key.

In accordance with embodiments of the present invention, the handshake process as described above and the encrypted transfer (e.g. Encrypted Transfer 252) takes place on a user-to-user basis. The sharing of encrypted content (e.g. Encrypted Content 253) may take place between one or more users.

Alternatively, if two or more users already have in their possession a key which is common to those users, they may share encrypted content (e.g. Encrypted Content 253) even though may not have necessarily have undertaken the handshake process. For example, if a first user (e.g. User 200) provides to two or more other users (e.g. User 201 and User 202 not shown) a key (e.g. K1) then the other two or more users may communicate with each other (e.g. Encrypted Content 253) by virtue of having an associated key (e.g. K1) even though the other two or more users have participated in a handshake with the first user (e.g. User 200) but may not have participated in an handshake process directly between each other (e.g. User 201 and User 202 not shown).

The sharing of content may be facilitated and/or enabled by an intermediate service, such as remote services (further defined below). There may be any number of intermediate and/or remote services in any location (further defined below). Sharing may involve any form of sharing, collaborating, transferring, exchanging, communicating, conveying, interacting etc.

Note that encrypted content may remain protected whilst being transferred ("in motion") and while it is being stored ("at rest") regardless of the level of security provided by remote service(s) for the entire time that it is intermediate to agents. This protection is often known as "end-to-end encryption" or "user-to-user encryption". In other words, unlike prior art systems tend to provide protection and security of systems and infrastructure, embodiments of the present invention provide protection and security and privacy of content. An advantage of having encrypted content is that it provides a level of protection against data leaks, administrator abuse, provider resale, government surveillance etc.

Furthermore, remote services are essentially "blind" to the information that is contained in encrypted content items which may provide significant levels of privacy to the users. Privacy may further be enhanced if users hide their identity such as using pseudonyms for identification (further described below). An advantage of privacy through encryption and the client-side control of keys is that only chosen users who have been given appropriate keys have access to content being shared.

FIG. 2 also schematically illustrates a key management architecture through the use of layers. For example, a first layer may enable the management of credentials (e.g. Credentials 210, Credentials 211), for example certificate based credentials. A second layer may enable the management of certificates (e.g. Certificates 220, Certificates 221), also referred to as the trust layer, for example to enable the exchange of certificates. A third layer may enable the management of symmetric keys amongst a trusted community of users (e.g. Encrypted Transfer 252) and may allow every user to control with whom they share encrypted content. A fourth layer may enable the sharing of content (e.g. Content 240, Content 241), for example amongst a group of users who have in their possession or who have access to the same key or an associated key(s).

Note that, although the above description has been provided with reference to FIG. 2 in a sequential order, there may in fact be no particular order of steps, processes and/or timing related to the storing and/or retrieving of encrypted content (e.g. Encrypted Content 253) and the obtaining of relevant keys (e.g. K1, U2, U1, A). For example, encrypted keys may be shared in advance of encrypted content, at the same time, or in arrears.

Note also that, in accordance with embodiments of the present invention, any encrypted content (e.g. Encrypted Contact 250, Encrypted Accept 251, Encrypted Transfer 252, Encrypted Content 253) may be encrypted with a transitory wrapping key (WK) and the wrapping key encrypted with the relevant key. In this case, relevant key is known as the key encryption key (KEK) and the encrypted wrapping key (EWK) may form part of the encrypted content.

An important realisation in aspects of the present invention is that the sharing of keys may be enabled in a similar way to the sharing of content. That is, by treating a key, and more generally any system information, as just another type of content, the same end-to-end encryption, protection may be achieved.

An extension of the description related to FIG. 2 above is that the client-side sharing of keys equally applies to any other system content, such as certificates, capabilities, authorisations etc. In accordance with embodiments of the present invention, any system content may be exchanged, for example co-ordination of management may be achieved by using sharing and managing messages. This may then enable the decentralised management of general system, security and privacy management such as the management of access, authorisation, certificates, content, credentials, entitlements, identity, key, privacy, privileges, provisioning, recovery, rights, roles, security, storage, trust etc. (further defined below).

Embodiments of the present invention may achieve peer-to-peer (P2P) like advantages, such as privacy and security, but without P2P limitations such as requiring peers to be directly connected or necessarily being simultaneously online. Another advantage is that the content exchanged in embodiments of the present invention may be safely kept in encrypted form as a historical record.

Another realisation is that a user may control the set of people they trust, for example via the exchange of certificates, and may also control the set of people who have access to information, via the distribution of keys. This allows users to determine their "trusted community" to only those they trust, and not necessarily imposed by any third party (further described below).

A further extension of the description related to FIG. 2 above is the client-side management and control of keys and other system data which may enable a relatively large number of privacy enabled and/or secure uses.

The ability to manage certificates may enable a relatively large number of certificate enabled applications. The managing of certificates is enabled because each agent effectively becomes a certificate server. Example applications which may make use of certificates includes secure email, secure communications, client-side authentication, document control, document signing etc (further described below). In addition, certificates and/or signed public keys need not necessarily be related, for example they may be from different issuers and/or be in different forms, which may have significant advantages for supporting heterogeneous environments.

The ability to manage keys may enable a relatively large number of encryption applications. Key management is enabled because each agent effectively becomes a key server. Examples of encryption applications include secure communications, collaboration applications, real-time systems, streaming data systems, data protection systems, etc. (further described below).

The ability to intercept applications client-side can be used to protect a relatively large number of "cloud" services and other remote applications. Data protection is enabled as each agent effectively can protect data end-to-end. Examples of data protection applications include cloud storage, collaboration, private portal, secure file sharing, secure publishing, archive and backup, private messaging, privacy applications and any field within any application etc (further described below).

The ability to replicate encrypted data to end-systems may be used to enable a relatively large number of "at rest" encryption applications, for example local file encryption, content distribution, rights management, storage overlay, mobile data protection, remote data destroy/purge, redaction etc (further described below).

2 COMPONENTS

Figure 3:
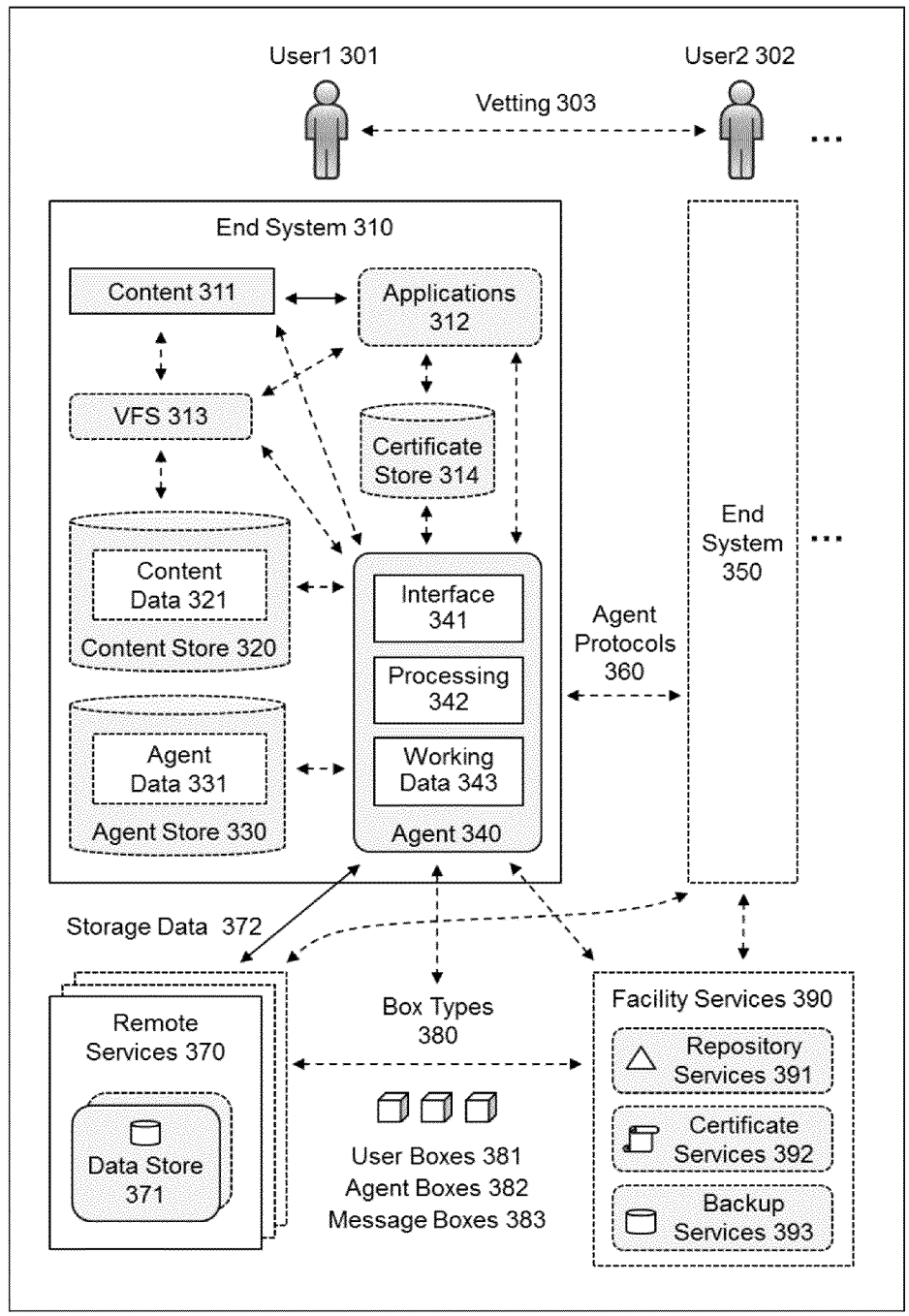
FIG. 3 illustrates a system diagram of an embodiment of the present invention.
Figure 4A:
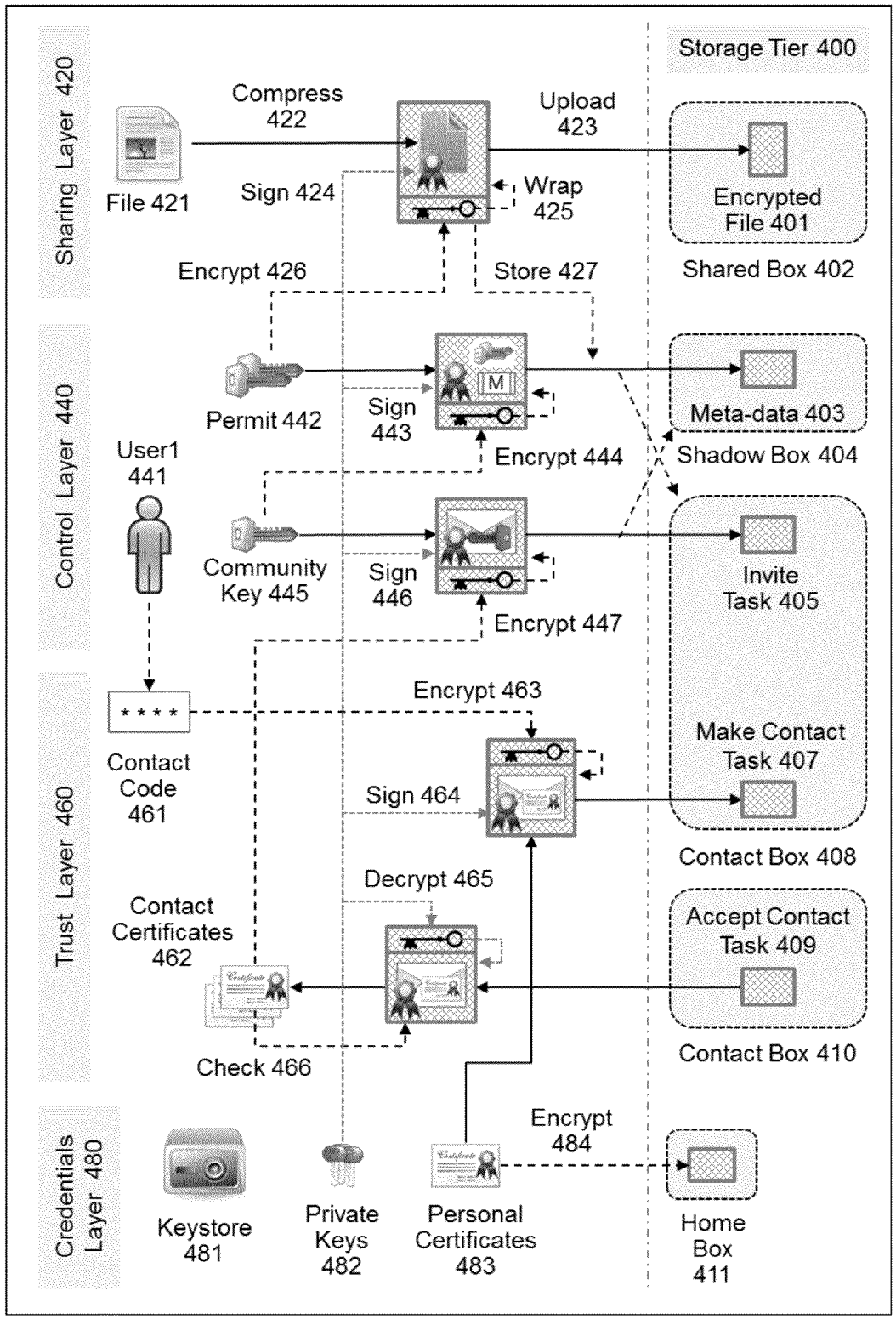
FIG. 4a illustrates an overview of the operation represented as layers of a first user according to an embodiment of the present invention.
Figure 4B:
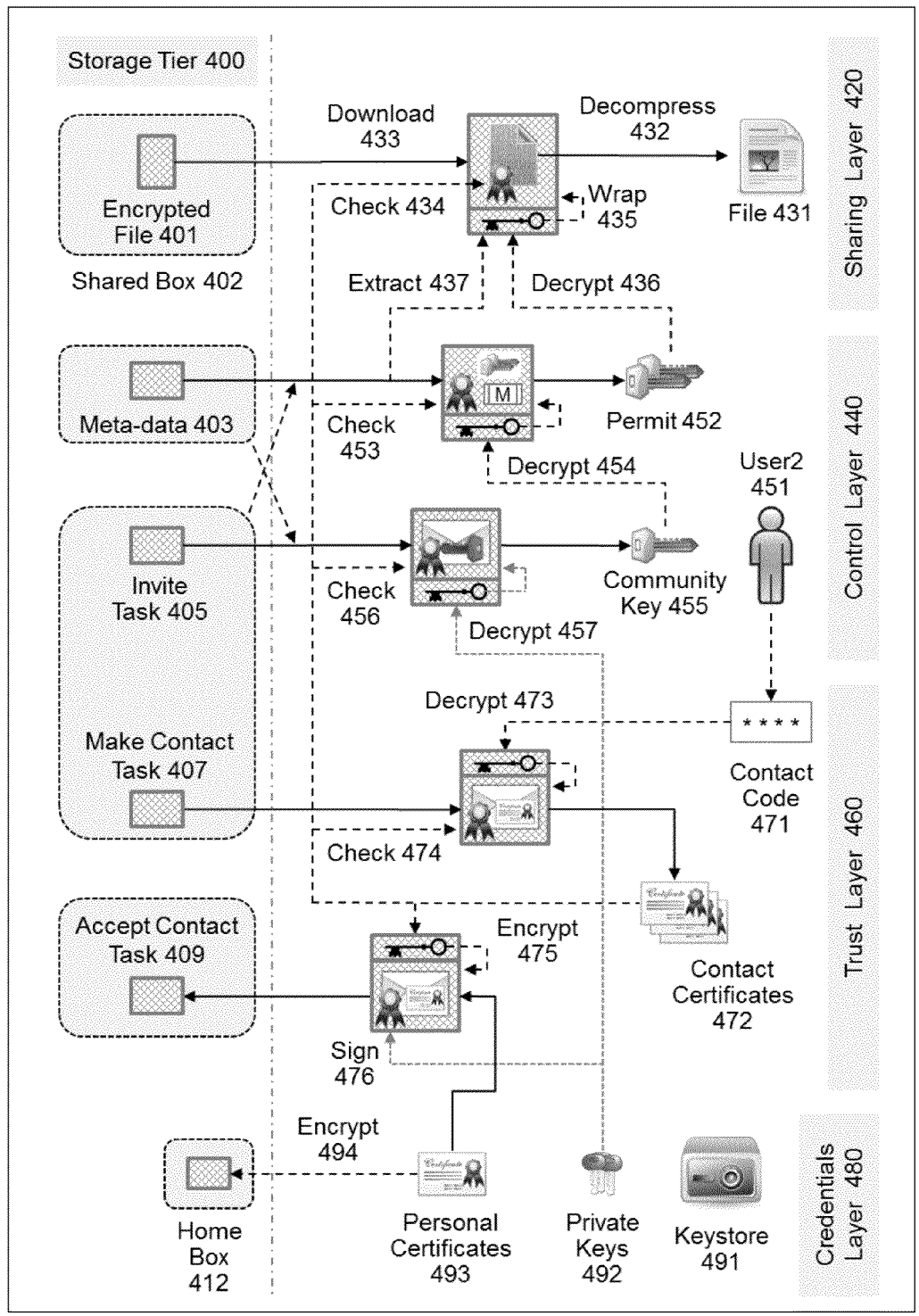
FIG. 4b illustrates an overview of the operation represented as layers of a second user according to an embodiment of the present invention.

This portion of the specification relates to the overall functional components of embodiments of the present invention and makes references to FIGS. 3, 4a and 4b, especially FIG. 3. In practice, any one or any combination of the details described and/or illustrated may be implemented in practice.

In the FIGS. 3, 4a and 4b, items may have corresponding items in other figures. For example:

Items 400, 401, 402, 403, 404, 405, 407, 408, 409, 410, 411 and 412 denote the same corresponding item in both FIGS. 4a and 4b.

User1 301 may correspond to User1 441

User2 302 may correspond to User2 451

Remote Services 370 may correspond to Storage Tier 400

The key used to Wrap 435 may be a copy of the key used to Wrap 425

Community Key 455 may be a copy of Community Key 445

Contact Code 471 may be a copy of Contact Code 461

Shared Box 402 may be an instance of User Boxes 381

Contact Boxes 408 and 410 may be instances of Message Boxes 383

Home Boxes 411 and 412 may be instances of Agent Boxes 382

Encrypted File 401, Meta-data 403, Invite Task 405, Make Contact Task 407, Accept Contact Task 409 may be instances of Storage Data 372.

2.1 Users

One or more users (e.g. User1 301 and/or User2 302, etc) may make use of a system involving embodiments of the present invention. For example, a single user may use the system for backup and/or multiple users may use the system for collaboration and/or sharing information. A user (e.g. User1 301) may be any entity(s), person(s), organisation(s), application(s), service(s), any other interface(s).

2.1.1 Vetting

Users may form a relationship with other users using an out-of-band vetting process (e.g. Vetting 303). This vetting process may be used to authenticate or give assurance and/or trust that another party is who they say they are and/or are willing to participate in a given relationship. Examples of relationships that may require verification includes making contact, invitations and managing boxes. The verification may make use of an authentication code or "authcode". An authcode may be kept secret from everyone except the two users establishing a relationship (e.g. a contact code) and/or transferring privileges (e.g. a box change-owner code).

2.1.2 Pre-Trusted Relationships

If the user is an application, then a trusted path may be automatically used to facilitate the forming of a relationship. For example, two machines may have a trusted relationship via a closed or Virtual Private Network (VPN). In this case, the vetting process may use an existing proof-of-identity in place of the authcode.

In descriptions below, processes that involve a "user" may equally apply to an application, agent, apparatus, system, service and/or end-system whether in singular and plural forms which may be used interchangeably.

2.2 End Systems

Each user (e.g. User1 301) may use an end system (e.g. End System 310) in order to remotely store information and/or communicate and/or share information with other users and their respective end systems.

An end system (e.g. End System 310, End System 350) may be any type of computing device e.g. desktop, laptop, tablet computer, mobile device or any other apparatus with computing means.

The end systems may make use of local storage (e.g. Content Store 320, Agent Store 330). Local storage may include a local disk, portable disk, memory drive, Universal Serial Bus (USB) drive, USB memory stick, network drive etc. In FIG. 3, Content Store 320 and Agent Store 330 are shown logically separated but in implementation may use the same local storage mechanism.

2.2.1 Content

Content may comprise any information communicable in a digital form. Content may be in the form of User Content and/or System Content.

Examples of User Content may comprise, without limitation, any one or combination of data, information, file(s), code(s), record(s), stream(s), protocol(s), conversation(s), session(s), backup(s), journal(s), audit trail(s), log(s), document(s), presentation(s), spreadsheet(s), user message(s), email(s), post(s), comment(s), multi-media, picture(s), video, music, audio, radio, indicia, ticket(s), entry(s), field(s), index(s), application(s), executable(s), library(s), package(s) or any other electronic information etc.

Examples of System Content may comprise, without limitation, any one or any combination of system data, application data, meta-data, agent data, task(s), key(s), certificate(s), interaction(s), communication(s), acknowledgement(s), signalling, control information, system message(s), revocation message(s), privilege(s), authorisation(s) etc.

Content may also comprise, without limitation, any one and/or any combination of derivation(s) of User Content and/or System Content such as encrypted, obfuscated, compressed, translated, scanned, signed, watermarked, packaged, compiled, aggregated, segmented, transformed, encoded, etc.

End systems may contain local content (e.g. Content 311) which may be useful to and/or shared between users and/or applications. Content may be stored locally (e.g. Content Store 320, Agent Store 330), stored remotely (e.g. Remote Services 370), transferred (e.g. Virtual Protocols 360, Storage Data 372), processed (e.g. Processing 342) etc.

2.2.2 Applications

Applications (e.g. Applications 312) may make use of local content (e.g. Content 311). Applications may have collaboration, content creation, file management, systems management and/or communications capabilities. Examples may include, without limitation operating system functions, email, instant messaging, forum(s), calendaring, communal editing, social networking, chat, real-time interactions, monitoring, management, control, transaction system(s), document management, virtual file systems, virtual worlds and/or any other client-server applications, web applications, distributed applications, messaging applications, peer-to-peer applications, collaboration applications etc.

Applications may include certificate enabled applications which make use of a certificate store (e.g. Certificate Store 314). Applications may also include synchronisation applications which facilitate sharing, for example to synchronise data areas (e.g. Content Store 320, Agent Store 330) with a remote storage "cloud".

Applications may be related to remote services (e.g. Remote Services 370). In this case, a portion of an application may be in the end system (e.g. Applications 312), for example a client installation or within a browser, whilst another portion of the application may be in remote services, for example, a server application.

Applications may work in conjunction with an agent (e.g. Agent 340), for example, explicitly invoke agent functions, such as to encrypt/decrypt, store/retrieve, upload/download etc.

Conversely, an agent may intercept interactions of applications, for example, to encrypt/decrypt some or parts of the application interacting with another application and/or remote service.

2.2.3 Virtual File System (VFS)

A Virtual File System (e.g. VFS 313) may be managed by an agent (e.g. Agent 340). The VFS may make content available to users (e.g. User1 301) and/or applications (e.g. Applications 312) whilst ensuring it remains encrypted (e.g. Content Data 321) at-rest, for example, while on-disk (e.g. Content Store 320). Synchronisation applications may also synchronise this encrypted information (e.g. Content Data 321 and/or Agent Data 331).

An advantage of using a VFS is that it may remove the need to have plugins, connectors, or even a special interface to encrypt files. Using a VFS, applications may simply read and write information from the virtual disk or virtual folder, with the VFS transparently handling "on-the-fly" encryption. In this way, users may perceive such an embodiment of the present invention as a "self-encrypting disk". Users may further value the fact that information always remains in an encrypted form, where ever it resides, and may label this "privacy at rest".

2.2.4 Certificate Store

An end system may contain one or more certificate stores (e.g. Certificate Store 314). These stores may be associated with an operating system or may be associated with applications (e.g. Applications 312) such as a browser, email system, instant messaging system etc. An Agent (e.g. Agent 340) may publish certificates (e.g. Contact Certificates 462) into the certificate store for use by other applications.

A benefit of an agent managing such certificate stores is that it may automate the obtaining and/or distribution and/or management of certificates. For example, prior art systems may require the manual management of certificates, such as email certificates, authentication certificates, encryption certificates, signing certificates, trust certificates etc.

2.2.5 Content Store

Content storage (e.g. Content Store 320) may store one or more parts of storage data.

Content storage may be one or more data stores, for example, one or more disks or other storage device(s). Any one or any combination of storage devices may be attached to the end system, for example a USB device or portable device may be advantages for the purpose of protecting data on that device.

Content data (e.g. Content Data 321) may be encrypted forms of content (e.g. Content 311). In a preferred embodiment, the encrypted content is encrypted user content. Prior to encryption, content may be compressed and/or signed. Encrypted content may be created and/or used and/or managed by an agent (e.g. Agent 340) and/or by a Virtual File System (e.g. VFS 313).

Encrypted content may be kept in a form suitable for "on-the-fly" encryption and decryption. This may also be known as "at-rest" or "on-disk" encryption. At-rest encryption may use one or more files, for example, one or more encrypted data files. Encrypted content may have associated control-data such as a signature, filename, file size, encryption algorithm, compression type, keys etc. The control-data and/or signature may be kept encrypted and/or may be kept separate files and/or kept as fields in a database (e.g. Agent Store 330).

At-rest encryption may allow an agent and/or a VFS to present a logical view of files and allow any associated file operations e.g. create, view, modify, delete, change permissions etc while maintaining the actual file in an encrypted form while at-rest, for example, on-disk.

File encryption may use a mode which makes it suitable for "on-the-fly" encryption and decryption, for example Counter (CTR) Mode. Random access may be implementing using an appropriate cipher that allows implementing a seek to a location in a file to be accomplished via a seek to an associated location in the encrypted file.

Signing may use a digital signature or hash-based message authentication code (HMAC). Signatures may be used for data integrity and/or authenticity. Detecting integrity problems may be important to automatically recover from corruption.

Encrypted content may be versioned. That is, for any given file, there may be previous versions, preferably in encrypted form, that are maintained. This may allow users to recover files e.g. that have been accidentally overwritten or contain changes that need to be undone or to resolve two or more people trying to share a file of the same name and or concurrently trying to change the same file.

Using shared keys, may allow recovery from lost credentials, including the case where data hasn't yet been uploaded. This is because the relevant volume or box or shared or workspaces keys may be obtained from other users, for example through an invitation process.

2.2.6 Agent Store

Agent storage (e.g. Agent Store 330) may be used to store agent data (e.g. Storage Data 331).

The agent store may be a separate store and/or part of a local store (e.g. Content Store 320) and/or may be a separate device, e.g. a USB device or portable device and/or may be in a memory. If agent data is on a separate device, the user (e.g. User1 301) may remove the agent related information when not using the end system. This may enhance the security of that end system. The agent store may be in memory, for example, when a credential backup service (e.g. Backup Services 393) is being used. This may be used if the persistent security of the end-system cannot be relied on and/or when an external authentication system, e.g. Virtual Private Network (VPN) is being used.

End systems may make use of a keystore (e.g. Keystore 331) for storing credentials, such as certificate-based credentials. Credentials may be duty specific, for example, separate credentials for encryption, communications, content signing and/or system signing (also known as a registrar credential). Each credential may include a public key within a certificate and an associated private key. The public and private key pair may be generated by the agent. The keystore may be a software keystore or a hardware keystore such as a smart card or High Security Module (HSM). The keystore may be protected and/or encrypted, such as using a passphrase, pin, biometrics or any other appropriate means.

An agent (e.g. Agent 340) may make use of a passphrase recovery capability. In this case, the agent may generate an encrypted passphrase blob (EPB) using a passphrase recovery code (PRC). The EPB may be stored locally (e.g. part of Storage Data 331) or in any manner accessible by the agent and/or user. The PRC may be entrusted to a third party, such as stored in a passphrase-recovery box and/or provided to trusted user and/or trusted third party and/or a system passphrase assistance service (e.g. Backup Services 393). Recovery of a forgotten keystore passphrase may be manual or automatic. In the manual case, a first user (e.g. User1 301) may contact a second user (e.g. User2 302) who has been given the PRC or has access to it via their passphrase-recovery box and ask them to provide the PRC. In the automatic case, a passphrase assistance service may provide the first user with the PRC via one or more emails and/or Short Message Service (SMS) or other means. The passphrase assistance service may log the event and/or notify other box owners and/or other users in boxes associated with the first user that passphrase assistance was triggered. Once the first user has obtained the PRC, their agent (e.g. Agent 340) may recover the passphrase from the EPB and unlock their keystore. On recovery, an agent may require that the user sets a new passphrase, after which the agent may generate a new EPB and store it locally or in any manner accessible by the end user or agent and store the corresponding new PRC in the passphrase-recovery box and/or provide it to other trusted party(s) and/or provide it to the passphrase assistance service.

An agent may store other state or recovery data locally (e.g. as part of Storage Data 331) or in any many accessible by the end user or agent. This may include some or all of its working data (e.g. Working Data 343) and/or some or all of data stored in the home box (e.g. Home Box 411) such as state data, user certificates, CA certificates, keys, permits, codes for invites or contacts or change-owner operations etc. Such recovery data may avoid the necessity of having a home box or as a backup for a home box or so that the agent may start-up without necessarily having to access its home box.

The agent may also store synchronisation information, for example between the local and remote copies of encrypted content. This information may be kept in a locally (e.g. in Agent Store 330) along with other meta-data about the encrypted content. An advantage of this approach is that it may allow the agent to work offline (not connected to any central services) and synchronising to occur at a later time.

2.2.7 Agents

End systems (e.g. End System 310) may contain an agent (e.g. Agent 340). An agent may be in software and/or hardware, may be standalone such as an application, executable, service etc. and/or may be in a component form, such as a sub-system, library, plug-in, extension etc.

Agents may be used to facilitate secure and/or private sharing of data with other users, agents, applications, systems, services etc. An agent may be relatively autonomous and have significant ability to manage its own data, privileges, communications and any other management functions. In one embodiment, an agent may be considered a "control centre" for collaboration and a set of agents may distribute this control between themselves. Further, agents may be instantiated anywhere, and as such, an agent may be considered a virtual entity, such as a "virtual appliance" and multiple co-operating agents may be considered as forming one or more "virtual worlds" or "virtual private clouds".

An agent may be dynamically loaded, for example downloaded from a website and/or it may be installed locally (e.g. Content Store 320 or Agent Store 330). Preferably, the agent code is digitally signed to ensure integrity of the agent as a trusted application.

An agent may be a separate device such as a plugin device, an expansion card, a network connected device or any other integrated hardware with access or connection to processing means.

An agent may include an interface (e.g. Interface 341) to a user (e.g. User1 301) or other applications (e.g. Applications 312) or to a Virtual File System (e.g. VFS 313). An interface to a user may be a graphical user interface (GUI). An interface to other applications may be an application programming interface (API).

An agent may include processing capabilities (e.g. Processing 342). This may include operations such as uploading, downloading, compression, decompression, connection management, synchronisation, local/remote conflict management, policy enforcement, cryptographic functions etc. Cryptographic functions may include encryption, decryption, key management, digital signature creating and checking, revocation checking, hash calculations, key generation, key rotation, certification requests, certificate generation, certificate verification, certificate path validation etc. In particular, an agent may need to process and act on protocols (e.g. Protocols 360) to/from other agents.

An agent may contain working data (e.g. Working Data 343) of which some may be stored locally (e.g. Agent Store 330) and/or remotely in a home box (e.g. one of Agent Boxes 382). Such data may comprise capabilities and/or state information necessary to ensure the security and/or privacy of the user and/or end-system. Examples of agent data may comprise, without limitation, policies, privileges, lists, keys, permits, certificates, passwords, passphrases, codes, configuration, state information, system information, location information, meta information, operation progress indicators or any other information that related to the control or management of end-systems and/or interactions with other users (e.g. used by Control Layer 440). In particular, it may contain other people's certificates, permits (keys to boxes), attribute certificates, trusted contacts, etc. Such agent data may be encrypted and/or stored locally and/or remotely. Working data may be initialised by reading the home box on start-up, for example for other user's certificates, CA certificates, codes, in progress operations etc.

2.3 Agent Protocols

Agents (e.g. in End System 310, End System 350) may interact via protocols (e.g. Protocols 360). This interaction may be direct or indirect. Direct interactions include direct connections, peer-to-peer systems, file transfer systems, physical means or any other suitable method of transport. Indirect interactions may be via an external messaging and/or queuing services and/or messages and/or tasks stored via a separate remote service (e.g. Remote Services 370). Agents communicating in an indirect way may be considered as using virtual protocols or virtual peer-to-peer (P2P) mechanisms to communicate.

Agent protocols may be used for exchanging encrypted tasks with other agents, such as invitations, capabilities, certificates, encrypted keys etc. Such tasks may be used for setting up trust relationships, uploading or downloading information, supplying or receiving status, managing notifications, managing cryptographic functions, checking revocation etc.

It is important to note that agents may use protocols to decentralise management and may use end-to-end encryption to protect system data using substantially the same mechanisms normally used to manage and protect end-user data. For example, the techniques used for the end-to-end sharing of user content may be applied to the end-to-end transfer of management messages and/or security information such as keys, certificates and/or capabilities.

2.3.1 Tasks

A task or message may be any kind of interaction or communications between agents and/or users including messages, acknowledgements, signalling, information transference etc. A sequence of tasks may form a transaction.

All or part of each task or protocol interaction may be signed and/or encrypted. Signing may use a signing credential such as their system signing or registrar private key. Encryption may use an encryption credential of the intended recipient or Password Based Encryption (PBE). A task may use a standard format such as Cryptographic Message Syntax (CMS) which may provide a standard way for signing and/or encrypting a payload and/or providing associated meta-data.

Tasks may have a header. A header may have one or more fields for sequencing, addresses, identifiers, tags and/or other meta-data. For example, fields may include task number, task size, task type, encoding, sender, recipients, time stamps, validity period, checksums etc.

Tasks may have multiple body parts. For example, a task for several users may have a body part for each recipient, and each body part may be encrypted, for example using the respective encryption certificate of each associated recipient.

Tasks may be addressed to one or more recipients. Recipients may be other users of the system or potential users. Note an advantage of embodiments of the present invention is that tasks may be addressed to users who have not yet registered or enrolled or yet known by the system. In this case a contact box may be created in advance of a user registering, ready for when they are able to access it.

Tasks may be numbered and/or have a unique identifier, for example to recover from lost messages, to retry if tasks have not been acknowledged within a selectable interval, to prevent replay of tasks, to ensure sequencing, to manage transactions etc.

2.3.2 Transactions

Protocols may consist of a sequence of tasks and/or message exchanges and/or form a transaction.

Tasks and/or messages may be exchanged using any suitable means, such as email, instant messaging, a notification service, a collaboration service, a queuing service or any other message related means etc. In embodiments of the present invention, any one or any combination of remote services (e.g. Remote Services 370) may be used for reliable messaging by making use of Message boxes (e.g. Message Boxes 383), also known as control boxes, task boxes, contact boxes etc.

A refinement of a message box may be a pair of contact boxes which separate forward and reverse interactions. In this case, one contact box may be the out-box of a first user and the in-box of a second user, whilst the other contact box may be the out-box of the second user and the in-box of the first user. A transaction using contact boxes may proceed using any one or any combination of the following steps:

User A initiates a transaction by posting a message in their out-box for user B

User B responds to the message by posting a response in their out-box for user A User A cleans-ups their initial message.

Repeat the above three steps as required e.g. for multi-step transactions

The transaction is marked as finished when user A or B responds with a confirmation message.

If a confirmation message arrives it is a signal to the other party they can delete the last message they posted to the in-box for the confirming user.

A lone confirmation message such as one that is sitting in a user's out-box with no corresponding message in the in-box may be deleted (cleaned-up).

Contact boxes may be advantageous to increase security, privacy, robustness, reliability, recovery and/or delivery of interactions between two parties, particularly when using remote services which may have little, if any, support for messaging. For example, contact box pairs may implicitly reflect the current state of a conversation between two users. If the contact boxes are empty, then no conversation may be currently taking part. If messages exist, then they may be processed in an idempotent fashion. For example, if a link fails after a contact box message is fully processed but the message that represents the response to the other user has not yet been posted, then this situation may be easily detected and an appropriate response enacted.

2.4 Remote Services

Remote services (e.g. Remote Services 370, Storage Tier 400) may be used to store, share and/or exchange information with one or more end systems (e.g. End System 310, End System 350). Any one or any combination of remote services may be used.

A remote service may not necessarily understand the concept of boxes and/or the differences in how they are used. This may allow the remote service to be relatively simple and safeguard the information as the remote service may be relatively blind to who is accessing what and why.

A remote service may be considered as logically centralised services but need not have any relationship and/or proximity to each other. Additionally, they may be run on different machines and/or run by different providers and/or at different locations and/or may be distributed and/or replicated. Any one or any combination of remote services may reside on a given hardware, computer and/or server and/or service. There may be many such services, not necessarily related or using the same technology, provider or access techniques. The remote services may comprise any one or any combination of "cloud" services or other services.

A remote service may make use of any type of electronic storage and/or transfer means. This includes any system of moving information including sharing systems, application systems, collaboration systems, messaging systems, communications systems, queuing services and other transport systems.

A remote service may structure stored information in any relevant way. For example, a storage service may store files organised in a hierarchy of directories, a management service may store information in a database and present it to users as forms, a collaboration service may store information by category and present information to users as commentable and/or editable pages, a support service may store and organise information by issue, a task service may store and organise information by function etc.

A remote service (e.g. Remote Services 370) may store storage data (e.g. Storage Data 372) in one or more data store(s) (e.g. Data Store 371).

2.4.1 Storage Data

Storage data may include any information or data exchanged between an agent (e.g. Agent 340) and a remote service (e.g. Remote Services 370).

Storage data may comprise any one or any combination of storage data parts. Storage data parts may be stored in any one or any combination of data stores.

A storage data part may contain any type of content. For example, any one or any combination of: certificate(s), key(s), task(s), message(s), authorisation(s), token(s), content, information, data, meta-data, stream(s), packet(s), box data, application data, application field(s), database field(s) and/or anything communicable in digital form.

An important aspect of embodiments of the present invention stem from the realisation that end-to-end encryption, normally used to protect end-user data, can also be used for protecting and decentralising the management of the system's own data, especially agent data.

Storage data, either in full or in part(s), may be compressed and/or signed and/or encrypted. In a preferred embodiment, storage data is in a standard format such as Cryptographic Message Syntax (CMS) which provides a standard way to sign and encrypt the storage data as well as other optional meta-data. The signing certificate may be included in the storage data in case the recipient is not in direct contact with the author.

If the storage data is encrypted, then the remote service may be relatively "blind" to what type of data it is and/or who is sharing it.

Information about storage data, such as identifiers, locations, filenames, privileges, versions, backups etc. may be maintained separately by a repository service (e.g. Repository Services 391) and/or included as meta-data.

2.4.2 Data Store

A data store may make use of any relevant technology that allows data to be "at rest" such as memory, disk(s), tape(s), storage array(s), network array(s), hard disk(s), digital disk(s), portable disk(s), portable memory, disk array(s), network disk(s) etc. and/or provided indirectly e.g. network file server(s), backup service(s) and other third party storage or "cloud" service(s).

A data store may store information in any form, such as files, database entries, object store, directory or any other method of storing or communicating data in electronic format.

A data store may be in a single and/or multiple geographic locations. Data may be spread over any one or any combination of data store(s) and/or in a way that may be distributed and/or replicated.

A data store may store unstructured information, for example to enable the sharing of files, documents, photos, videos and other user content. Such information may be explicitly manipulated by users.

A data store may store structured information, for example be part of an application such as fields, entries, comments etc. Such information may be implicitly manipulated by users as part of a wider application such as a content management system, a customer relationship system, a sales tracking system, a source code management system etc.

Information in a data store may be distributed and/or replicated. This distribution and/or replication may be in accordance with a pre-determined policy. For example, based on any one or any combination of frequency, file size, location, time of day, file type, on demand, workgroup category, version, time of day, on demand, type of content, expiry.

2.5 Box Types

Boxes may be created for any required purpose and thus there may be a relatively huge number of possible box types and/or box uses.

Box types may be conceptual, in that labelling a box with a given type may be just for agent and/or user and/or application convenience.

Box types may have stronger meanings, for example, be handled in a special way by an agent (e.g. Agent 340) and/or by a repository service (e.g. Repository Service 391) as described herein.

Box types may generally be categorised into three main areas:

User boxes (e.g. User Boxes 382, Shared Box 402) relating to user or application information (e.g. Content 311, Content Data 321, Encrypted File 401).

Agent boxes (e.g. Agent Boxes 382, Shadow Box 404, Home Box 411, Home Box 412) relating to agent information (e.g. Working Data 343, Agent Data 331), and/or Message boxes (e.g. Message Boxes 383, Contact Box 408, Contact Box 410) related to controlling information or tasks passed between agents (e.g. Invite Task 405, Make Contact Task 407, Accept Contact Task 409).

2.5.1 User Boxes

User boxes (e.g. User Boxes 381) may store user data. User boxes may represent different collections of data being shared between different groups of users. Different box types may contain different types of user data. For example: shared boxes, managed-user boxes and applications boxes.

A shared box may be used for sharing user content (e.g. Content 311). The content itself may be encrypted with a content key and the content key may be encrypted with a box key and associated with the encrypted content. Encrypted content keys may be unique for each of item of content. Each content box may represent a group of content. Content groups may be referred to as a workspace, shared space, file space, user box, content box etc. Content groups may overlap, thereby creating "Views". For example, content box A may include a storage key S1 encrypted with key A, and content box C may include storage key S1 encrypted with key C. In this case, document F1 which has been encrypted with key S1 may be part of both content box A and content box C.

A managed-user box may be a client box or sub-box that inherits properties from a parent box. For example a parent box may have company's staff members while a managed-user box may have members of a company's clients. In this case, any of the staff may be able to read and/or write to managed-user boxes, for example because of inheritance, but a given client may only be able to read and/or write to sub-boxes they've been invited to. Under the parent box may be different types of managed-user boxes, for example:

- A personal client box which may be read or updated by a single client.
- An all-client box which is visible to all clients under a parent box. For example, a company may publish common material to its clients, such as a newsletter. An all-client box may be read-only to clients.
- A shared client box which is visible to multiple clients. For example, when sets of clients, associates, contractors etc need to collaborate under the control of a business.
- A joint client box, for example to allow for multiple logins to the same box, such as a husband and wife.

Note that managed-users effectively live in a very private and isolated "world" scoped by the parent-box. Managed-users may be assigned directly to appropriate client boxes, for example by the owner or privileged members, which may avoid requiring specific acceptance by the managed-user. Also a business may make use of a private portal (described below) in order to provide a simpler interface for those managed-users to login in with.

Application boxes may be special types of user boxes (e.g. User Boxes 381) which may be used by applications for managing information on behalf of a user. For example, structured information such as fields, XML fields, records, slots, objects, streams etc may be stored as separate files in one or more boxes depending on the access requirements. Access to individual items may achieved be accessing the corresponding file. Example applications include password managers, electronic messaging, instant messaging, chat, forums or any other type of collaboration application.

There may be many other types of user or application boxes, depending on the types of data being exchanged between users. These box types may utilise any one or any combination, without limitation, of privileges, read-only access, write-only access, management rights, control restrictions or any other predefined criteria. Examples of other user or application box types may include, without limitation, drop boxes, deposit boxes, dead-drop boxes, backup boxes, archive boxes, publishing boxes, letter boxes, read-only boxes, portal boxes, tender boxes, hierarchical boxes, nested boxes, application-configuration boxes, instant-message boxes, forum boxes, collaboration boxes, safety-deposit boxes, electronic-vault boxes etc.

2.5.2 Agent Boxes

Agent Boxes (e.g. Agent Boxes 382) may be used to store agent or system data. Agent boxes may store different collections of data being controlled by the agent to facilitate the management of information on behalf of users. Different box types may contain different types of agent data. Some examples include home boxes, meta-data boxes, passphrase-recovery boxes, revocation-custodian boxes, personal-box-recovery boxes, credential-backup boxes etc.

A "home" box (also called working, hibernate, mobility, state, knowledge, holding, standby, or asset box) may be used for the private use of an agent (e.g. Agent 340). It may be used to store the user's own capabilities and other agent working information, such as certificates, keys, state data and/or configuration. Any or all of these items may be may be digitally signed such as using a signing credential of the owner. Any one or any combination or all of these items may be encrypted (e.g. Encrypt 484, Encrypt 494) such as using the encryption certificate (public key) of the owner (e.g. User1 301) or using another key, such as a home-box key, which may then be encrypted with the owner's encryption certificate and the resulting encrypted key may also be stored in the home box. One or more home boxes may be used to store the user's idea of how the world looks. A home box may store relatively persistent information such as box keys and/or permits (a collection of keys for a box) of boxes they've been invited to, certificates of user's they have made contact with etc. A home box may store relatively transient information such as copies of messages, copies of codes that have not yet been accepted, for example contact codes, invitation codes, change owner codes etc. A home box may store working data (e.g. Working Data 343) such as configuration information, custodial information, cryptographic seeds, state data or any other run-time data in which the agent (e.g. Agent 340) needs for its ongoing operation. The home box(s) may serve the purpose of remotely storing agent data either as a backup or because it is not desirable to persist such agent data locally. In a preferred embodiment, the storage and/or repository service might limit access to encrypted agent data to just the owner, for example, using access controls or appropriate Attribute Certificates (ACs). According to policy, the storage and/or repository service may limit access to particular home boxes and/or particular content in a home box, for example based on location. Home boxes may be an example of a "1:0" box because only the owner may read and write to such a box. Home boxes may also be provided as a facility (e.g. part of Backup Services 393).

A meta-data box (e.g. Shadow Box 404) (also called a shadow, broadcast, management, command or supervisory box) may be used for storing information about files in a box. For example: locations of files in that box, indexes or keywords e.g. to facilitate searches, icons, thumbnails, requests and acknowledgements of read receipts, history, audit trails, permits, managed-user or client credentials, previous box keys, annotations to files, version information, information about sets of files forming structured/application data etc. The meta-data box may be a separate box from the box it is describing and/or the meta-data (e.g. Meta-data 403) may be an area within the same box (e.g. Shared Box 402). A meta-data box or meta-data area may be considered as a "broadcast" mechanism for members of a box. In implementation, it may consist of a number of "slots" and/or a queue, one for each user, which may have advantages such as avoiding concurrency by multiple writers, facilitate versioning, facilitate transitioning between permits, manage client credentials, facilitate key rollover etc. Note that the meta-data box may be a way of keeping agent system data in a way that keeps the central storage system "blind" from such data and therefore preventing or making it difficult to deduce what activities agents may be performing or co-ordinating.

A passphrase-recovery box may be used to store a passphrase recovery code (PRC). This allows a first user (e.g. User1 301) to insure themselves against forgetting their keystore (e.g. Keystore 331) password or passphrase. The setup may be in three parts. Firstly, the first user invites a second user (e.g. User2 302) to their passphrase-recovery box. Secondly, the first user and/or the first user's agent generates a Passphrase Recovery Key (PRC), encrypts it with the box key and stores it in the passphrase-recovery box. Thirdly, the PRC is used to encrypt the keystore passphrase which is stored locally (e.g. Agent Store 330) as an Encrypted Passphrase Blob (EPB). If the first user forgets their passphrase, then the second user can give them the PRC which can be used to decrypt the local EPB to regain their keystore passphrase. Preferably on recovery, the first user's agent may require the first user to choose a new passphrase, which may then be encrypted with a new PRC which is stored in the passphrase-recovery box and a new EPB which is stored locally. Note that the PRC may also be provided by a passphrase assistance service.

A revocation-custodian box may be used by a first user to store a pre-signed revocation request and/or revocation passphrase (e.g. as defined in RFC 4310). The revocation request may be signed by the first user's registrar private key. The first user may invite trusted or custodial users to the box. In the event that the first user needs to have their credentials revoked, for example if they are lost or get compromised, then, on instructions from the first user, a custodial user may submit the revocation request to the associated revocation service (e.g. Certificate Services 392) to get the first user revoked.

A personal-box-recovery box may be used to allow recovery of single-user boxes after the loss of credentials. In this case, an owner of a personal box may safeguard that box by storing the personal-box keys in an encrypted blob encrypted with a recovery key. This recovery key may then be stored in a personal-box-recovery box, encrypted with that box key. Thus, after revocation and re-instatement, the user can get invited back to their personal-box-recovery box, to retrieve the recovery key which can be used to retrieve the encrypted blob in their personal box containing their personal-box keys.

A credential-backup box may store encrypted credentials. This may be separate, in conjunction with or in addition to a credential backup (e.g. Backup Services 393). For example, a credential-backup box may store encrypted credentials of managed-users. Note that access to a credential-backup box, just like other boxes, may require a mutual (client-side) SSL connection. If such a temporary SSL certificate is used for example from a temporary access service (e.g. Certificate Services 392) such as in the case of retrieving backed-up credentials, then access to the box may be read-only or otherwise restricted.

There may be many other types of agent boxes, depending on the requirements of agents. These box types may utilise any one or any combination, without limitation, of privileges, read-only access, write-only access, management rights, control restrictions or any other predefined criteria. Examples of other agent box types may include, without limitation, search boxes, overlay boxes, one-way boxes, post boxes, temporary boxes, announcement boxes, broadcast boxes, etc.

2.5.3 Message Boxes

Message boxes (e.g. Message Boxes 383) may be special boxes used to facilitate communications between agents (e.g. within End System 310, End System 350). A message box (also called a task box or control box or "contact" box) may be used for agents to exchange "tasks". Tasks may include messages, indicators, notifications, acknowledgements or any other construct necessary to enable agent-to-agent protocols (e.g. Protocols 360). Protocols may include, for example, to make contact, to establish bilateral relationships, to enable key management, to distribute agent data (e.g. keys, permits, attribute certificates etc), to change ownership, to convey privileges, to manage credentials etc. Preferably, tasks may be encrypted. A message box may make use of an indicator in the task header in order to facilitate delivery to and/or access from the intended recipient(s). Message boxes may also be provided as facilities (e.g. part of Repository Services 391).

A "contact" box may be a specialisation of a message box in order to provide reliable messaging using a remote service or storage service. Each contact box may be used for uni-directional messages between two agents/users. In this case, a bi-lateral relationship may require a pair of contact boxes, one in each direction. A pair of contact boxes may provide in-box/out-box functionality such that, between two agents, a contact box represents an in-box for one agent and an out-box for the other agent. Further restrictions may apply, for example agents may only read from their in-box and only write to and delete things in their out-box. Contact boxes may be similar to "1:1" box because there may be just one writer (the owner) and one reader (the recipient) to a contact box. Since messages placed in the contact boxes are protected by encryption, a contact box may be considered as a private (one-way) tunnel between two agents. Note that contact box pairs are logical and that physically they may be separated, for example, a user may store their "forward" contact boxes in their own storage service, thus accessing the "reverse" contact boxes would be via the storage service of the associated user.

In descriptions below, if message boxes (e.g. Contact Box 408, Contact Box 410 of FIGS. 4a and 4b) are provided by a remote service (e.g. Remote Services 370 of FIG. 3) then the terms "message box" and "contact box" may be used interchangeably (e.g. Contact Box 408).

2.6 Facility Services

Facility or system services (e.g. Facility Services 390) may optionally be used to facilitate the operation of end systems (e.g. End System 310, End System 350). In various embodiments of the present invention, agents (e.g. Agent 340) may have capabilities to perform facility services itself and/or in conjunction with other agents.

The facility services may be considered as logically centralised services but need not have any relationship to each other. For example they may be run on different machines and/or by different providers and/or at different locations and/or may be distributed and/or replicated. Any one or any combination of facility services may reside on a given computer and/or server and/or service. Communications between end systems (e.g. End System 310, End System 350) and the system services may use communications security such as Secure Sockets Layer (SSL) and/or Transport Layer Security (TLS), Online Certificate Status Protocol (OCSP) etc. Authentication with one or more of the facility services may use mutual authentication, such as mutual or client-side SSL/

TLS. If certificate-based authentication is used then appropriate revocation checks may be made e.g. at the time of authentication.

There are many possible facility services. In this specification they are grouped into repository, certificate and backup services, though this should not limit the scope of facility services of embodiments of the present application.

2.6.1 Repository Services

A repository service (e.g. Repository Services 391) may be used to augment remote services (e.g. Remote Services 370), to enhance the capabilities of agents and/or to ensure that rich functions such as management, notifications, billing, quotas, business rules, system events etc. are always provided regardless of the capabilities of the underlying remote service.

An agent (e.g. Agent 340) may interact with the repository service instead or as well as one or more remote services. An agent may use a repository service to act as a proxy for a remote service, so it doesn't have to deal directly with that remote service. An agent may use a repository service to limit or simplify the interactions with a remote service, for example, only deal with "low level" functions of a remote service such as storage and/or using "high level" functions from a repository such as resource management, notifications, meta-data services, messaging, accounting, billing, auditing etc. Agents may further build on repository services to provide their own higher level functions such as near real-time interactions, near real-time collaboration, on-demand synchronisation, streams etc.

From the agent point of view, this approach may make the agent relatively insulated from variations in the remote or storage services being used. For example, the repository services may provide a consistent approach to security, protocols, functionality etc. To do so, the repository services may maintain, control, manage and/or co-ordinate activity by instructing agents about how to interact with the remote services to provide appropriate information, parameters, directives etc.

From the remote service point of view, this approach may allow the remote service to remain relatively "blind" to or kept relatively "hidden" from users and their activity. It may also allow remote services to be relatively simple, such as allowing the use of storage services which provide little more functionality than a simple remote disk service.

A repository service may facilitate and/or maintain information about which storage data parts are in which box and where those associated storage data parts are located. For example, the location, relationships and other associated meta-data of data in a box.

A repository service may provide access information to agents. This may be to locate the service e.g. addresses, protocols, ports, etc. to authenticate to the service e.g. account details, login parameters, identifiers, references, tokens, etc. and/or to navigate the service e.g. content type, paths, filenames, permissions, authorisations, attribute certificate(s) or any other type of meta information.

A repository service may harmonising the meaning and/or effects of actions e.g. add, delete, update, create, rename, recover, change permissions etc. This includes the handling of the associated target object which may be a field, a file or folder or any other object or group of objects. A target may additionally have a path or other identifying representation.

A repository service may hide many of the details of the underlying remote services and/or data stores. For example, the repository service may manage distribution and/or replication, hide incompatibilities, facilitate seamless transition from one storage provider to another.

A repository service may allow splitting and/or aggregating views across storage services. For example, users may maintain their own storage service and therefore a "box" may be a view of each of the files provided by each user in that box. For example, if a first user stores a file, in their own storage service, a second user may download it from the first user's store. If the second user updates the file then the updated file may be stored in the second user's storage service. At this point the repository service may indicate where the latest version is and/or instruct the agent of the first user to delete their older version of the file in the first user's storage service.

A repository service may hide and/or manage the separation of encrypted content (e.g. Encrypted File 401) from the encrypted content key (ECK). This may allow agents to logically treat an upload (e.g. Upload 423, Store 427) and/or download (e.g. Download 433, Extract 437) as a single service. This may also allow other services such as box-to-box copy, as it would allow a download, re-encryption and upload of just the ECK, and then the repository to associate the new ECK and encrypted content with the new box.

A repository service may manage resource information about other system services (e.g. Facility Services 390) and/or remote services (e.g. Remote Services 370). Resource information may include functions such as statistics, auditing, usage, and associations e.g. between users, groups, files, workspace etc. It may further enforce policies such as quotas, accounts, reasonable use etc. The resource service may also collect events for the purpose of trends, analytics, reconciliation, compliance etc.

A repository service may manage system information about data stored in remote services. For example system information may include location, authentication, authorisation, identifiers, files, boxes, servers, location, access methods, addresses, sizes, types etc. In addition, the repository services may also manage and/or control information related to distribution, replication, backups, versions and other system information necessary for versioning, recovery, fail-over, fail-back and/or load-sharing.

A repository service may manage users. User information maintained may include name, email, telephone numbers, billing information and/or other account information. Users may be controlled by managing which functions they have access to and/or their status in the system. For example, a user may be suspended/un-suspended by settings/unsetting a status and/or by removing/re-instating access to a user's home box.

A repository service may provide a "console" to manage users, billing, resources, services, settings etc. User management may include mechanisms to revoke users, suspend/un-suspend users, change notification settings etc. Billing management may include mechanisms to change a user's name, account references, billing sponsor, telephone number etc. Resource management may include mechanisms to delete users, delete boxes etc. Service management may include mechanisms to add/delete services such as user's ability to create boxes, send messages etc. Configuration management may include mechanisms to set default key sizes, default certificate usages, default notifications, default templates etc.

A repository service may be used to notify end-users of events, alerts, warnings or other time sensitive information. Events may include changes to content, workspaces, memberships etc. Alerts may include pending invitations, pending contacts, pending administrative requests etc. Warnings may include pending resource limits, pending subscription renewals, pending certificate expiry etc. Notifications may be delivered in many forms and in many ways. Notifications may have a severity level. Notifications may be bunched together, such that if many events occur in a given time period, then a single notification containing relevant events included in that notification. Mandatory events may always be delivered, such as warning(s) or notice of policy change(s). Optional events may need to be subscribed in order to enable them, such as content changes. In-band events may be delivered to any online agent. Out-of-band events may be delivered externally, such as via email, Short Messaging Service (SMS), instant messaging etc.

A repository may be used for messaging, for example, as an alternative to message boxes (e.g. Message Boxes 383). This may be to add an extra level of access security and/or to reduce dependence on any particular remote service.

A repository service may limit access to information through the use of access controls and/or associated Attribute Certificates AC(s). An AC may be issued by a box owner granting certain privileges to that box. For example read, read/write, delegated administration, etc. An AC may include in the X.509 Holder field, an identifier for the SSL certificate or identity certificate to whom the authorisation relates. When used, ACs may be passed at the beginning of a session or may be provided at the time a request is made.

A repository service may be used for user audit, such as keeping a history of events for users and/or boxes. Events may include created, read, updated, deleted, restored, renamed, access granted, access withdrawn etc. Such events may include user and/or administrative operations for client boxes, shared boxes, sub-boxes etc. For example client access granted/removed, box created/deleted/renamed etc. The repository service may also retain events for boxes that have deleted. In implementation, deleted user box events may be associated with the owner and/or deleted sub-box events may be associated with the parent box.

A repository service may provide a system audit, for example, by maintaining a log of console activity and/or other deployment changes e.g. changes in configuration. The audit may be kept via a log file and/or by sending events to one or more boxes, which may be useful in order to leverage repository notifications.

A repository service may perform maintenance operations to ensure consistency with referenced data to data actually stored. Such maintenance may be periodic and/or performed in the background and/or be batch in nature. For example, repository services may check reference information matches actual information in the remote services and if different, may take actions such as removal of unattached blobs, removal of items marked as deleted and past their recovery date, check integrity of remote items against meta-data in the repository such as size, checksums etc.

A repository service may perform clean up actions for example periodically, in the background and/or in batch mode. Examples include removing expired messages from contact/message boxes, removing contact/message boxes that are empty and have no matching user, removal of old versions of files, etc.

A repository service may perform automated actions based on pre-defined policy and/or rules and/or schedules. Automated actions may include maintenance, clean-up, distribution, replication, backup an/or any other administrative function. Predefined policy and/or rules may be based on any one or any combination of frequency, file size, location, time of day, file type, on demand, workgroup category, version, time of day, on demand, type of content, expiry, etc.

A repository service may also be used to enforce policy and/or restrictions and/or other controls. For example, a library service may enable users to buy a certain number of documents and then download them as needed. The repository service may restrict any given user's download to a set number and/or set value and/or ensure that a given document is only downloaded by a single user. When such a limit is reached the repository service may make further files inaccessible. The repository may maintain an audit, for example, to reconcile activity with a user's account.

Other repository services may include commercial services such as accounting, billing, archive, hosting, tracking, auditing services etc.

2.6.2 Certificate Services

Certificate Services (e.g. Certificate Services 392) may perform certificate signing, revocation, renewal, temporary access and other certificate management functions. In other embodiments of the present invention, certificates may be self-generated and/or signed by other third parties and/or managed externally.

A certificate signing service may be used to sign certificates generated by an agent. Certificates may need to be signed on setup of an agent and/or may be re-issued or renewed after revocation or expiry. The signing service may use one or more trusted Certification Authority (CA) certificate(s) and/or Trust Anchor (TA) certificate(s) which is known by end systems (e.g. End System 310, End System 350) and/or other system services and/or remote services (e.g. Remote Services 370). Examples of certificates, which may be end-entity, CA or TA certificates, may include SSL certificates, signing certificates, encryption certificates, email certificates, system signing or registrar certificates, attribute certificates etc. There may also be certificates for system services such as a revocation service, a temporary access service etc. Because certificates may be distributed client-side, such as via agents, the certificate signing service may not need to publish any certificates that it signs, effectively making any issued certificate a private certificate. The certificate signing services may have policies, such as relating to settings, behaviours, restrictions and/or notifications. Settings may include rules about generating certificates such as key size, key usages, validity period, encryption algorithms etc. Behaviours may include rules about how the certificate signing service handles boundary cases such as whether to allow the renewal of expired certificates, whether to keep copies of issued certificates etc. Restrictions may include rules about what email addresses to allow or proof of identity is required. Notifications may include rules about what to send e.g. warning(s) about expiring certificates, when to send e.g. at decreasing periods as the expiry gets closer, how to send e.g. via email, SMS or other type of notification, etc.

A revocation service may be used to manage revocation of certificates. This service may be accessed via the Online Certificate Status Protocol (OCSP) service and/or make available a Certificate Revocation List (CRL). The location and/or access point of the revocation service may be specified within each certificate issued.

A temporary access service may be used in the case that client-side, for example SSL, certificates are required for short term access to a system service (e.g. Backup Services 393). This temporary access service may require authentication, such as a name and passphrase previously setup by an agent. The temporary access service may protect itself from passphrase guessing such as restricting the number of incorrect passphrase attempts (e.g. a maximum of five every twenty four hours), and/or introducing increasing delays for each successive incorrect passphrase attempt (with the delays being reset on a correct login or after a period of time). If the temporary access service uses an email address for the name, it may check that the user owns this email address by sending a token or link or other information to that email address for use in obtaining temporary access. If a user is revoked, then the temporary access for that user may be removed. Temporary access certificates may be short lived i.e. expire in a relatively short amount of time. The temporary access service may also be used to obtain random SSL certificates which may be endorsed via attribute certificates to facilitate anonymous access (further described below).

Other certificate services may include certificate management services, certificate billing services, smart card or other hardware issuing services, directory services etc.

2.6.3 Backup Services

Backup Services (e.g. Backup Services 393) may be used for backup and/or mobility such as access from multiple locations and/or multiple devices. Example of backup services include: credential backup services, hibernate services, passphrase assistance services and key escrow services.

A credential backup service may store encrypted credentials. The encrypted credentials may be in the form of an encrypted keystore containing those credentials and/or the credential backup service may also be known as a keystore backup service. The encrypted backup may include encrypted credentials as well as an encrypted passphrase blob (EPB). Such a backup may be encrypted with a passphrase and/or a derived passphrase and serve the purpose of providing credentials if they haven't been stored locally and/or if the credentials have been lost. Since retrieving a backup of credentials may mean that an agent can't use their issued SSL certificates, a temporary access certificate may need to be used (e.g. one of Certificate Services 392). The credential backup service may be implemented as boxes. Note that if a user connects, for example using their full SSL credentials, then the credential backup service may allow writing of new credentials. If a user connects with a temporary SSL certificate, then the credential backup service may enforce read-only access or other restricted. The credential backup service may be used in conjunction with an external authentication service. For example, the authentication service may be a Virtual Private Network (VPN) and/or the delivery of the credentials or encrypted credentials or keystore or encrypted keystore may use an authentication extension protocol such as Protected Access Credentials (PAC) extension.

A passphrase assistance service may provide a copy of a passphrase recovery code (PRC) via one or more emails and/or SMS and/or other means. The PRC may be encrypted with a code and the encrypted PRC and/or code sent in one or more messages e.g. the encrypted PRC via email and the code via SMS. This allows a user to copy and paste a relatively complex string from an email into the agent's user interface, but be able to enter a relatively simple string from another email and/or an SMS message. Note that this service may be relatively safe because obtaining the passphrase recovery code (PRC) may be useless without the corresponding encrypted passphrase blob (PRB) which is stored locally on the end-user's machine or in any manner accessible by the user or agent. Also, to detect attacks, the triggering of the passphrase assistance service may be logged and/or send notifications, such as to box owners and/or other users in boxes that the recovering user belongs.

A hibernate service may be used for home box information (e.g. Home Box 411, Home Box 412). For example, this may be to add an extra level of access security and/or to reduce dependence on any particular remote service. The hibernate service may allow multiple home boxes, for example that contain different types of home box information, and/or restrict access to certain items in each home box. Access may be restricted according to policy, for example location, time of day, possession of authorisation tokens, time since last access etc. For example, a user may be able to download all their home box (encrypted) keys if they are located in the US, but may only be able to download particular (encrypted) keys if they are located overseas.

A key escrow service may store copies of encryption private keys. Because of the seriousness of allowing private keys to exist outside a user's control, it is important that a number of associated safeguards are in place such as strong security, monitoring, auditing, procedures, independence etc (further described below). In operation, the key escrow service may require policies in the CA and/or agent, for example, the agent providing their private key encrypted with the escrow server's public key to the CA, the CA providing the user certificate and encrypted private key to the escrow service, the escrow service verifying the private key matches the user's public key, after which the CA may provide the encryption certificate back to the user. Note that justifying key escrow for backup reasons may not be necessary as embodiments of the present invention may have many mechanisms for recovery and to ensure the safety of encrypted content (further described below).

Other backup services may include backup facilities for the system services themselves, for example certificate backup services, replication services, distribution services etc.

3 OPERATION

This portion of the specification relates to overall operational aspects of embodiments of the present invention and makes references to FIGS. 3, 4a and 4b, especially FIGS. 4a and 4b which illustrates a number of management layers.

In practice, any one or any combination of the details described and/or illustrated may actually be implemented. It is important to note that operations may be primarily performed client-side, such as by an agent (e.g. Agent 340), and that central services may have a minimal role of providing facilities (e.g. Facility Services 390) and remote services (e.g. Remote Services 370).

3.1 Storage Tier

The purpose of a storage tier (e.g. Storage Tier 400) may be to manage storage data parts (e.g. Storage Data 372). For example, to store and/or retrieve content that may be useful for users and/or agents. The storage tier may consist of one or more data stores and/or applications that store data and/or any other digital information.

The storage tier may also include messaging means, in which case, any one or any combination of message boxes (e.g. Contact Box 408, Contact Box 410) may be part of a messaging system.

The storage tier may include local storage (e.g. Content Store 320, Agent Store 330).

Preferably, content stored in the storage tier is encrypted. This approach may enhance the security and/or privacy of the system. For example, storing encrypted data may prevent data leaks, unauthorised access or abuse by any intermediate storage provider. This approach may also ensure that the storage provider is relatively "blind" to who is interacting and/or what is being stored and/or exchanged. Note, in practice, any number of storage means and/or providers may be used.

It is important to note that the storage tier may be little more than a "remote disk" or "remote buffer" and may be relatively simple. For example, the storage services need not necessarily be required to perform higher level functions such as user management, notifications, data management etc. especially if used in conjunction with a repository service.

Parts of the storage tier may also be embedded in applications, such as fields in a management application and/or records in a database application and/or entries in a customer relationship system and/or transactions in an interactive application and/or any other application involving storage or transport means.

3.1.1 Box Data

Storage data (e.g. Storage Data 372) may be stored in parts. Storage data parts may include encrypted content, encrypted associated key(s), and/or other data. Collections of storage data parts may be organised into logical collections called boxes. Box data may include any one or any combination of storage data part(s).

Box data may comprise encrypted content and/or a digital signature and/or an encrypted wrapping key (EWK) and/or other meta-data. The box data may be in a standard format such as Cryptographic Message Syntax (CMS) in order to provide a standard way to sign and/or encrypt the box data and/or associated meta-data. The box data may include the signing certificate of the originator, in case the recipient is not in direct contact with the originator. Meta-data may include descriptive and/or identification information such as size, filename, path, algorithms, authors, recipients, certificates, checksums, versions, etc. If a EWK is used, then the EWK may be stored separately from the encrypted content.

3.1.2 Box Data Signing

Box data may be signed (e.g. Sign 424, Sign 443, Sign 446, Sign 464, Sign 476). If the box data is compressed then the compressed form may be signed (e.g. Sign 424). Any appropriate signing key (e.g. one of Private Keys 482) and/or message authentication code (MAC) may be used to sign the payload. For example:

The owner's signing private key may be used to sign data being stored in a user box (e.g. User Boxes 381, Shared Box 402) or an agent box (e.g. Agent Boxes 382, Shadow Box 404, Home Box 411).

The owner's registrar private key may be used to sign data being stored in a message box (e.g. Message Boxes 383, Contact Box 408, Contact Box 410).

Having different signing keys for message data may be advantageous to ensure that user/agent data cannot be accidentally or maliciously be interpreted as a control message.

Box data may include one or more signing certificates of the originator. In a preferred embodiment, user signing certificates should be included with user data so that recipients may verify the signature of the originator even if the recipient does not have the required certificate, for example, they have not made contact, the signing was done with an old or revoked certificate etc. In a preferred embodiment, system signing certificates or registrar certificates should not be included in message data, for example to ensure that messages are current and/or authentic etc.

3.1.3 Box Data Encryption

Box data may be encrypted (e.g. Encrypt 426, Encrypt 444, Encrypt 447, Encrypt 463, Encrypt 475, Encrypt 484, Encrypt 494). Encryption may encompass box data that is compressed and/or signed.

The box data may be directly encrypted using a primary key or may be indirectly encrypted by generating and using a secondary wrapping (e.g. Wrap 425, Wrap 435). The wrapping key, may be random and/or unique and/or one-time and/or a symmetric key. The wrapping key may be encrypted with the primary key (known as a Key Encryption Key, KEK) to form an encrypted wrapping key (EWK) and may be appended to the encrypted box data or stored (e.g. Store 427) separately (e.g. Shadow Box 404).

Primary keys used to encrypt box data payload, either directly or indirectly, may be any one or any combination of the following forms:

A password, passphrase, code etc. (e.g. Encrypt 463).

A box key, shared key, workspace key, community key etc. (e.g. Encrypt 426, Encrypt 444).

A recipient's encryption certificate (e.g. Encrypt 447, Encrypt 475) tasks (e.g. Invite Task 405, Accept Contact Task 409).

An owner's encryption certificate (e.g. Encrypt 484, Encrypt 494).

3.2 Sharing Layer

The purpose of a sharing layer (e.g. Sharing Layer 420) may be to manage collaboration and/or storing and/or sharing of data between users and/or applications and/or agents. Note that though examples may describe "users", they equally apply to automated "applications" and so the term "user" should also be read as "application" as appropriate.

Shared data may be compressed and/or digitally signed and/or encrypted and/or be structured in a standard form such as CMS.

It is important to note that sharing management may primarily be performed and controlled client-side, such as by an agent (e.g. Agent 340). The agent may interact with other system services (e.g. Facility Services 390) and/or remote services (e.g. Remote Services 370). In other embodiments of the present invention, sharing may be achieved via different means, such as direct connection, peer-to-peer, physical delivery etc.

A repository service (e.g. Repository Services 391) may be used to manage and/or assist in the management of shared data. For example, a repository service may maintain storage related information such as the names of files, their sizes, permissions, locations, access methods, authorised users etc.

An agent and/or repository service may organise data into partitions or "boxes" and may restrict access to these boxes to authorised users only. Boxes may comprise data encrypted with the same box key.

3.2.1 Sharing Control

The sharing layer may make use of a repository service (e.g. Repository Services 391) and/or one or more underlying remote or storage services. The agent may interact directly with the repository service for management and control functions and/or separately with the remote service for the actual storing and/or retrieving of data. This may allow the repository services to look after most higher level functions, such as security, versioning, access control, privileges, naming, recovery, backup etc while the remote service(s) may look after simpler storage related functions such as add, delete, append, upload, download, delete, rename etc. This may allow the storage services to be relatively simple and/or reduce dependence on a particular remote service or storage service or technology.

Note that fine grained management details about user boxes (e.g. User Boxes 381, Shared Box 402) may be stored in associated encrypted meta-data (e.g. Meta-data 403). This means that agents need not necessarily be highly dependent on repository services. In this case, repository services may provide a co-ordination function, such as where data is located and how to get to it, with agents taking care of particular details, such as interpreting the files stored in the box, the keys and/or permits, the relationship to other boxes e.g. sub-boxes etc.

3.2.2 Content Sharing

A first user (e.g. User1, 301, User1 441) or application (e.g. Applications 312) may use an associated first agent (e.g. Agent 340) to store content (e.g. Content 311, File 421).

Content may be compressed (e.g. Compress 422). Compression may be beneficial when the payload is relatively large and/or it is not already in a compressed form e.g. file formats for archives, publishing documents, pictures, audio, video etc.

Content may be signed (e.g. Sign 424) such as with the user's signing private key (e.g. one of Private Keys 482). If content is a stream, then Message Authentication Codes (MACs) may be inserted into the content. The user's signing certificate may be included in the content (e.g. Encrypted File 401), for example if the content is associated with a CMS format.

The content may be encrypted (e.g. Encrypt 426) preferably using a wrapping key or content key (e.g. Wrap 425). The content key may be encrypted by a box key (e.g. from Permit 442). The encrypted content key (ECK) may be appended or prepended to the encrypted content or be stored separately e.g. added (e.g. Store 427) to the meta-data (e.g. Meta-data 403). In other embodiments of the present invention the encryption of the content and/or the content key may be performed using any other suitable key, such as a community key (e.g. Community Key 445) or box key or a certificate.

The encrypted content (e.g. Encrypted File 401) may be uploaded (e.g. Upload 423) to a remote service (e.g. Remote Services 370). The first agent may use a repository service to obtain information about which remote service to use and/or notify other users that content has been uploaded. A reference to the encrypted content may be as simple as a Uniform Resource Identifier (URI) or Uniform Resource Locator (URL) for example to a public area of a "cloud" or other remote service.

A second user (e.g. User2 302, User2 451) or application associated with the second end system (e.g. End System 350) may use an associated second agent to download (e.g. Download 433) content (e.g. Encrypted File 401) from the remote service. The second agent may use a repository service (e.g. Repository Services 391) to obtain the location and other necessary information for accessing the remote service.

If the second agent has appropriate keys (e.g. Permit 452), then it may decrypt the downloaded content. This may involve decrypting an ECK (e.g. Wrap 435) and then using the content key to decrypt the content. Note that the ECK may be extracted (e.g. Extract 437) from meta-data (e.g. Meta-data 403) which may be stored in the shared box together with the encrypted content (e.g. Shared Box 402) and/or a separate box (e.g. Shadow Box 404). In other embodiments of the present invention the decryption of the content and/or the ECK may be performed using a key associated with the original encryption e.g. a community key (e.g. Community Key 445) or box key or a certificate. Note that decryption may be deferred until the associated key is available, for example, if the owner delays the release of keys such as to ensure all members gain access to the content at the same time.

If the content is signed, then the second agent may check (e.g. Check 434) the signature and/or revocation status. The signature may be checked against a signing certificate (e.g. one of Contact Certificates 472) of the sender or a signing certificate provided with the content, such as associated with a CMS format. Revocation may be checked using a certificate service (e.g. Certificate Services 392) for example via OCSP. If a signing certificate has been revoked and/or has expired, then the agent may check if the signature was valid before the date of the revocation and/or expiration. Preferably, this would only occur if the revocation was not with prejudice and the certificate made use of an authoritative time, such as a timestamp signed by a Time Stamping Authority (TSA). If content is a stream, then Message Authentication Codes (MACs) may be checked.

If the content is compressed, then it may be decompressed (e.g. Decompress 432) to obtain the content (e.g. File 431).

3.2.3 Content Sharing with at-Rest Content Encryption

If at-rest content encryption is being used then content (e.g. Content 311) may be stored locally as encrypted content (e.g. Content Data 321). Access to encrypted content, such as by a user (e.g. User1 301) or applications (e.g. Applications 312), may be via a virtual file system (e.g. VFS 313) and/or an agent (e.g. Agent 340). The VFS and/or agent may use "on-the-fly" or real-time cryptography to decrypt on reading and encrypt on writing.

After download, decryption and un-compression as necessary, the content may be re-encrypted (e.g. Content Data 321). The re-encryption may involve different parts for content, signature and other meta-data. Such parts may be stored in files and/or in a local database (e.g. Agent Data 331). For example, encryption may be in three parts:

encrypted content using a first key
encrypted signature using a second key
encrypted meta-data using a third key.

Re-encrypting the content may allow random read/writes to the file using an appropriate cipher. If a file is re-encrypted, then it may be named using a random string to prevent "leakage" of information from the filename. The named file may encode information, such as a unique ID used by a repository service (e.g. Repository Services 391) to facilitate recovery and/or synchronisation, for example if associated meta-data or database records are lost and needs rebuilding.

The encrypted signature may allow for the checking of integrity and/or authenticity. Because a file may be opened and closed locally many times, an efficient signature mechanism may be used such as a Hash-based Message Authentication Code (HMAC). Anytime a file is opened and closed the HMAC may need to be recalculated, though an optimisation may be to allow changes to accumulate over a given period of time before (re-)calculating the HMAC. If a downloaded file is opened for read/write or write, then the signature may be removed and replaced with a HMAC.

The encrypted meta-data may contain the first and second keys as well as other control information, such as a Unique Identifier (UID), filename or any other necessary information. The first key may be the same as the second key. The third key may be a local key such as a volume key protected by the user's credentials or a local box key or meta-data key for the associated box. If a local key or volume key is used, then it may be backed up as meta-data (e.g. Meta-data 403). This backup enables another member of the box to provide a user who was revoked or lost their credentials with their volume key in order to recover any documents encrypted on their local machine that had not been shared at the time of credential loss.

The upload process may be similar to the one described above, except that the step involving file encryption and/or signing may be skipped as this may have already occurred at-rest, for example on-disk. The encrypted control file may be updated with new meta-data that may be provided by the repository service. Preferably, a file that has uploaded successfully may appear to be the same as a downloaded one. Upload may need to be manually approved by a user if it is digitally signed.

Automatic upload and/or download, or auto-sync, may be controlled by a policy. Preferably any policies in place are approved by the user. Such a policy may include predetermined criteria such as controlling upload/download based on time of day, file size, link stability, idle time, frequency, time of day, on demand, workgroup category etc.

3.2.4 Shared Application Data

Applications (e.g. Applications 312) may use shared boxes (e.g. User Boxes 381) to manage shared data on behalf of users. The use of shared boxes may facilitate an application to operate in a distributed and/or collaborative way.

Applications may store structured data such as spreadsheets, databases, records or any other single or collection of objects. For example, a password application may store individual items in different files and/or boxes so as to manage access to different fields by different people. More generally, collaboration applications, such as electronic messaging, instant messaging, forums etc, may be built where each element may be stored in different files and/or boxes to manage access by different groups.

3.2.5 Shared Agent Data

Agents may use shared boxes (e.g. Agent Boxes 382) to share agent data on behalf of users or applications. Note that the use of a shared box for agent system data may be advantageous to keep remote services "blind" from activities of agents and/or from interfering with the co-ordination and/or other system information exchanges between agents.

If the agent is managing meta-data associated with a shared box, then the agent may store the meta-data (e.g. Meta-data 403) in a shared box (e.g. Shared Box 402) and/or in an associated box such as a meta-data box (e.g. Shadow Box 404). In either case, the shared box or the meta-data box may be organised into "slots" and/or a queue, for example, one for each user. This may be useful, for example, to manage concurrent writes by multiple users, to allow versioning of permits, to distribute client or managed-user credentials especially with multiple privileged members or delegated administrators etc.

If the agent is managing data on behalf of users or applications then the agent may manage its own agent box. For example: the creation and management of passphrase-recovery box and/or a revocation-custodial box. A user may still invite/un-invite other trusted users, but the contents of the box(s) may be hidden from users and managed by the agent. (Further description about Keystore Passphrase Recovery and Credential Revocation Messages are covered below in the Credentials Layer section.)

3.2.6 Shared Content Management

Agents may use shared meta-data (e.g. Meta-data 403) to facilitate content management. A number of examples follow.

Agents may facilitate search. For example, by storing and/or maintaining an index file, e.g. with keywords, for content they upload. Users within the box, may download such index files, decrypt them and use them to search for information within the box.

Agents may facilitate annotations, For example, by storing and/or maintaining an associated commentary file when they upload. Such annotations may be attached to files and/or recent actions and/or the box itself. Annotations may range from simple comments to more complex things, such as instructions and/or workflow commands.

Agents may facilitate versioning. For example, by storing and/or maintaining update histories when content is uploaded. This may be used so to manage multiple copies or co-ordinate activities on content.

Agents may facilitate locking. For example, by using a lock file to help manage concurrent editing of files.

Agents may facilitate read-receipts. For example, if agents use meta-data to sign-off that they have downloaded and/or read a given piece of content. This may be useful for applications that implement reliable-messaging and/or non-repudiation services.

Agents may facilitate distributed storage. For example, users may each choose their own remote service or storage provider for reasons such as geography, performance, service level agreements (SLAs), cost or other reasons. In particular, users with their own storage services may have the restriction that only themselves can write to that storage service with others just having read-only access. In this case, repository services may present a "box" as a logical view of the sum of shared information from each of the user's selected storage provider. In addition, agents may need to co-operate such that if a user updates a file in their own area, the agent responsible for the previous version of the file may need to delete it from that agent's own area.

Agents may facilitate navigation. For example, by presenting hierarchies of folders.

Agents may facilitate file recognition. For example, by storing visual representations of files and/or documents such as thumbnails, icons, labels and/or other attributes such as files size, type, application, keywords, privileges etc.

3.3 Control Layer

The purpose of a control layer (e.g. Control Layer 440) may be to allow agent-to-agent interactions (e.g. Protocols 360). For example, to allow tasks to be securely and privately exchanged between agents and/or users and/or applications. The control layer may be used to convey capabilities, keys, certificates, authorisations, Attribute Certificates (ACs), delegated privileges, permits etc. The control layer may also enable decentralised management between agents such as key management, box management, box invitations, key recovery, box ownership changes etc.

It is important to note that control interactions may primarily be performed and managed client-side, such as by an agent(s) (e.g. Agent 340). The agent may interact with other system services (e.g. Facility Services 390) and/or remote services (e.g. Remote Services 370). The control layer may make use of message boxes (e.g. Message Boxes 383) and/or meta-data boxes (e.g. Shadow Box 404) for facilitating agent-to-agent interactions. In other embodiments of the present invention, interaction between agents may be achieved via different means, such as via email, messaging, peer-to-peer or other transport systems.

The control layer may be secured using certificates exchanged in the trust layer (e.g. Trust Layer 460). In this way, agents may have a highly secure and private tunnel protected by asymmetric cryptography such as Public Key Cryptography (PKC) for communicating between each other. The control layer may also be called a channel, path, tunnel or private communications means. The control layer may also be secured by other means, such as peer-to-peer, direct connections, SSL connection etc.

Applications may have their own control layer. For example, if the agent manages certificates in an operating system or application system certificate store (e.g. Certificate Store 314) then this may enable applications (e.g. Applications 312) with their own control layer and associated protocols and/or messaging system to communicate with other associated applications e.g. Secure/Multipurpose Internet Mail Extensions (S/MIME) for email, Extensible Messaging and Presence Protocol (XMPP) for collaboration, etc.

3.3.1 Task Interchange

Control messages or "tasks" may be conveyed using a message box and/or task box and/or "contact" box (e.g. one of Message Boxes 383) and/or any other suitable messaging means. A remote service (e.g. Remote Services 370) and/or repository service (e.g. Repository Services 391) may restrict access to contact boxes according to whether users are registered, for example, via the use of SSL certificates. The service may further restrict user's ability to read or write tasks, for example to only read/write to appropriate "slots" and/or a queue or write tasks to an appropriate out-box and/or read tasks from an appropriate in-box.

There may be a single task pool and/or a pool for each user and/or a pair of slots or contact boxes for each pair of relationships. In the case of a pool for each user, a given user may be the only one able to read or delete from their own pool, but may be able to write to any other pool. In the case of pairs of contact boxes, an in-box for one user may be the out-box for another user and vice versa for the corresponding contact box pair.

An agent may use any one or any combination of means to write tasks to a contact box. For example, the agent might directly write to the remote service (e.g. Remote Services 370) and/or write via a repository service (e.g. Repository Services 391). When a task appears in a contact box, a notify service (e.g. one of Repository Services 391) may notify the recipient of the arrival of a task, such as via email or desktop pop-up or in-band notification. If a task has multiple recipients, the task may be copied to multiple in-boxes.

Remote services and/or repository services may ensure that access by users is only for their particular in-box. For example: by using SSL mutual authentication. Contact boxes (e.g. Message Boxes 383) may be implemented in many forms, for example using files, a database, a messaging system, a queuing system etc.

Tasks may be signed, for example using the registrar private key of the sending user. The receiving user may check the signature, for example, against the registrar certificate of the sending user. The receiving user may also check for revocation of the sending user, for example using a revocation service (e.g. part of Certificate Services 392).

Tasks may be encrypted. Encryption may use an encryption credential of the intended recipient or Password Based Encryption (PBE). Encryption may use a transitory wrapping key.

3.3.2 Shared Box Creation

A conceptual area for sharing information may be known as a workspace or shared box (e.g. Shared Box 402). A user and/or application via their agent who creates the workspace may be known as the owner (e.g. User1 441). An owner may invite other people (e.g. User2 451) to the workspace using an "invitation" process.

Note an important aspect of workspace management is key management, for example the creation of keys when a workspace is created, the transference of keys on invitation, the rotating of keys on un-invite etc. Preferably, such keys may be unique and/or symmetric keys.

To setup a shared box, the owner may perform one or any combination of the following:

Generate a community key (e.g. Community Key 445).
Generate a box key.
Generate a permit (e.g. Permit 442) from which a box key may be obtained, for example, because the permit contains the box key or because the permit contains a map or other mechanism from which the box key may be derived.
Create a meta-data box (e.g. Shadow Box 404), for example, if the meta-data (e.g. Meta-data 403) isn't being passed via contact boxes or stored in the shared box.
Create a shared box (e.g. Shared Box 402) for example, via instruction to a repository service and/or remote service.

3.3.3 Invitations

The owner may invite the second user to the box by sending them a box key and/or permit and/or community key, for example contained in an invite task (e.g. Invite Task 405). The invite task may be signed (e.g. Sign 446) such as with the user's registrar private key (e.g. one of Private Keys 482). The task may be encrypted (e.g. Encrypt 447) such as using an encryption certificate from the second user (e.g. one of Contact Certificates 462). The task may be encrypted via a wrapping key. The encrypted task may be uploaded to a contact box (e.g. Contact Box 408). The repository service may notify the recipient (e.g. User2 302, User2 451) that an item is in their contact box.

The recipient user and/or application may use an associated agent to download the invite task from the remote or storage service and extract its contents. The recipient's agent may use a repository service (e.g. Repository Services 391) to obtain the location and other necessary information for accessing the remote or storage service.

The recipient's agent may decrypt (e.g. Decrypt 457) the invite task, for example using their encryption private key (e.g. one of Private Keys 492), to obtain the community key (e.g. Community Key 455) and/or the permit (e.g. Permit 442), for example, using the recipient's encryption private key (e.g. One of Private Keys 492). This may involve decrypting a wrapping key and then using the wrapping key to decrypt the task. If the task is signed, then the recipient's agent may check the signature and/or revocation status (e.g. Check 456). The signature may be checked using a signing certificate (e.g. one of Contact Certificates 472) of the sender. Revocation may be checked using a certificate service (e.g. Certificate Services 392) for example via OCSP.

The recipient's agent may store the box key and/or community key and/or permit in their home box (e.g. Home Box 412), preferably encrypted, such as with the recipient's personal encryption certificate (e.g. one of Personal Certificates 493) and/or via a home-box key.

3.3.4 Un-Invite

A "community" may represent the set of users and/or applications (e.g. A, B and C) sharing one or more resources (e.g. in Shared Box 402). The owner (e.g. A) may have distributed community keys (e.g. Community Key 445) or permits (e.g. Permit 442) to the other users (e.g. B and C). If the owner needs to "un-invite" a user (e.g. B) then since they can't "take back" the community key or box key, then a new key may be needed so that all future encryptions are safe from the un-invited user. Generating the new key and distributing it may be known as key rotation.

In a relatively simple embodiment of the present invention, the community key (e.g. Community Key 445) may be used to encrypt (e.g. Encrypt 426) content. If the community key is rotated, then this may require the re-encryption of previously stored content.

In another embodiment of the present invention, another layer of keys may be introduced such as a "permit" which may be encrypted. A permit (e.g. Permit 442) may contain one or more box keys used to encrypt the content. When the community key is rolled over, a new box key may also be created and added to the permit. In this case, new content may be encrypted with the latest box key and/or old content may be decrypted using previous box keys.

A user may "un-invite" themselves from a box (leave the box) in which case they inform the owner and the owner rolls over the box keys i.e. distributes new keys/permits to the other users.

In the case that a user is un-invited from a managed-user box i.e. the parent box of a set of client boxes, then the keys of both the parent box and client boxes may need to be rotated.

3.3.5 Permits

A permit may be used to obtain keys necessary to decrypt shared data. Keys may be directly stored in a permit and/or may be indirectly stored using a random map from which the keys can be derived. Storing multiple keys in a permit may be advantageous if box keys are rotated as having a history and/or version of box keys may avoid having to re-encrypt keys used to encrypt existing content. Using a random map may be advantageous to provide key material, for example if the end system has difficulty generating cryptographically strong random numbers.

Permits may be distributed to other users associated with a shared box directly via contact boxes and/or indirectly via a shared location. Using a shared location (e.g. Shadow Box 404) may be better adapted to "broadcast" the new permit and may have advantages such as reducing the number of messages being sent via contact boxes and/or avoiding "race" conditions, for example, by ensuring that each invited user has, or has the ability to obtain, the latest permit.

The owner may store the permit and/or other relevant box information as meta-data (e.g. Meta-data 403). The meta-data may be signed (e.g. Sign 443) such as with the owner's registrar private key (e.g. one of Private Keys 482). The meta-data may be encrypted (e.g. Encrypt 444) such as using the community key and/or using a wrapping key and/or using a certificate (e.g. Certificates 462). The encrypted meta-data may be uploaded to the shared box (e.g. Shared Box 402) and/or to a meta-data box (e.g. Shadow Box 404).

A recipient may retrieve a permit and/or other relevant box information from a contact box (e.g. Contact Box 408), from a meta-data box (e.g. Shadow Box 404) and/or the shared box (e.g. Shared Box 402). The recipient may be able to decrypt (e.g. Decrypt 454) the task that contains the permit, via a wrapping key if used, and may check (e.g. Check 453) the signature for validity and/or revocation.

An agent may discard permits that are no-longer in use, such as associated with a deleted box or a box the user no-longer has access to such as being uninvited. In any one or any combination of these cases, the trigger to remove a permit may be a task from another agent and/or a message from a repository service (e.g. Repository Services 391).

3.3.6 Transactions

A sequence of tasks may form a transaction. A transaction may have an end message, for example, a confirmation message or declined message.

Preferably transactions should be recoverable. For example a missing message needs to be re-stored or an extra message may be safely deleted (cleaned-up). In this way, transactions may have an idempotent property.

A completed transaction may be indicated by a confirmation message. A lone confirmation message may be cleaned-up.

A transaction may be aborted using a declined message. A declined message indicates that the other user no longer wishes to participate in a conversation. These can arrive at any time and should result in the originating user removing whatever message was declined from their out-box. A lone declined message may be cleaned-up.

Transactions may be at the trust layer (e.g. Trust Layer 460) and/or the control layer (e.g. Control Layer 440).

3.3.7 Decentralised Management

Transactions, or more generally agent protocols, may allow agents to perform decentralised management. This is because transactions, together with end-to-end encryption, may allow agents to interact in a peer-oriented manner with little, if any, participation in the management activity from intermediate services.

There may be a large number of different transactions due to the broad applicability of embodiments of the present invention (as previously noted). In overview, transactions may be single step, two steps, multi-step, or complex.

Examples of single step transactions include:
Invitations—A sends Invite (with box key) to B, B sends Confirm or Decline
Permit Update—A sends Permit Update (with permit, certificates) to B.
Client Update—A sends Client Update (with permit, credentials) to B
Certificate Update—A sends Certificate Update (with certificates) to B Examples of two-step transactions include:
Make Contact—A sends Make Contact (with A's certificates) to B, B sends Accept Contact (with B's certificates) to A
Contact Update—A sends Contact Update (with A's certificates) to B, B sends Accept Contact (with B's certificates) to A
Make Contact with invitation—A sends Make Contact (with A's certificates, box key) to B, B sends Accept Contact (with B's certificates) to A
Box Update—A sends Box Update (box id), B sends Permit Update (with box id's permit) or B sends Client update (with permit, credentials)

Examples of multi-step transactions include:
Delayed invitations—A sends Invite to B, B sends Accept Invite to A, A sends Confirm (with box key) to B
Invite with sub-boxes—A sends Invite (with box key) to B, B sends Accept Invite to A, A sends Client Update (with sub-box credentials) to B for every sub-box and/or client.
Delayed invite with sub-boxes—A sends Invite to B, B sends Accept Invite to A, A sends Confirm (with box key) to B and also sends Sub-box Update (with sub-box credentials) to B for every sub-box and/or client.
Make contact with delayed invitation—A sends Make Contact (with A's certificates) to B, B sends Accept Contact (with B's certificates) to A, A sends Confirm (with box key) to B Examples of complex transactions include:
Change owner—A requests token from repository service, A sends Change Owner (with encrypted token) to B, B sends Change Ownership Accept using out-of-band code from A to decrypt encrypted token, B sends Change Owner (with token) to repository service, B sends Confirm Change Owner to A, A may send Confirm Change Owner to repository service In addition any of these transactions may have variations. Examples of such variations are given in the following sections.

3.3.8 Key Management

In prior art, key management may be centralised, such as in a key server. In this case, there may be one or many administrators who have significant power and/or control over the operation of the key server and/or the management of the keys. This centralised power may have many, and sometimes severe, associated security risks and impact the level of privacy of users.

In embodiments of the present invention, decentralised key management may be achieved by realising that agents themselves can be an authority of keys. This is because agents may perform most key management processing client-side in a decentralised fashion, especially the generation, distribution, and rollover of keys.

In operation, an agent may extend transactions and/or perform other relevant processing in order to provide decentralised key management. For example, any one or any combination of the following may be performed:

- Collections of keys may be maintained. A collection of box keys may be known as a permit. In particular, previous box keys may be included in the permit so that data encrypted using the old box keys can still be decrypted.
- When a user is un-invited, the box key may be rotated and added to a new permit which is then distributed to the remaining members.
- If a user is un-invited or revoked from a parent box e.g. managed-user box, then the keys of each of the sub-boxes e.g. client-boxes may be rotated.
- Usually, invites and un-invites may only be issued by the owner. However, the owner may delegate invite and/or un-invite privileges to other members in that box. Also, a user may be able to un-invite themselves e.g. by requesting an un-invite to the owner.
- When a user is revoked, box keys may be rotated for each box they were a part of. This may involve each owner and/or delegated administrator and/or privileged member distributing new permits and/or community key to other users in each box that the revoked user is no longer a part of.
- Keys may have a lifetime, for example defined by policy. If keys exceed this lifetime then they may be rotated. Triggers for rotation may include time since created, time since last used, number of uses, location, changes in delegation, detection of duress etc.
- If an owner has been revoked, any member of a box may be allowed to re-invite back the owner.
- If an invitation is combined with a make contact request, then sub-box messages may be encrypted with a temporary key, which may be included in the initial make contact message.
- Multiple invites may be sent to a user who has not yet registered or has not yet accepted a contact request. In this case, an additional key may be included in the make contact message and used to encrypt any invites that were made after the initial make contact request, but before it has been responded to.
- Content may be made available before distributing keys. That is, the distribution or publishing of keys, for example a permit, may occur after content has been made available. This may be for applications that need to synchronise the access of material at the same time, for example exams, tenders, entertainment etc.
- Permits may be discarded when no longer required. This may involve deleting a permit from a user's home box. For example, if a user is uninvited from a box, the user voluntarily leaves a box, if a box is deleted etc. The trigger for removing a permit may be a task from another agent and/or a message from a repository service.

3.3.9 Certificate Management

In prior art, certificate management may be centralised, such as in a PKI or corporate infrastructure. In this case, there may be one or many administrators who have relatively significant power and/or control over the life-cycle of certificates and/or associated infrastructure such as a user directory. This centralised power may pose significant security risks and/or may reduce the level of privacy of users.

In embodiments of the present invention, decentralised certificate management may be achieved by realising that agents themselves can be an authority for the life-cycle of certificates. This is because most of the life-cycle of certificates may be performed client-side, especially the obtaining, distribution, and renewal of certificates. As such, agents may treat their own certificates as private certificates and choose to only distribute them as required to trusted contacts. The centralised role of certificate services (e.g. Certificate Services 392) may be largely reduced to signing certificates and providing a revocation facility.

In operation, an agent may extend transactions and/or perform other relevant processing in order to provide decentralised certificate life-cycle management. For example, any one or any combination of the following may be performed:

- Signing certificates may be sent along with any message, task or confirmation, for example, in case signing certificates are in the process of being renewed. Preferably messages are signed using a registrar credential.
- Data or messages may contain multiple signatures, for example, if certificates are being renewed or rolled over. Thus, a receiver may need to check for any signature that matches any appropriate certificate that it possesses and/or were contained in the data or message.
- Certificate Updates may be initiated (pushed) to multiple agents. For example, if rolling over certificate(s) in the case they've been renewed or refreshing certificates in the case an agent wants to ensure contacts have the latest certificates. The process of Certificate Update task may involve sending certificate(s) to one or more or all contacts that the agent has. The Certificate Update task may include more than one certificate, for example, signing, encryption, email, and/or registrar certificates.
- Certificate Updates may be requested (pulled) by agents, especially if the agent suspects that it does not have the latest certificate(s) from another agent. For example, in the case that an agent receives a task for which it does not have a certificate which can validate any of the signatures. As another example, if the signature used to verify a message had a lower serial number than the highest one actually used in the message.
- When receiving a Certificate Update, an agent may store the new certificates in their home box. The agent may first check that the certificate update is, in fact, newer than that which is already stored, for example, by checking issuer and serial numbers and/or issuance dates. The check may be based on information in the associated registrar certificate. The information written to the home box may be in an encrypted form, for example, by using the agent's encryption certificate or home box key.
- If a privileged user invites a user to a box to which the owner has not directly made contact with, then an exchange of certificates between the owner and the invited user may occur e.g. via the delegated administrator and/or privileged member passing between the owner and/or invited user the other's certificates and/or triggering, such as via a message, to one or both of the owner and/or invited user the need to exchange certificates.
- A change owner transaction may have additional checks, such as to check that the target party is in the box and has direct contacts with each of the people in the box. This may be to ensure that the new owner has appropriate certificates for users of the box.
- If a user renews their certificate(s), the Certificate Update task may be signed using the expiring registrar certificate. The signing provides the new credentials with their "cryptographic provenance". Once an agent accepts the new certificate(s), for example after checking signatures, revocation and/or user approval, the agent may replace the old certificate(s) with the corresponding new ones in its list of contacts and/or store them in its home box.

If a box owner or delegated administrator or privileged member requests certificates for a client box, then the Certification Signing Request (CSR) may be signed by the box owner or delegated administrator's or privileged member's registrar certificate.

If an owner endorsed a temporary SSL certificate of a member using an attribute certificate and the member is subsequently un-invited then the owner may revoke the attribute certificate, for example, by advising an OCSP server.

If client credentials need to be created, then the owner or delegated administrator or privileged member creating the client may use their registrar credentials to sign the certificate request. The number of certificates requested may be less than that required for a full user, for example, it may not be necessary to request a registrar and/or email certificate for a client or managed-user.

If client certificates need to be renewed, then the owner or delegated administrator or privileged member may distribute the new credentials (pairs of private key and renewed certificate) to the other parent box users e.g. directly or via a meta box, and/or leave a message in the client's home box indicating that new credentials are available. After login, the client may then read the new credentials, save them to credential backup and/or delete the old credentials.

If a client is deleted then that client's box may be deleted or marked as deleted. In addition, the client may be revoked which may involve and/or cause any associated boxes to be deleted, such as their home box and/or their credential backup box, as well as any associated authorisations.

A delayed invitation may involve a double check on confirmation that a user really wants to invite them to a passphrase-recovery box and/or a revocation-custodial box.

3.3.10 Access Management

In prior art, access management may be centralised, such as being enforced in an operating system and/or application. In this case, there may be one or many few administrators who have significant power and/or control over the policies of the operating system and/or application which is enforcing access to the data being protected. Typically, such access policies consist of Access Control Lists (ACLs) defining "who" has access to "what". However, this centralised approach may have significant security and/or privacy risks, for example because of the potential for administrators to abuse such power, the concentration of power as a target for attackers, the possibility of administrators making mistakes etc.

In embodiments of the present invention, decentralised access management may be achieved by realising that agents can protect data (the "what") using encryption and control access through the distribution of keys (the "who"). This is possible because agents may perform encryption and key management client-side without being subservient to any intermediate service.

Whilst encryption protects data itself, there may also be a need to control access to groups of encrypted data (conceptually boxes) within the remote service itself. This may be for efficiency reasons, so that users may only have access to encrypted "blobs" that are relevant to them.

Thus access management may be divided into two parts:

A "macro" access requirement, being the access to groups of encrypted blobs (boxes) in a remote service. Note that this access control may be governed by repository services.

A "micro" access requirement, being the control of access to the data itself. Note that this access is enforced by encryption and controlled by keys.

In operation, an agent may extend transactions and/or perform other relevant processing in order to provide "macro" related access management. For example, any one or any combination of the following may be performed:

When a box is created, SSL access may be automatically given to the owner.

When an invitation is accepted, the owner's agent may advise the repository service and/or remote service to grant the invited user SSL access to the box.

The acceptance of the confirmation may be manual and/or be set to a given time. In this case, invitations may become a three step process: the invite, the acceptance and the confirmation. This may be used to synchronise many members into a box at once. For example, to invite a set of people to a box, an agent or user may wait for acceptances, then confirm the acceptances at the same time. Since the confirmation may involve advising repository and/or remote services to grant SSL access to the box, this process effectively opens up access to a box at the same time to all invitees.

If a user is revoked, then SSL access may be blocked in some or all of the system services and/or remote services. In this case, associated home boxes and contact boxes may be deleted. This box deletion may occur via the revocation service and/or associated certificate service instructing the repository service and/or remote service.

When a user is un-invited from a box, the box owner's agent may advise the repository service to deny SSL access to the box for the un-invited user.

If a box owner or delegated administrator or privileged member requests certificates for a client box, then the Registration Authority (RA) may check with the repository service that the requestor is a member of the associated box.

A change owner transaction may pass additional data, such as box access codes being enforced by a repository service and/or remote service.

If multiple home boxes are used, or information in a home box is tagged, then access to a particular home box and/or particular tagged information may be access controlled. Such access controls may be defined in a policy. Conditions for access may include location, tokens, time of day, time since last access, device, authorisation token etc. For example, access may be restricted according to country.

3.3.11 Recovery Management

In prior art, recovery management may be centralised, such as empowering centralised administrators to override user controls, reset passwords, issue new keys etc. This may have management costs and/or security and privacy risks, as most, if not all, support problems may become the responsibility of the central group with such power.

In embodiments of the present invention, decentralised recovery management may be achieved by realising that agents may take special precautions to facilitate recovery themselves, without necessarily involving any centralised party. For example: making agent protocols omnipotent, adding extra information to transactions to detect inconsistencies, ensuring redundancy of keys via distributing a copy to each authorised user, backing up information for example in their home box, etc.

In operation, an agent may extend transactions and/or perform other relevant processing in order to provide decentralised recovery management. For example, any one or any combination of the following may be performed:

- If a transaction involves a key transference (e.g. a permit) the confirmation message may include a hash of the permit or key data If the receiver finds that the hash of the confirmed permit does not match the current permit then the transaction may be repeated or aborted.
- Copies of codes may be stored in a user's home box, for example for recovery reasons. Codes may include contact codes, invitation codes, change-owner codes etc. If a code is found in a home box, then associated messages may be expected to be found in the contact box for the recipient. If these are not found, then appropriate action may be taken such as to restart or abort the transaction.
- On start-up, if the repository service or remote service returns more boxes than an agent has permits and/or community keys for then the agent may request associated permit(s) and/or community key(s) by sending a Box Update request to the owner(s) of the unexpected box(es).
- On start-up, if the agent has more permits and/or community keys than there are boxes, then those redundant permits and/or community keys may be discarded. A common example may be that a client box was deleted while the agent was offline.
- A user in a parent box may reset their client permit by using the client credentials to read the client permit out of the client's home box or an associated meta-box. This may occur if an agent needed to ensure that they have the latest client permit.

3.3.12 Privacy Management

In prior art, the server-side oriented service providers may make privacy a concern. This is because centralised administrators may have the power to access user information and/or a service provider may make use of user data for its own commercial purposes. For example, the service provider, or associated partners, may sell, track, archive, backup, aggregate, resell, correlate, target and/or otherwise take advantage of end-user information. Though service providers may have a "privacy policy", these may be non-binding, voluntary, hard to verify, and/or diluted by service provider Terms of Service which may claim a right to use or access user data for any purpose that the service provider deems necessary to run their service.

In embodiments of the present invention, decentralised privacy management may be achieved by realising that agents, with the use of encryption and protected agent-to-agent transactions, may have considerable scope to ensure that intermediate parties are effectively "blind" to activities occurring between agents. In addition, agents may limit information and/or interactions with other agents to further strengthen privacy.

In operation, an agent may extend transactions and/or perform other relevant processing in order to enhance privacy. For example, any one or any combination of the following may be performed:

- A target user may decline a contact by simply ignoring it. In this way, the target user may hide from another user their existence in the system.
- An invitee may decline an invite by simply ignoring it. In this way, an invitee may hide from another user whether or not they are active in the system.
- Profile information may be voluntarily passed between users. This allows users to have the option of what personal information, if any, should be conveyed to another user e.g. name, phone numbers, location etc.
- People or applications may register with pseudonyms.
- Member(s) in boxes may not know who else is in the same box as them.
- Users may have no way of finding out which boxes other users are in.
- Filenames in the remote service may be obfuscated to avoid leaking information and/or giving any indication about the contents of the encrypted content.
- Revocation messages may not need to give details of who is being revoked. All that may be required in a revocation message may be the issuer and serial numbers of revoked certificate(s).

3.3.13 Managed-Users

In prior art, it is usual for end-users to have an administrator manage their account and/or credentials for them. These end-users may be known as "managed-users". For a service provider, most users may be managed-users so that centralised administrators can setup, manage, support and/or terminate users as required. For a company, most users may be managed by centralised administrators so that the company can enforce security policies, such as role management and/or auditing. However, such centralised approaches may have significant security and/or privacy risks.

In embodiments of the present invention, decentralised provisioning management may be achieved by realising that agents themselves can be an administrator for other agents. This is because agents may manage credentials on behalf of other users and agents may manage boxes on behalf of other users.

In implementation a managed-user may be able to access a sub-box under a shared box, called a "client" box. Client boxes are especially useful for companies as they may allow staff invited to a parent box to be able to view and/or manage any of the subordinate client boxes. Client boxes may also useful for experienced users as it allows them to quickly setup and/or manage boxes on behalf of other users. Note that any member of a parent box may be able to read and/or write to client boxes but a given client may only be able to read and/or write to their own client box.

In operation, an agent may implement extended interaction protocols and/or perform other relevant processing in order to provide decentralised administration of managed-users. For example, any one or any combination of the following may be performed:

- A box owner, or delegated administrator or privileged member, may provision a client by generating their credentials and/or creating a client box.
- Generating credentials may involve generating a key pair(s), obtaining certificate(s) and storing them in a credential-backup box and/or a credential backup service. The box owner may then give the name and passphrase used for credential backup to the client.
- When obtaining client certificates, the Registration Authority (RA) may check that the email address conforms to predetermined criteria, such as a sub domain and/or an identifier for the parent box, and/or that the requestor is an owner, or delegated administrator or privileged member, of the parent box. Note that the combination of the predetermined email address format and the signature on the Certificate Signing Request (CSR) corresponding to the registrar certificate of the requestor may avoid the need to have an authorisation code normally used on registration.

Clients may automatically be invited to their client boxes. This may occur by storing the client box permit in the client's home box.

Shared client boxes may be managed in a similar way to client boxes. A client may be assigned to a client shared box by copying the client shared box permit into to the client's home box. A shared client box may be restricted to selected clients, for example by using tags or groups or manual assignment. An all-client shared box may automatically assign clients to that all-client shared box.

Members of parent boxes may automatically be invited to client boxes when client boxes are created and/or when a user is invited to a parent box with existing client-boxes associated with it. This is because members may obtain client permits by accessing the client's home box. Similarly, members of parent boxes may also automatically be invited to client shared boxes.

When a client logs in, they may only see their own client box. If there are client shared boxes then they may also see these shared boxes. Note that the SSL credentials used on login, such as to a repository service and/or remote service, identifies them and therefore may determine which boxes they may access.

A client may use a different interface to access boxes with, such as a private portal. This may avoid clients needing to maintain their own credentials locally; instead they may be retrieved via credential backup on each login.

Credentials of client boxes may be distributed to other members of the parent box. This may allow those members to reset a client's passphrase. To reset a passphrase, the box owner or other authorised box member(s) may connect to credential backup using the client's SSL certificate, store the credentials with a new passphrase, and then give the new passphrase to the client.

A client may reset their passphrase, similar to any other user, by simply storing their credentials in credential backup. Note that a parent box member may never know this new passphrase as their reset passphrase procedure uses the client's SSL certificate for authentication and not the client's old passphrase. Additionally, the credential backup service may never know the passphrase as the credential backup service may use a derived passphrase.

A parent box member may ensure that they have the correct client permit by reading it from the client's home box. Note that to do so, the parent box member may need to connect to the remote service and/or repository service using the SSL certificate of the client.

Since client users may not be invited or un-invited to other boxes, they may not need to have contact boxes. Note that the invite and/or un-invite to shared client boxes may be handled by directly writing to, or removing permits from, their home box.

Client permits may be placed in parent boxes or an associated meta-box. This is to cater for the case where a delegated administrator or privileged member doesn't have direct contact with other box users so therefore cannot pass on the credentials to those users. A client-permit-key may be generated and stored in the parent box permit and used to encrypt client permits. This has advantages such as increasing scalability by reducing the number of contact box messages, reducing the risk of race-conditions between different delegated administrators or privileged members, reducing the number of asymmetric-key operations (used in contact box messages), etc.

If a user in a parent box is un-invited or revoked then some or all of the associated permits of the parent box and/or client boxes may be updated e.g. for each box, generate a new box key, add the associated permit and distribute to the other members of the box.

3.3.14 Privileges

Administrative functions may generally be performed by the box owner. However, it may be useful for a box owner to be able to delegate administrative privileges to other users in their box. Examples of privileges or permissions may include any one or any combination of:

Allowing users to invite other users to the box. Note that this privilege may involve passing certificates of the new user back to the box owner.

Allowing users to create clients.

Allowing users to change access permissions on files or folders.

Allowing users to upload, modify or rename files.

Allowing users to annotate files.

Allowing users to send messages to other users in a box.

Allowing users to reset passphrases of clients.

Restricting users to particular access permissions for the entire box.

In operation, the enforcement may require co-operation by a system service, such as a repository service and/or remote service. In this case, a box owner may send a message to the system service indicating any changes in authorisation by any of the users in their box. Alternatively, the box owner may supply members with appropriate Attribute Certificates (ACs) for their privileges. In this case, users wishing to exercise privileges, may need to supply the appropriate AC at the time that the privilege or permission is needed. (ACs are further described in the next section).

3.3.15 Attribute Certificates

In an advanced aspect of embodiments of the present invention, Attribute Certificates (ACs) may be used for privileges or permissions. In this case, a repository service may verify an SSL certificate for a session on connection, and ensure that an appropriate AC is provided for each privilege required on that session. The AC's may be provided at connect time and/or provided at the time of a request.

Privileges may be granted via a member, for example by the owner, generating an appropriate AC signed by their registrar credential (private key). The AC may be short lived which may avoid the need for revocation support. An AC may be tied to a transaction, for example via a hash. A standard X.509 AC format may be used, for example, by making use of the "Holder" field. The user may issue an AC to a recipient, for example via their contact box. The AC may cover any permission, such as, to invite a user to a box, allow creation of clients, read a file, write a file, delete a file, rename a file etc. The AC may be single use, such as to download a file only once. The repository may enforce privileges by only allowing operations granted by an appropriate AC.

AC's may be issued by an agent or external attribute certificate server (e.g. Certificate Services 392) or a third party PKI. Attribute certificates may be revoked, for example, using an OCSP service. Note that such a revocation service may be a convenience and differs from a regular CA in that attribute certificates may be signed by user credentials such as their registrar private key, not a CA key, so the central location is just to provide somewhere where revocation messages may be stored. A reason for making use of a revocation service may be so that an attribute certificate could be disabled for example, when a user is un-invited from and/or leaves a box. In addition, or as an alternative, ACs may have short life, for example weeks or days or hours or any other time period.

By using ACs, central servers (e.g. Remote Services 370 and/or Repository Services 391) may not need to maintain an authorisation list. For example, when a "create client" message is received, the server may base its access decision based on a cryptographic authorisation such as an AC, rather than checking that the requesting user is allowed to perform an operation based on a server authorisation list.

For example, to convey a "create client" permission, a box owner may generate an AC signed using their registrar private key and may reference the SSL certificate of the target user. The AC may be sent to the target user via their contact box. When the target user wants to create a client, it would send the AC to the server.

When the server receives a request to create a client, the server may perform a number of checks. For example, any one or any combination of the following may be checked:
If the request is from the box owner then no AC may be required.
If the request is from a user who is not a member of the box, the request may be rejected
The AC is signed by the box owner
The AC is valid e.g. not expired or not revoked
The AC references the target user, for example, the SSL certificate of the target user.
Similar checks may be performed for other operations.

Box ownership may be handled by simply associating a box with a particular registrar certificate. In this case, privileges may be recognised only if an AC is signed by the owner's registrar credentials (private key).

Revocation may be handled by using a standard form e.g. V2Form, and include the X.500 issuer name and/or serial number which may allow the use of OCSP to confirm the AC issuer is valid and/or the AC itself is valid.

It is important to note that ACs may be used to handle most, if not all, system management permissions, e.g. read/write/delete permission(s), delegation of invite(s), box membership, etc. This means that central servers may not need to maintain a permissions database or any state information about users of a box as the rights of an SSL session may be governed by reference to the ACs provided on that session.

3.3.16 Anonymity

In further advanced aspects of embodiments of the present invention a combination of attribute certificates (ACs) and SSL, or equivalent, certificates may be used to facilitate anonymity. In this case, a user's security domain may be further protected as, not only may it be difficult, if not impossible, for intermediate parties to read a user's data, but it may become difficult, if not impossible, for intermediate parties to tell who a user is collaborating with.

As described above, the box creation step may associate an owner's registrar certificate with a box. Once this association has been made, intermediate services, e.g. repository services and/or remote services, may only accept requests from sessions that have an appropriate AC, signed by the owner's registrar credential, which references the SSL certificate of the current session.

By extension, an owner may issue multiple ACs to authorise one or more SSL certificates for use by a member. For example, a member may provide one or more SSL certificates, such as from a temporary certificate server (e.g. one of Certificate Services 392) which the owner could endorse using an AC. Such an SSL certificate could then be used to connect to the intermediate services, thereby disguising who is the real user, especially if the label in the SSL certificate was untraceable, such as a random number or random string. This randomness may facilitate anonymity as the intermediate infrastructure may only see random, but authorised, SSL sessions performing actions.

Note that an owner may hide their own activity by obtaining temporary SSL certificates and issue ACs to authorise themselves. Further, any number of SSL certificates could be authorised allowing activity to be dispersed between sessions, with the intermediate services being relatively "blind" to which user performs what action or even doing traffic analysis to try to build profiles of end-points.

Note also that if notifications were in-band, for example a client such as a "Dashboard" monitoring agent, then this may avoid the need for external email notifications which may give away some aspects of who is doing what.

Further, if intermediate services where not associated with billing, such as by using an external billing system, then they may have no means to identify any end users, nor have much, if any, ability to associate a label with an end identity.

3.3.17 Ownership

In another aspect of embodiments of the present invention, ownership may not necessarily be associated with a single user. Generally, the concept of an "owner" is someone who can un-invite any other user but can't be uninvited themselves.

In more complex cryptographic arrangements, such as quorums, there may be zero owners, but a box may be collectively owned. This ownership may be complete, such that each owner has equal rights. Ownership may require co-operation, for example, users having parts of keys and needing to combine their key parts in order to have a complete key to perform operations. Ownership may established be via a group mechanism, such as being member of a group gives permission to perform owner related activities.

Usually, a change owner process uses an agent protocol, for example between a box owner and a box member (as described above). However, sometimes, a change of ownership may not be possible or practical, for example where an owner has left a company or has forgotten their passphrase or otherwise is not able to perform the duties of an owner. In this case, repository services may re-assign a box to a new owner. This re-assignment may check that the new owner has contact with each box member. Alternatively, a box-to-box copy may be used which may involve encrypted content being copied to a new box along with a re-encrypted content key from the box owner. When such processes are complete, the old owner may be revoked.

3.4 Trust Layer

The purpose of a trust layer (e.g. Trust Layer 460) may be for end users to establish bilateral relationships with other users and/or for agents to exchange certificates. Exchanging certificates may be important for securing the control layer (e.g. Control Layer 440).

Note that trust management may primarily be performed and controlled client-side, such as by an agent (e.g. Agent 340). In this way, the trust management (also called relationship management or identity management) may be considered decentralised. Further, agents may treat their own certificates as private certificates and only distribute them as required to trusted contacts. The exchange of certificates may be encrypted to protect from man-in-the-middle attacks and/or to help maintain privacy of the certificates.

In other embodiments of the present invention, trust management may be obtained via different means, such as leveraging existing corporate, PKI and/or WoT systems.

By way of example, the following descriptions make use of a first user (e.g. User1 301, User1 441) and a second user (e.g. User2 302, User2 451). The two users may each have their own credentials. For example, the first user may have credentials comprising private keys (e.g. Private Keys 482) and associated personal certificates (e.g. Personal Certificates 483) which may be stored in a keystore (e.g. Keystore 481). Similarly, the second user may have credentials comprising private keys (e.g. Private Keys 492) and associated personal certificates (e.g. Personal Certificates 493) which may be stored in a second keystore (e.g. Keystore 491).

Note that descriptions in this specification regarding users equally apply to applications in machine-to-machine environments. Thus a "user" may equally be an end-system and/or application and so the following descriptions should be read in this context.

3.4.1 Vetting

The process of establishing a trusted relationship may involve the verification of identity of people and/or the authenticity of end systems. This process may also be known as a make contact process, a relationship establishment process, an introduction process, a vetting process, a proof-of-identity process etc.

In order for the first user to establish a trusted relationship with the second user, a vetting process (e.g. Vetting 303) may be required. The process of establishing a relationship may be one-way or both-ways or multi-way in the case of many users. It may involve the first user verifying the identity of the second user and/or the second user verifying the identity of the first user.

The verification process may involve the first user giving a contact code (e.g. Contact Code 461) to the second user (e.g. Contact Code 471). The contact code may be generated by the first user's agent and/or chosen by the first user. The contact code may be thought of as a bootstrap key because it enables the encryption and decryption of the initial contact message.

The contact code may be conveyed using out-of-bands means. The out-of-bands means may help establish proof-of-identity, verification, validation or other assurances that the parties are who they say they are. The out-of-band means may use any method, for example in person, over the telephone, via SMS, via email, via file transfer, via instant messaging, using physical means such as in person, etc.

In the case of applications which need to establish bilateral relationships, the process of vetting may involve a first application establishing the authenticity of a second application and vice versa. This may be done manually by machine administrators, such as with a contact code and/or an automated means such as using configuration or other predetermined criteria.

3.4.2 Certificate Exchange

The process of establishing a bilateral relationship may involve the exchange of certificates. The purpose of exchanging certificates may be to provide a cryptographically strong control layer (e.g. Control Layer 440) also called a control path, plane, channel or tunnel with other users or applications.

Such an exchange may include more than one personal certificate (e.g. Personal Certificates 483) by the first user requesting the relationship and/or a second user accepting the relationship request (e.g. Personal Certificates 493). For example, an encryption certificate, a content signing certificate, and/or a system signing certificate (e.g. registrar certificate) may be included. The registrar certificate may be used to check the signing of control messages, certificate requests, renewal of certificates, a revocation message etc.

The exchange of certificates may make use of contact boxes or equivalent such as message boxes or control boxes. As part of a make contact request process, a contact box between the first user and the second user may be created (e.g. Contact Box 408). As part of a make contact accept process, a contact box between the second user and the first user may be created (e.g. Contact Box 410). In order to create such boxes, the agent associated with each user may utilise repository services (e.g. Repository Services 391) and/or remote services (e.g. Message Boxes 383).

In other embodiments of the present invention, the exchange of certificates may be obtained via other means, such as email, instant messaging, a "cloud" messaging service, a "cloud" queuing service, a USB device, a direct connection or any other physical or electronic transport means.

3.4.3 Make Contact Request

The first user may create a make contact task (MCT) (e.g. Make Contact Task 407). The MCT may be signed (e.g. Sign 464) for example using the first user's registrar private key (one of Private Keys 483). The MCT may be encrypted (e.g. Encrypt 463) using a contact code (e.g. Contact Code 461) as the encryption key. The contact code may be any code, password, passphrase, number, known certificate or any other type of key. The encryption may involve a wrapping key.

The MCT may be conveyed to the second user, for example via a contact box (e.g. Contact Box 408) or other means such as email. A contact box may be created, for example using a repository service (e.g. Repository Services 391) and/or remote services (e.g. Remote Services 370). Note, at this point, the second user may not yet have credentials.

If the second user has not yet known to the system, e.g. registered, they may receive a notification (e.g. from Repository Services 391) inviting them to register in order to gain credentials (e.g. Private Keys 492 and Personal Certificates 493). Alternatively, the second user may obtain their personal credentials via other means e.g. leveraging an already existing credential infrastructure.

The second user may retrieve the MCT (e.g. Make Contact Task 407) from their contact box (e.g. Contact Box 408) and decrypt it (e.g. Decrypt 473) using a contact code (e.g. Contact Code 471) provided by the first user. The decryption may involve a wrapping key. The decryption may make use of one or more personal certificates (e.g. Personal Certificates 483) from the first user. The second user may add the first user's certificates to their list of known contacts (e.g. Contact Certificates 472). The second user may check (e.g. Check 474) the signature of the MCT, for example using the registrar certificate of the first user. The second user may also check for revocation of the first user, for example using a revocation service (e.g. part of Certificate Services 392). The second user may also store the first user's certificate(s) in their home box (e.g. Home Box 412), preferably encrypted (e.g. Encrypt 494) with their encryption certificate (e.g. part of their Personal Certificates 493).

3.4.4 Make Contact Accept

The second user may accept the make contact request by returning an accept contact task (ACT) (e.g. Accept Contact Task 409) which may contain one or more personal certificates (e.g. Personal Certificates 493) of the second user. The second user may sign (e.g. Sign 476) the ACT, for example using their registrar private key (e.g. one of Private Keys 492). The second user may encrypt (e.g. Encrypt 475) the ACT using a certificate such as an encryption certificate provided by the first user (e.g. part of Contact Certificates 472). The encryption may involve a wrapping key. The ACT may be transferred back the first user via message box (e.g. Contact Box 410) which may be part of a remote service other messaging means e.g. email. A contact box may be created, for example using a repository service (e.g. Repository Services 391) and/or remote services (e.g. Remote Services 370).

The first user may retrieve the ACT and decrypt it (e.g. Decrypt 465) using a private key (e.g. one of Private Keys 482) such as the private key associated with their encryption certificate. The decryption may involve a wrapping key. After decryption, the first user may retrieve one or many personal certificates (e.g. Personal Certificates 493) from the second user. The first user may add these certificates to their list of known contacts (e.g. Contact Certificates 462). The first user may also store the certificate(s) in their home box (e.g. Home Box 411), preferably encrypted (e.g. Encrypt 484), such as using their encryption certificate (e.g. part of their Personal Certificates 483) and/or via a home-box key.

If the ACT was signed, then the first user may check (e.g. Check 466) the digital signature using a signing certificate of the second user associated (e.g. part of Contacts 462). The first user may also check for revocation of the second user, for example using a revocation service (e.g. part of Certificate Services 392).

3.4.5 Make Contact Acknowledge

On acceptance of an ACT, the first user may send an acknowledgement to the second user via their outgoing contact box (e.g. Contact Box 408) and/or delete the MCT from their outgoing contact box. The acknowledgement may be signed and/or encrypted.

The second user may receive the acknowledgment and/or is notified about the removal of the MCT from the contact box as a signal of confirmation and delete the ACT from their outgoing contact box (e.g. Contact Box 410). If the second user receives an acknowledgement task, the second user may decrypt it and check its signature in a similar way to the methods described above.

3.4.6 Make Contact Extensions

A MCT may be declined with a specific message.

A MCT may have a limited lifespan and may be deleted after it has timed out. This may be useful for privacy reasons as a target user may wish to ignore a MCT without betraying the fact that they exist and/or are actually in the system.

The make contact process/protocol may be extended to carrying control messages. For example, a MCT may include one or more invitations to a box. This may allow a new user to be invited to a box as soon as they have registered, they can gain access to the box without the need for the owner to be available to issue the invite after registration (as previously described).

The make contact process may be communicated using external means, such as email, instant messaging, message queues, physical means or any other suitable transport mechanism.

If message boxes (e.g. Contact Box 408, Contact Box 410) are provided by a remote service (e.g. Remote Services 370) then the message boxes may be used as contact boxes (e.g. Contact Box 408).

3.5 Credentials Layer

The purpose of a credential layer (e.g. Credentials Layer 480) may be for users and/or applications and/or agents to obtain and manage credentials, preferably certificate based credentials. Credentials may be required for different purposes, for example, signing, encryption, certificate management and/or communications. Communications certificates e.g. Secure Socket Layer (SSL) certificates may be required to access facility services (e.g. Facility Services 390) and/or remote services (e.g. Remote Services 370).

Note that credential management may primarily be performed and controlled client-side, such as by an agent (e.g. Agent 340). The agent may interact with other system services (e.g. Facility Services 390) and/or remote services (e.g. Remote Services 370). In other embodiments of the present invention, credentials may be obtained via different means, such as integration with corporate identity systems, PKIs or any other identity management system, preferably that manages certificate based credentials.

3.5.1 Obtaining Credentials

The credentials of users (e.g. User1 301) may be strong credentials, such as certificate based credentials, and/or may be stored securely in a keystore (e.g. Agent Data 331). Credentials may include keys and/or certificates for different purposes, for example signing, encryption, communications, email and/or certificate management. The combination of a private key and certificate may be considered a credential. If such personal certificates are not generally published then they may be considered as private certificates.

Credentials may be obtained via a registration process or enrolment process and may make use of system services (e.g. Facility Services 390). Alternatively, credentials may be obtained by leveraging or importing them from a third party system(s).

Credentials may be obtained via certificate services (e.g. Certificate Services 392) which may comprise a Certification Authority (CA) and/or a Registration Authority (RA). Credentials may also be obtained via external means, such as being issued on a smart card. Users (e.g. User1 301 and User2 302), may obtain credentials from different CAs. Note that it is not necessary for certificate credentials of different users to be related, compatible or in the same format. Thus, certificate credentials may be mixed and/or be in different forms and/or signed by different authorities and/or self-signed. Preferably, certificates are in X.509 format.

Credentials may include private keys (e.g. Private Keys 482) and/or personal certificates (e.g. Personal Certificates 483). Each user (e.g. User1 301) via their agent (e.g. Agent 340), may generate one or more key pairs. A key pair may be a private key and the other may be a public key. Each private key may be stored in the keystore. A public key may be self-signed, signed by other trusted parties or sent to a Certification Authority (CA) for signing. The sending of a public key to a CA may be via a Certificate Signing Request (CSR) and the returning of a signed certificate may be in a Certificate Signing Response (CSRR).

The CA may perform minimal name check or proof of identity, for example, a verification of the email address to be used in the issued certificate, to validate that the name is somehow related to the person or application requesting the certificate. As part of certificate signing, a CA or RA may require other information such as evidence of identity, a unique label such as an email address, and/or cryptographic information such as a random number, timestamp etc. Initial name verification may involve the CA or RA giving the user an authorisation code.

A system signing certificate may be known as a registrar certificate. This may be the first certificate requested from the CA and it may be verified by an authorisation code. For example the authorisation code may be used to sign a CSR for a registrar certificate. Once the registrar certificate is obtained, then subsequent CSRs may be signed with the associated registrar private key. For example, a user may generate multiple key pairs in order to gain different certificates, and therefore credentials, e.g. to obtain signing, communications, encryption and/or email certificates.

Registrar credentials may have many other uses. For example: to sign Attribute Certificates (ACs) and/or for signing control messages sent between agents (e.g. in Control Layer 440) etc.

Once generated, credentials may be stored securely in a keystore (e.g. Agent Data 331).

Once credentials have been obtained, an agent (e.g. Agent 340) may create a state or home box (e.g. Home Box 411 for User1 441) such as using a repository service (e.g. Repository Services 391) and/or a remote service (e.g. Agent Boxes 382).

After issuance, a CA may be involved in other procedures to do with the lifecycle of certificates such as re-issuance, renewal etc. Note, however, that the agent may take responsibility for the lifecycle management of certificates, with the CA mainly forming the role of assistance, for example, certificate signing.

If certificates have expired, the CA may, under pre-determined conditions, accept a CSR signed by the expired registrar private key in order to obtain a new registrar certificate and subsequently other certificates. The agent may then need to distribute renewed certificates to existing contacts.

3.5.2 Credential Backup

A credential backup service may be part of a facility service (e.g. Backup Services 393). Such a service may allow agents or users (e.g. User1 301) or applications to retrieve credentials, for example, in the case they are lost or the user is using a different end system.

A credential backup service may require authenticated access such as a passphrase or client-side SSL authentication. If certificate-based credentials are required, the user may need to obtain a temporary SSL certificate, for example from a temporary access service provided by certificate services (e.g. Certificate Services 392).

To backup credentials, an agent (e.g. Agent 340) may authenticate to the credential backup service and provide data to the credential backup service.

Backed up data may be the raw credentials, encrypted credentials, a keystore, an encrypted keystore or any other derivation of credentials. For example a protected keystore may be encrypted using password based encryption (PBE) using a derived password of the encrypted keystore passphrase. In this case, an agent may need to re-backup the keystore if the passphrase to the keystore is ever changed.

To retrieve credentials, the agent may authenticate to the credential backup service. If the credentials or keystore are encrypted, the agent may decrypt them and/or store them locally.

A credential backup service may work in combination with other system services. For example, a credential backup service may return other information for an agent to gain access to system services, such as returning in a response any one or any combination of key(s), link(s), form(s), portal(s), portal link(s), web service(s), access detail(s), credential(s), temporary credential(s), token(s), etc.

3.5.3 Revocation

Certificate revocation may be used to ensure validity of credentials. Many prior art systems may not provide for revocation, or may only provide revocation in a cumbersome way, for example WoT systems. Providing revocation, particularly timely revocation, is considered essential to handle the case that credentials are lost or compromised.

Certificate revocation may be invoked by end users or applications, such as via a revocation-custodial box. The ability for end-users to get trusted custodians to invoke revocation may be far preferable to prior art systems that rely on central administrators who may be susceptible to social engineering attacks and other risks such as abuse of authority.

A certificate revocation service may be provided by one of the system services (e.g. Certificate Services 392). Such a service may act as a third party to allow a user or other service to determine if credentials have been revoked.

The interface to the certificate revocation service may be via an Online Certificate Status Protocol (OCSP). Agents (e.g. Agent 340) and/or other system services (e.g. Facility Services 390) and/or remote services (e.g. Remote Services 370) may as required and/or periodically use an OCSP service such as on start-up, on authentication, at pre-defined intervals, whenever new data is accessed, whenever signatures are checked etc.

When a user (e.g. User1 301) is revoked, then this may trigger a number of actions. The trigger may be direct, for example by a certificate service notifying other system service and/or agents. The trigger may be indirect, in that other systems and/or agents discover the revocation, for example via OCSP.

When system services discover or are notified that a user has been revoked, then SSL access may be blocked in some or all of the facility services and/or remote services. In advanced embodiments, any existing SSL sessions of a revoked user may be terminated.

When a repository services discover or are notified that a user has been revoked, then the revoked user may be expunged. For example, associated agent boxes and/or home boxes (e.g. Agent Boxes 382) and/or message boxes and/or contact boxes (e.g. Message Boxes 383) and/or associated item(s) in credential backup, may be deleted, for example, on instruction from the revocation service and/or associated certificate service. Also, authorisation to associated boxes may be removed, for example owned boxes, invited boxes, client boxes, meta boxes etc.

When agents discover or are notified that a user has been revoked, those agents may rotate keys for any shared boxes they own and/or have been authorised as delegated administrators or privileged members. Rotated keys may include box keys and/or community keys. If ACs have been issued to the revoked user, then the agent may advise a revocation service to revoke those ACs. Agents may also delete messages sent to that user, for example unacknowledged messages in their outbound contact box for the revoked user.

In the case where an owner is revoked, or an owner is offline when a member is revoked, then another member may rotate keys. In order to avoid race duplication and/or race conditions, the distribution of new keys make use of a "slot" and/or queue in the box or associated meta-box in case other members did the same. When the owner is invited back, or the owner comes back on line, then the owner may adopt one of these rotated keys or perform their own key rotation. In such cases, any box keys generated may be added to the permit so that any content created during this time can be decrypted and any community keys communicated using contact boxes or message boxes.

3.5.4 Keystore Passphrase Recovery

An encrypted emergency passphrase may be used to handle the possibility of a user (e.g. User1 301) forgetting their passphrase which is protecting their keystore (e.g. n Agent Store 330). In this case, a user (e.g. User1 301), via their agent (e.g. Agent 340) may generate a key, known as a Passphrase Recovery Code (PRC) and use it to encrypt their passphrase into an encrypted file or data or "blob" known as an Encrypted Passphrase Blob (EPB).

The EPB may be stored locally alongside the keystore and/or with other agent data (e.g. Agent Store 330) and or in any manner accessible by the agent or end user. For extra security, the EPB may be portable, e.g. on a USB device. An agent may disable keystore recovery management if an EPB can't be created, such as if the storage area containing the keystore is read-only, or the agent was enabled via remote credentials such as from credential backup.

The PRC may be given directly to a second user (e.g. User2 302) and/or stored in a passphrase-recovery-box (e.g. Agent Boxes 382) and/or stored in a passphrase assistance service (e.g. Backup Services 393). The advantage of a passphraserecovery-box is that it allows the owner to invite and un-invite trusted users to that box as required. The advantage of a credential assistance service is that the PRC may be automatically sent to the user, such as via one or more emails and/or SMS, for example via a "Forgot Passphrase" function associated with the agent. Users given access to a PRC may be considered trusted or custodians of the PRC. For example, a custodial user might be a reseller, or another member of staff in an office.

If a user (e.g. User1 301) forgets their passphrase, they may use a passphrase assistance service and/or contact one of the custodial users that they have given access to their PRC. The custodial user may provide the PRC back to the forgetting user. This may be done over the phone, via a message or any other means. The PRC may be cryptographically strong and single use and so therefore may be safe to send over untrusted communication channels, e.g. email(s) and/or SMS.

The forgetting user, via their agent (e.g. Agent 340) then may use the PRC to decrypt the EPB to obtain the passphrase to unlock their keystore. The agent, after successfully opening the keystore via the PRC, may require the forgetting user to choose a new passphrase. In this case, a new PRC and EPB may be generated. If a passphrase-recovery-box is being used, then the PRC may be stored in that box. If the credential backup has been performed, then the credentials may need to be backed up again using the new passphrase. If the PRC is being entrusted to other parties, such as a passphrase assistance service and/or trusted user and/or trusted organisation, then the new PRC needs to be provided to those parties.

The use of an EPB and PRC may be considered relatively safe. Abuse of the EPB may require physical access to the user's end system. Also, the PRC, being cryptographically strong and single use, may not leak information, unlike prior art password "hints" which may be considered to have very weak security.

An advantage of storing the PRC in a box, e.g. a passphrase recovery box, is that an owner may control which users to trust and can change that choice, unlike in prior art systems which may require exclusive trust of the provider.

An advantage of using a passphrase assistance service is that it may be automated to send the PRC over one or more emails and/or SMS and/or other means. This approach may be considered relatively resistant to any attack on the PRC. For example, if any attacker obtains the PRC e.g. by intercepting email(s), by hacking a server etc., they may not be able to do anything with it without physical access to the user's computer containing the EPB. Further protection may be used via a separate channel, for example sending the PRC via SMS or sending an encrypted PRC via email with the unlocking code sent by SMS. This recovery process may be unlike prior art whereby password reset links are relatively susceptible to attacks because there is no client-side protection.

3.5.5 Revocation Messages

A revocation message (RM) may be used to handle the possibility of a user's credentials being no longer safe. For example, because they lost their computer (e.g. End System 305), or they suspect their computer has been compromised (e.g. malware), or they suspect that their keystore passphrase is no longer secret or they have forgotten their passphrase and did not use a PRC.

A user (e.g. User1 301) may generate a RM and sign it using their registrar credential (private key) and/or make use of a revocation passphrase (e.g. as defined in RFC 4310). The RM may be given directly to a second user (e.g. User2 302) and/or stored in a box, such as a revocation-custodial box (e.g. one of Agent Boxes 382) which allows the owner to invite and un-invite trusted users to that box as required. Users given access to a RM may be considered trusted or custodians of the RM. For example, a custodial user might be a reseller, or another member of staff in an office.

If the user needs to be revoked, they may contact one of the custodial users that they have given access to their RM. The custodial user may then send the RM to a revocation service (e.g. part of Certificate Services 392).

A significant advantage of storing the RM in a box which they control access to is that a user can choose who to trust and can change that choice, unlike in prior art systems which may need to trust the service provider exclusively.

3.5.6 Device Revocation

In embodiments of the present invention, the use of secondary SSL, or equivalent communications, certificates may help solve the problem of portable devices which may easily be lost. Authorisation may be achieved in combination with an attribute certificate (AC).

Taking an example, a user may have multiple devices, for example a desktop computer and one or more mobile devices. The desktop computer may be the primary credential holder, for example the user's registrar certificate. There may be a number of options for enabling the mobile device. Such examples are listed below.

If a mobile device has its own embedded credentials, for example SSL certificates, or equivalent then these may be used to connect to the system, for example remote services and/or repository services. As an added security precaution, the system may need to recognise the trust anchor (TA) of the mobile device. The user may then issue the device an AC authorising the use of the device's SSL certificate.

If a mobile device has means to accept credentials, then the user may generate or request SSL certificates, for example from a temporary certificate service (e.g. part of Certificate Services 392) and pass the credentials to the mobile device. If the user generates SSL certificates, then the certificate path may be sufficient for the system to accept the SSL certificate. If a certificate server is used, then the user may issue the device an AC for the supplied SSL credentials.

If the mobile device is lost, then the user may advise an OCSP server to revoke the SSL certificate and/or ACs. If embedded SSL credentials are used then an external OCSP server may be notified. Note that the OCSP server may accept the revocation request because it was signed by the same registrar credential that issued the SSL certificate and/or the AC.

The fact that a user can generate ACs for different devices, revoking them if they dispose of the device, means multiple devices can be safely managed. Note that in embodiments of the present invention, SSL certificates may not necessarily be tied to a user, they may be tied to the device.

4 Rationales

Embodiments of the present invention may have many advantages and benefits. This may result from a number of realisations and/or insights by the inventors which may be different from prior art.

4.1 Approach

In overview, the problems of security, privacy, trust, control etc associated with distributed computing may be highly complex and difficult. As such, prior art has tried to address problems by confining and/or limiting them. By contrast, embodiments of the present invention have taken a much more holistic approach which has resulted in many advantages and benefits.

4.1.1 Prior Art Approaches

The inventors have observed that security/privacy approaches of prior art may be categorised into a number of areas as follows:

- Cloud—Most cloud-based applications and/or systems use passwords or password derivatives. Applications include Software-as-a-Service (SaaS), Platform-as-a-Service (PaaS) and Infrastructure-as-a-Service (IaaS). Derivatives include derived passwords and/or password based encryption (PBE) techniques. This approach may be considered insufficient if strong security and/or privacy is required.
- P2P—Peer-to-Peer approaches tend to be application specific (e.g. instant messaging) and/or require real-time connections. This approach relies on the resources of end systems and is therefore unable to leverage "cloud" benefits such as availability, vast storage, low cost etc.
- Enterprise—Organisational oriented approaches tend to be closed and/or centralised. Prior art tends to follow "centralised policy enforcement" such that control and/or rights are moved away from (ordinary) employees to the part of the organisation running systems, e.g. Information Technology (IT) departments. This approach has difficulty scaling to the wider internet and attempts to do so, for example "federation", are considered to largely not have been successful as evidenced by the lack of working systems.
- WoT—Web of Trust systems tend to use decentralisation to avoid authority and/or intermediate parties. However, this may result in very poor handling of revocation, certificate update etc. Attempts to make WoT work in the wider internet have generally had difficulty with scale and complexity.
- PKI—Public Key Infrastructures tend to work well in closed communities, but have problems scaling because of authoritarian, inflexible and/or centralised nature of most implementations. In general, PKI's have not been successful in the wider internet because of difficulties to do with complexity, manual processes, jurisdiction and cost.

4.1.2 Client-Side Approach

Embodiments of the present invention stem from the realisation that client-side techniques, in combination with ideas from the above approaches, may result in benefits, such as strong security, privacy, trust, control etc. with relatively few of the limitations of prior art approaches. In particular, protecting data at the source with encryption based on strong cryptographic keys and mutual/compartmentalised trust between users.

Client-side encryption may have benefits compared to server-side approaches. Encryption may encase, armour, lock-down the end-user data at the source making it relatively immune to problems with server security intermediate between source and destination, for example being stored, cached, transferred, routed etc. Essential to utilising client-side encryption is to solve the (universal) problem of key management. Note that server-side encryption has little additional security benefit as server-side keys have mostly the same risks as server-side infrastructure. Key management may have complexity, cost and challenges including key generation, storage, duplication, distribution, access, protection, rollover, rotation, recovery, removal, revocation etc. If public/private key cryptography is used to help distribute keys, then there may be additional problems of managing certificates, governance, issuance, proof-of-identity, renewal etc.

In essence, the inventors have broadly realised that a combination of client-side techniques and prior art techniques may be used to solve the broad problem of sharing data with privacy from any central providers or other unauthorised use. For example, combining the following aspects:

- Client-side capabilities—to ensure end-to-end interactions, mostly independent of intermediate infrastructure.
- Cloud storage—to leverage availability, low cost, scalability and other benefits.
- P2P management—by using relatively autonomous and co-operating agents to enable decentralised management.
- Enterprise control—whereby each data owner is effectively their own administrator, so that they have absolute control, over who may access shared data, via the generation, issuance, distribution and rotation/rollover of keys.
- WoT relationships—by using vetting to establish trust.
- PKI capabilities—by using revocation, digital signatures and other asymmetric cryptography techniques.

Particular aspects of this combination may include:

- Strong credentials—which allows the full use of cryptographic tools (digital signatures, revocation, rotating keys etc.). This may solve the prior art problems of weak passwords and multiple passwords (the password "plague").
- Strong trust—via personal vetting of contacts. This may solve the prior art problems of depending on trusted third parties and "mis-identification" (underlying most man-in-the-middle attacks).
- Strong security—enforced by encryption. Data-centric security may make data essentially "host-proof", "location-proof" and "third-party-proof".
- Strong compartmentalisation—via unique keys for documents and/or workspaces and/or communities etc. This may mean that a breach (however improbable) may only ever put at risk a relatively small fraction of data corresponding to that particular workspace that was compromised (and not the entire system as is happens with most prior art data breaches).
- Strong privacy—as third party administrators may be relatively powerless to interfere with user content; there may be no "public" directories or "oracles" of information; and pseudonymity may be fully supported (unlike PKIs or WoTs)
- Strong control—as keys may be generated and/or managed and/or distributed by the owner of the data.
- Strong integrity—via digital signatures
- Strong authenticity—via digital signatures
- Strong context—as a user may have complete control over who they choose to trust, when and for what purpose. Users can act in different personas with different groups and thus control what information is shared in which group depending on the context of the trust-relationship of such a group.

In doing so, embodiments of the present invention are considered different to conventional thinking in prior art, for example:

- Identity may only need to be user-to-user meaningful (not third-party meaningful). This may facilitate pseudonymity as users may just need to be known to each other via a (bilaterally recognised) label (such as an email address for convenience). This approach may be quite different from PKIs and WoTs which may go to great lengths to prove that an identity (label) has meaning. Thus, this approach may allow intermediate servers and/or providers to be relatively "blind" to who is collaborating and what is being exchanged.

Authentication may be user-to-user verified (not user-to-system verified). Each end user only has to convince themselves, for example via the contact and/or vetting process, that the other party is providing certificates that represent them (and not because a third party said so).

Authorisation may be user-to-user (not user to system or central policy driven). Sharing may be based on a decision by the owner about "fit-for-purpose". For example, the owner may make a decision about whether a given label, such as an email address, (personally verified) should be allowed to access information (by virtue of distributing them a key) at this point in time (a trusted contact, not revoked).

4.2 Layering

An aspect of embodiments of the present invention stems from the realisation that many security, privacy, trust, control and integrity problems in systems may be better managed using a layered approach.

4.2.1 Key Management Layering

In the field of key management, an important realisation is that the general problem of managing the lifecycle of keys may be more successfully achieved by treating the different types of keys separately, as follows:

The Sharing Layer may handle "content" keys. In this layer, individual resources or content may be encrypted with their own key (e.g. Wrap 425). The purpose is to protect the security and privacy of the content from any intermediate party.

The Control Layer may handle "shared" keys. In this layer sets of resources or content may be accessed with a shared key (e.g. Permit 442, Community Key 445). The purpose is to protect and compartmentalise content being shared by a set of users.

The Trust Layer may handle "public" keys. In this layer the distribution of certificates is managed. The purpose is to protect the control layer (or channel or tunnel) being used between two or more collaborating users. Note that "public" keys may be stored in a "private" certificate.

The Credentials Layer may handle "private" keys. In this layer credentials may be obtained by each user. Preferably, each public/private key pair is generated client-side, such as via an agent, and that the private credentials are protected by the user, such as using a keystore (e.g. Keystore 481). The purpose of this layer is manage strong credentials and this enable the full benefits of asymmetric cryptography to be used e.g. digital signatures, encryption, authenticity, revocation, key management etc.

Note that agents may be responsible for the full lifecycle management of keys including their generation and distribution. For example, when box keys are rolled over on un-invite, or certificates are rolled over when near expiry etc.

4.2.2 Relationship Layering

In the field of identity management, an important realisation is that the general problem of managing users and/or groups may be more successfully achieved by separately managing relationships based on their scope, as follows:

The Sharing Layer may define a user's "community". In this layer, a user may have a very explicit trusted community which may be exactly equal to the set of contacts that the user has chosen to make contact with. Note that this community may be completely user defined and not, as is the case in prior art, defined, influenced, adjusted or otherwise interfered with by any third party, especially organisations.

The Control Layer may define each "workgroup" that a user belongs to. In this layer, a user may collaborate with a very explicit set of people. Note that each workgroup may be very exactly defined, e.g. by the members of a box, and not, as is the case in prior art, defined, influenced, adjusted or otherwise interfered with by any third party, especially administrators.

The Trust Layer may define each "relationship" that a user has. Such relationships may be bi-lateral and/or via mutual consent, preferably involving out-of-band means of verification and/or proof-of-identity. Note that relationships may be precisely determined by the user, and not, as is the case in prior art, be defined, influenced, adjusted or otherwise interfered with by any third party, especially trusted third parties.

The Credentials Layer may define a "personal" footprint of a user. This may allow a user to project themselves as they see fit, for example, whether real names or pseudonyms are used, how much personal data is distributed, what type of persona to portray, etc. Note that a user's personal profile may be completely voluntary, and not, as is the case in prior art, determined, measured, implied, embellished or otherwise publicised or influenced by any third party.

Other layers may further be added. For example, if the sharing layer is used to enable further key management, e.g. session keys, then a communications layer may be added which enables communications such as voice, video, chat, telephone, VOIP, messaging etc.

4.2.3 User Re-Establishment Processes

User Re-establishment may be the process by which a user, who has lost their credentials, re-establishes themselves back into the system. Note that, in embodiments of the present invention, if a user is revoked then their access may be removed in many ways, for example:

SSL access may be revoked from all facility services (e.g. Facility Services 390) and/or remote services (e.g. Remote Services 370).

Owned system boxes, e.g. contact boxes, home boxes, passphrase-recovery boxes, credential backup boxes etc., may be deleted, such as on instruction from the revocation service or associated certificate service.

Authorisation to associated boxes may be removed in repository services and/or remote services, for example owned boxes, invited boxes, client boxes, meta boxes etc.

Owners, or delegated administrators or privileged members of shared boxes to which the revoked user was a member may rotate or rollover keys, such as community keys, box keys etc.

In the field of security management, prior art may determine controls, policies and privileges based on the assumption that credentials are in place and the longevity of these credentials. If credentials are compromised, then prior art may handle this situation poorly. For example:

Let the user's privileges time-out. This often occurs in prior-art systems that use "tokens" for authorisation. Obviously, this involves risks, as an attacker may exploit a window to use compromised token or make use of clock manipulation.

Remove the user from the system. Clearly, de-provisioning a user is unacceptable if the user has simply lost their credentials and needs them to be re-instated.

Re-instating the user using an automated process, for example using a "password reset" procedure. In prior art, this automated process may be considered weak, for example, because an attacker could make use of a compromised account, especially email account, to abuse the password reset process.

Re-instating the user using a manual process, for example by having an administrator reset credentials. In prior art, this manual process may be considered weak, for example, because an attacker could use social engineering techniques to trick an administrator into the reset.

In embodiments of the present invention, re-establishing a user after the loss of credentials may be more successfully achieved by realising that there may be different types of reinstatement and/or that reinstatement may require a multi-part approach, as follows:

At the Credentials Layer, a user may only re-register if they have been revoked. Preferably, revocation is via a trusted contact who has released a Revocation Message to the revocation service (e.g. part of Certificate Services 392). The re-registration may follow the same checks by the certificate services as was performed originally during the initial registration process. After re-registering and obtaining a new set of credentials, the user may need to create a new home box. Note that this may be important because an attacker who manages to impersonate another user e.g. by somehow getting them revoked and somehow re-registering as them, say, using a compromised email account, may only gain SSL access to facility services, but at this point, may not have any other keys or capabilities necessary to communicate with other users or access any encrypted messages, meta-data nor content.

At the Trust Layer, the re-registering user may need to re-establish trust relationships with other users. This may follow the bilateral vetting and exchange of certificates (as described above). Note that an attacker who manages to impersonate another user may only be able to access a victim's data after convincing some or all of the victim's contacts of their authenticity, which may be difficult, if not impossible, as it involves out-of-band, usually personal, vetting or verification.

At the Control Layer, the re-registering user may need to be re-invited to each of the boxes they previously had access to. This further makes the task of an attacker difficult, because now the attacker needs to convince each data owner to invite them back into a box. Or, in the case of owned boxes, an attacker must be able to convince a member of the box to invite them back as an owner. Even if an attacker manages to impersonate someone and colludes with another party, each workspace is strictly compartmentalised and so the attacker and colluder may only result in the attacker gaining access to boxes the colluder owns or is a part of, which may be no worse than the colluder simply providing information to the attacker in the first place.

At the Sharing Layer, the re-registering user may need to use the latest box keys in order to access the content of a box. If keys were rotated or rolled-over, especially if content keys were re-encrypted using the new box keys, then this may close another path of an attacker e.g. a user which previously was trusted, but who went rogue and kept previous box keys, those previous keys may have become useless.

4.2.4 Access Layering

In the field of access management, a realisation is that different systems may better manage data, including user and/or system data, based on the cardinality of readers and writers and/or the lifecycle of the data, as follows:

The Sharing Layer may be considered as a "matrix" or "N:M" layer. In this layer, any number of users may store shared data in a box (e.g. Shared Box 402), and any number of users may retrieve data. The result is a matrix of possible interactions. Storing of shared data may be through repository services, via repository assistance, such as via an authentication token to remote services, or directly to the remote service by the agent.

The Control Layer may be considered a "broadcast" or "1:M" layer. In this layer, an authoritative person, usually the data owner and/or box owner, may transfer data via a box to other users. In the case that the encryption key is common amongst the receiving users, then a common box may be used (e.g. Shadow Box 404). In the case that the encryption key is different for each user, then multiple messages, each encrypted with a different key, may be sent via message boxes (e.g. Contact Box 408). Storing of broadcast data may be separate from the storing of shared data, for example, broadcast data may be stored in a repository service (e.g. Repository Services 391) whilst shared data is stored in remote services (e.g. Remote Services 370).

The Trust Layer may be considered as a cryptographically secure channel or "tunnel" or "1:1" layer. In this layer, interactions may be solely between two parties. A tunnel may be uni-directional such as with contact boxes. The mechanism may be an external messaging means (e.g. email, instant messaging etc.) and/or an internal messaging means (e.g. a messaging service part of Repository Services 391) or via storage means (e.g. Remote Services 370).

The Credentials Layer may be considered a "personal" or "1:0" layer. Information in this layer may be for the exclusive use of a user and/or their agent. Storage may be local (e.g. Agent Store 330), which may, for security reasons, be portable such as on a USB drive. Storage may be remote (e.g. Home Box 411) which may be stored using a backup service (e.g. one of Backup Services 393) and/or via remote services (e.g. Remote Services 370).

4.3 Enforcement

Another aspect of embodiments of the present invention stem from the realisation that client-side encryption may protect data from non-authorised parties including any intermediate provider of storage or collaboration services. This may be different from prior art which may depend on a whole range of server-side security measures such as network controls, system controls, administrator controls, operational controls etc. Essentially, client-side encryption may provide "data-centric" security and privacy rather than prior art that may rely on controls that are "infrastructure-centric". This may also be known as "self-protecting" or "self-defending" data.

4.3.1 Security Enforcement

Users or applications, via their agents, may have control of encryption and decryption. Thus data security may be enforced using end-to-end encryption and need not rely on intermediate parties to ensure that their infrastructure is sufficiently protected. This is because data intermediate to end-systems may remain encrypted, whether "in transit" or "at rest". This approach may add an extra layer of protection to any system and may make user data relatively independent of the security of the intermediate networks, servers, locations and/or providers.

Certificate-based credentials and/or public-key cryptography (PKC) may be used in order to protect user-to-user interactions via intermediate transport or storage means. The use of PKC allows for the use of end-to-end encryption for confidentiality, digital signatures for integrity and authenticity and/or the ability to use keys for sharing without requiring the sharing of passwords.

Note that end-to-end encryption keeps data safe whilst it is stored and/or travelling between intermediate systems. Thus, even if there are security problems with intermediate systems, the most an attacker may be able to obtain is encrypted data.

Though encrypted data is protected, additional server security may also contribute to overall security by limiting server access e.g. access to authorised cipher text, access to particular permits and/or home boxes, access to system services, ensuring mandatory escrow etc. Such an approach may introduce additional barriers to an attacker.

Client-side security may also be enhanced through the user of multiple keys and/or partial keys. In this case, the user may need to obtain multiple keys or multiple parts of keys in order to decrypt data.

4.3.2 Privacy Enforcement

Privacy of data may be enforced through end-to-end. This means that only end-systems with appropriate keys may be able to decrypt any end-user or application information. Intermediate storage or other "cloud" based service may only ever handle encrypted information. This "mandatory" enforcement may be considered different from prior art which may, at best, offer "voluntary" promises to honour their security and/or privacy policies. Mandatory enforcement using encryption may make content safe from server-side breaches or provider leakage including mishaps, internal abuse, external infiltration or service provider exploitation.

Privacy of identity may be enforced through the secret exchange of certificates. Secrecy may be ensured by encrypting certificates and avoiding any central source of certificates, such as a server, database, repository, website or directory. As such, personal certificates may be considered as private certificates and may be only distributed to trusted contacts.

This decentralised management may be important to allow each user or application to hide their existence from everyone except those who they explicitly choose to trust. This "private" approach to certificates may be very different from prior art, which tends to make certificates "public" especially in (logically) centralised directories. Further, the encryption used when exchanging certificates may also serve to prove that the person sending the encrypted certificate is in possession of the matching private key.

Privacy of interactions may be enforced by generic encrypted blobs and generic boxes. This may make any data, whether user, agent or system information, relatively in indistinguishable from each other as well as make any relationships between boxes or users relatively difficult to deduce.

Privacy may be further enhance by using encrypted filenames.

Note that in prior-art, users may have little privacy. In centralised systems, the provider may have knowledge of all participants and may selectively make this information available to other participants and/or third parties. In PKI or WoT systems, identities may be publically known, for example via a public directory. In WoT systems, the endorsement of public keys may reveal entire social networks of users and/or the users who have endorsed a given key.

4.3.3 Management Enforcement

Users, via their agents, may completely control invitation, authorisation, and other management features on the client-side. Management is peer-oriented and may be secured using end-to-end encryption, thereby not needing to rely on the honesty of any intermediate administrators. In particular, embodiments of the present invention may form a peer-based overlay so that management is decentralised and client-side encryption used to protect both system data and user data. This means that server-side operators may be relatively "blind" to what is being transferred or shared between users and that intermediate administrators may be relatively powerless to interfere with policies and other management co-ordination between end-system agents.

Note that decentralised management, may use end-to-end encryption to protect management data using substantially the same mechanisms normally used to protect end-user data. For example, the techniques used for the end-to-end sharing of user data may be applied for the end-to-end transfer of management messages and/or security information such as keys, certificates and/or capabilities.

4.3.4 Partitioning Enforcement

Partitioning may be enforced as keys may be unique, thereby able to completely and independently define groups of data being shared. This may be also known as compartmentalisation. It means that any break in the system may only affect the particular partition or data items encrypted with those keys. Further, this partitioning may allow compartmentalisation of data in many dimensions, for example different groups of users, different classification levels of data items e.g. sensitive, secret etc, different temporal controls such as making data available for a pre-determined time after which keys are rotated or rolled-over etc.

4.3.5 Rights Enforcement

Rights may be enforced client-side by leaving information encrypted on the end-system. This may be known as "on-disk" encryption or "at-rest" encryption. Applications may then decrypt information "on-the-fly" as required. For example, using a special viewer or using a Virtual File System (e.g. VFS 313) may decrypt information in memory as required. This may enable policy based rights, for example, restricting and/or controlling copying, saving, printing, copy to clipboard, access times etc.

4.3.6 Strong Authentication

Remote services (e.g. Remote Services 370) and/or facility services (e.g. Facility Services 391) may use certificate-based credentials for strong authentication. This strong authentication may be stronger than using simple authentication as is the case in most prior art, such as using name and password.

Strong authentication may use mutual authentication such as SSL or TLS (sometimes called client-authenticated SSL or two-way SSL). This may be stronger than "simple" SSL, which is normally used just for link encryption, as it additionally provides certificate-based client authentication.

The advantages of strong authentication may be many. For example, barriers to attackers may require strong credentials before even obtaining a connection, passphrases are not transmitted "over the wire", intermediate passwords are not used or known by intermediate systems etc.

4.4 Control

A further aspect of embodiments of the present invention stem from the realisation that a non-real-time peer-based system can be achieved using end-to-end encryption and intermediate storage. In addition, a key which encrypts a set of content, in effect is its own universe and completely independent, isolated, insulated and/or compartmentalised from any other key and that key's associated encrypted content.

In prior-art peer-to-peer systems, control may be enabled via direct connections to end-systems. Whilst this achieves control independent from interference by any third parties, it relies on the availability and resources of end-systems, which may be inappropriate for general desktop systems, mobile devices or systems behind company firewalls.

In prior-art centralised systems, subservient control may be exercised by end systems, with overriding control nearly always with centralised administrators of the service provider. Further, control is typically implemented using access control rules, for example using Access Control Lists (ACLs), enforced by computer systems such as operating systems and/or applications. During operation, the system(s) uses the access control rules to decide whether access requests from (authenticated) users should be approved (granted) or disapproved (rejected).

4.4.1 User Access Controls

Access to user data may be enforced via an agent controlling the distribution of appropriate keys and need not, as is the case with prior art, be reliant on the enforcement of sharing controls by intermediate parties e.g. the providers of storage and/or collaboration services. This may mean that server-side operators are relatively powerless to access information themselves or change access rules to data as they may have no means to obtain or control the distribution of keys.

This approach may be known as "capability-based" controls as the possession of an appropriate key is all that is required to have the capability to access encrypted information. In contrast, prior systems may require careful definition and control of ACLs, also known as security policies, and strong enforcement by associated operating systems and/or applications. By way of analogy, this is like having a key to a house (the capability) is all that is necessary to gain entry, rather than having a guard at the door (the policy enforcement point) who needs to verify the identity of the person wishing to enter (authentication) matches the name on his list of people (ACL) that are allowed to enter subject to certain conditions (policy).

Note that a compromise, such as an attacker somehow quietly stealing of keys or a previously trusted user going rogue, may only affect the particular box associated with those keys. Though if such a compromise is known, the user can be revoked at which time keys get rotated or rolled-over and SSL access gets removed.

4.4.2 System Access Controls

Access to system data may be enforced via an agent controlling the distribution of administration keys and need not, as is the case in prior art, be reliant on centralised administrators. In prior art, such administrators may be a problem as they may have elevated privileges necessary to operate systems, particularly server-side systems, and therefore the capacity to abuse those privileges.

Further benefits of using a capability-based approach include: not having to rely on centralised administrators; not suffering security problems such as the "confused deputy problem"; maintaining security and privacy "in transit" and "at rest" regardless of the host machine and/or provider and/or location, etc.

4.4.3 Program Access Controls

Authorization may equally apply to machines and/or programs as it does to people, using the same technique of distributing keys to authorised entities. In this case, the access management may be more powerful because the keys may convey the rights to invoke services, participate in distributed processing or otherwise be involved in multi-party and/or multi-location and/or multi-disciplined processing. For example, keys may be used to mediate access to a service bus, peripherals, partner systems or any other federated system.

4.4.4 Privilege Control

As previously described, remote services (e.g. Remote Services 370) and/or facility services (e.g. Facility Services 391) may use attribute certificates (ACs) to control privileges. Essentially this means that privileges used to access and/or manage encrypted information may require the presentation of a cryptographic authorisation for that privilege.

This approach is considered to have a number of benefits over prior art, for example:

- Avoid the need for intermediate services to maintain controls or even being aware what controls exist.
- ACs may allow the box owner to effectively sign off on privileges being exercised by delegated administrators or privileged members, for example "invite user" or "create client".
- Ensure that only the box owner is aware of who has what privileges, as it is the box owner who may directly distribute ACs to other members in a box
- Leverage a revocation service (e.g. part of Certificate Services 392) in a way that may not reveal information about ACs, as the revocation service may be "blind" to the AC, for example, only being advised of the issuer and serial numbers of revoked certificates.
- Reduce the amount of control required by facility services down to tracking box ownership and enforcing ACs. This may facilitate anonymity in the system as well as hide relationships between users from intermediate servers.

4.5 Trust

A further aspect of embodiments of the present invention stem from the realisation that end-users may have the absolute choice as to who they trust and for what, rather than, as is the case in prior art, needing to mostly trust nearly every aspect of a service provided by a Trusted Third Party (TTP).

Trust may be very tightly controlled. This is because trust is established via the mutual exchange of certificates between consenting users on an "as needed" basis. Trust may be easily terminated, simply by discarding the other party's certificate.

Nevertheless, trust may be relatively encompassing as the exchange of certificates may be relatively independent of technology. This is because exchanged certificates need not necessarily be related, associated or compatible. This means that embodiments of the present invention may work with multiple PKI's and or WoT systems simultaneously without the need for CA cross certification, border CAs or trust translation mechanisms by third parties.

4.5.1 User to User Trust

Trust management may involve the mechanisms in which users verify the identity of each other. The inventors note that prior art systems tend to rely on Trusted Third Parties (TTPs) and/or an authentication infrastructure to manage trust. Example of TTPs include: corporations, organisations, Public Key Infrastructures (PKIs) and Web of Trust (WoT) systems.

In particular, prior art systems may result in trust being indirect, in that two parties may assume to trust each other via the TTP.

In embodiments of the present invention, a "protocol" may be used to establish bilateral trusted relationships which may include the encrypted exchange of certificates. This may make use of an out-of-band verification between a first user and a second user. This verification process may enable a vetting process for example to establish proof of identity. It may also facilitate a communication protocol between the first and the second user with the use of a contact code. The code may be used as part of an introduction message or introduction request to encrypt part of the communications and may make use of an underlying remote service. An introduction acceptance may use the certificate of the first user to encrypt the response by the second user.

A benefit of the approach may be to allow the certificate exchange to be relatively automated, without the need to rely and/or trust a third party. An introduction process may result in a highly secure and private "tunnel" between users, for example, to share information, to exchange system information and/or to control interactions between applications.

Note that the bilateral exchange may use encrypted certificates to ensure the privacy of trusted relationships during their establishment and/or the restricting of certificate distribution to exactly those who a given user chooses to explicitly trust.

4.5.2 Separation of Credentials and Trust

The inventors note that prior art tends to bind trust to public keys. For example, in a PKI, trust is established via the reputation, processes and assurances given by the issuing CA to the certificates containing the user's public keys. In the case of WoT systems, trust may be established through countersigning and/or endorsing of public keys and then applying a vote counting or other trust aggregation scheme to assess trust. Essential to both PKI and WoT is that their trust models depend on the authenticity of the binding between a public key and its owner. As a result, both PKI and WoT systems tend to be homogeneous and/or rely on a single format and/or mechanism of certificates or signed public keys. A further complication with WoT systems is that if a user is revoked then this may affect and/or collapse trust calculations for all users for which the revoking user had counter signed.

An aspect of embodiments of the present invention is that the trust layer (e.g. Trust Layer 460) may be relatively independent from the credential layer (e.g. Credential Layer 480). The establishment of trust may be performed via the make contact process and may not involve a TTP nor be dependent on TTP(s) to verify the public key/certificate.

In particular, if credentials are revoked, then the system may be completely recoverable, unlike prior art which may be dependent on the continuity of credentials for a given user. In embodiments of the present invention, if a user is revoked they may be able to access the data again by convincing the same set of people that the user chose to trust in the first place. Note that this process need not rely on reproving identity to a TTP and on re-instatement, a user may use credentials unrelated to their revoked set, for example, in a different format, signed by a different authority etc.

Further, the separation of credentials from trust may assist anonymity and/or privacy, unlike prior art systems which may set rules relating to activities and relationships allowed by users. As previously described, a box owner may issue one or more attribute certificates (ACs), including to himself, which may endorse the use of an SSL, or equivalent, certificate. If the SSL certificate is temporary and/or random, then this may be used to hide from intermediate parties who is performing what activity in any given box. All that intermediate parties may determine, for example using traffic analysis, is that a set of labels, for example random numbers, are uploading and downloading files. Because all information is end-to-end encrypted, intermediate parties may not be able to determine which files are user content and which files are system messages, for example, granting of privileges etc. Note also, that activity may be further obfuscated if a user makes use of multiple SSL certificates. In this case, a given user may have many authorised SSL certificates and can use any combination to disperse their activity.

4.5.3 Explicit Trust Domains

A still further aspect of embodiments of the present invention is that trust domains may be relatively explicit and/or precisely controlled and/or defined. This may be considered to be different from prior art where trust domains may be implicit and/or pre-defined and/or out of the control of end users because prior art relies on trusted third parties. In the case of PKI, a trust domain may be the scope of the CA and may be as broad as the total community of issued certificates of that PKI, thereby encompassing users for which a given user may have no direct relationship with. In WoT systems, the trust boundary may be fuzzy, as trust levels may be ambiguous and/or manual for each endorser (e.g. complete trust, marginal trust, no trust) and trust calculations may rely on chains of trust involving users with which a given user may have no direct relationship.

In embodiments of the present invention, trust domains may be explicit, being equal to the set of people who a user has successfully made contact with or in the context of a box. This is because trust is established via bilateral relationships such as using the make contact (or introduction) process and is not necessarily reliant on any third party. These bilateral relationships may have the effect that an end user can setup their own "trust domain" with the boundary being exactly defined by those that they have exchanged certificates with. This trust boundary is effectively chosen and/or defined and/or controlled by the end user and need not be defined, extended and/or limited by one or more third parties.

4.5.4 Unifying Trust Domains

The trust layer may be used to establish relationships through a direct contact or introduction process and may involve the exchange of certificates. These certificates need not necessarily be related, compatible, associated or in a predefined format or part of a single system. In embodiments of the present invention certificates and/or signed public keys from any one or any combination of different and/or disparate systems may be used.

The resulting benefits of being relatively independent of the actual certificates being transferred may be many. For example:

Being able to operate in environments with heterogeneous certificate types and formats Being able to leverage existing certificate infrastructures Being able to "join" or unify different certificate universes together without the need for third party agreements and/or bridging CAs and/or other translating means and/or intermediary involvement Having the ability to be relatively independent of technology (e.g. certificate formats) and issuance (e.g. certificates from authorities or self-signed).

4.5.5 Trust Control

It is important to note that the underlying trust model of any given system is a foundation for the security of that system. In prior art, the trust model tends to be controlled by TTPs. In embodiments of the present invention, the trust model may be decentralised and may be controlled by the end-user and/or application. A number of examples follow.

Users may control who they trust by following through on the make contact process. Note that a first user need not be highly concerned about the details in a certificate offered by a second user. This is because the certificates mainly serve the purpose of securing an identifiable channel between two users. Thus a user may only need to be confident that the other party has a corresponding private key which they keep private. In prior art systems, users may have no choice but to accept the rules of trust imposed on them by a provider.

Users may control who is a custodian to help them recover their passphrase. In prior art systems, users may have no choice but to rely on the provider for recovering or resetting passwords.

Users may control who is a custodian with the capability to revoke them in the event that credentials are lost or become compromised. In prior art systems, users may have no choice but to rely on the provider to correctly revoke them when required and not be susceptible into being tricked by an attacker into revoking them, for example, via a social engineering attack.

Users may control who to share information with by creating a box and inviting other users to that box. If some information needs to be shared with a different set or subset of users, than the data owner may create another box and invite the different set of users. Thus user trust is in context to the information being shared. Highly sensitive information may involve only inviting highly trusted users. From a responsibility perspective, it is most important that the data owner, who is accountable for the information being shared, is fully in control of when and with whom the information is shared. Note that in prior art, users may have no choice but to trust that central administrators do not access their information and/or service providers make use of it, especially for commercial purposes.

Organisations may control the accessibility of decryption keys by requiring key escrow by their staff and/or customers. Preferably, the encryption facility is strongly managed by the organisation and independent from any intermediate services. Organisations may require this capability to insure themselves against staff losses or to safeguard contents of boxes being stored on behalf of customers, for example, a bank providing a virtual vault facility.

Governments may control the ability to access citizen's encrypted data by mandating key escrow. In this case, with appropriate safeguards, a government may obtain access to a citizen's home box, preferably using a trust anchor recognised by the remote service and/or repository service, and then be able to decrypt keys and permits in a citizen's home box using the citizen's escrowed encryption key. Note that users subject to mandatory escrow may be completely compartmentalised away from other users. This is because all other boxes are insulated from imposing governments as these other boxes have nothing to do with escrowed keys.

4.6 Management

In embodiments of the present invention, management and/or operations may be decentralised. Though central services may be required, the centralised role may be essentially limited to providing a record of where to look for data, signing certificates and providing a place to check if credentials have been revoked. Most other concerns of access management, control, and organisation may be distributed across relatively independent agents.

4.6.1 Decentralised Management

The inventors note that prior art tends to centralise security management for reasons such as control, auditing, compliance etc.

However, embodiments of the present invention may be decentralised by having solutions to a number of problems which prior art may claim to be a driver for a centralised approach. For example:

Decentralised Access Management—as encryption protects data and requires possession of an appropriate key to access.

Decentralised Authorisation Management—as agents may define their own policies and control these policies through client-side management of keys and/or attribute certificates.

Decentralised Content Management—as agents may store meta-data associated with content in order to support features such as searching, versioning, concurrent editing, workflow, icons, file attributes etc.

Decentralised Certificate Management—as agents, may distribute certificates as required and may manage the life cycle of certificates and/or signed public keys. Some assistance from a certificate signing service may be used.

Decentralised Credential Management—as agents may obtain and/or manage their own credentials not necessarily from a single authority. In addition, box owners can manage credentials of client boxes or sub-boxes.

Decentralised Entitlements Management—as the box owner is effectively signing off each change in access privileges though the invite/un-invite process and/or the issuance of attribute certificates.

Decentralised Identity Management—as agents may perform their own vetting and authorisation as well as control relationships, groups and trust domains.

Decentralised Key Management—as agents, may manage and distribute keys as required without assistance or interference from third parties.

Decentralised Provisioning Management—as agents may generate credentials and pass these to other agents, for example client boxes or devices.

Decentralised Privacy Management—as agents may collaborate with other parties without intermediate servers having any access to content, and/or use other privacy preserving mechanisms, such as innocuous email addresses, temporary SSL certificates and/or attribute certificates, to hide interactions and/or associations with other parties.

Decentralised Privilege Management—as agents, particularly for box owners, may grant, on a peer basis, permissions for actions within a box, especially with the use of attribute certificates.

Decentralised Recovery Management—as agents, after being revoked, may separately regain credentials, trust and/or capabilities.

Decentralised Rights Management—as agents may make use of at-rest encryption and/or secure applications such as viewers or players to control what an end-user can or can't do with content.

Decentralised Role Management—as agents may control sets of privileges otherwise known as roles.

Decentralised Security Management—as enforcement is data-centric rather than infrastructure centric and management is via autonomous, peer-oriented agents.

Decentralised Storage Management—as anyone or any combination of storage services may be used and these storage services may be relatively simple.

Decentralised Trust Management—as agents may perform their own vetting and group management and need not be reliant on any one or any combination of third parties for verification of trust.

4.6.2 Managed Credentials

In prior art, it is usual for centralised administrators to manage the credentials of users. For example: Information Technology (IT) administrators managing staff in an organisation, or Service Provider administrators managing customers. This allows administrators to manage provisioning such as to create, modify or delete accounts as well as be able to reset passwords.

However, there may be security and privacy risks with essentially all-powerful administrators having overriding control over many, if not all, accounts and/or credentials. For example, it concentrates power to a relatively small group, relies on the honesty of those administrators and requires careful procedures to avoid mistakes.

In embodiments of the present invention, "managed-users" may be provisioned and/or administered by agents (as previously described). In this case, a box owner, or other member of the parent box which the box owner has given privileges to, may manage the life-cycle of credentials of clients and/or their access to sub-boxes. Credentials may be created, reset and/or updated on behalf of clients and those credentials distributed to them, for example via credential backup (e.g.

Backup Services 393). Client boxes, including shared client boxes, may be created and access to them provided via the distribution of keys to those client's home box, for example by distributing client credentials to other users in the parent box.

An advantage of agents being able to provision managed-users is considered to simplify the use of the system by users who do not want or need to maintain their own credentials. For example:

- Managed-users may simply interact with the system using a name and passphrase, relatively unaware that they are using strong credentials being maintained in credential backup.
- Managed-users may be able to access the system using a private portal (further described below) which allows a website to provide a highly secure and private facility to clients without needing to open up their internal infrastructure to those clients.
- Parent box owners, or other members of the parent box if given permission to do so, may reset a managed-user's passphrase. This may be a highly common activity as it is well known in the industry that a majority of support problems relate to forgotten passwords.

4.6.3 Credential Protection

Users may themselves take precautions to safeguard their own credentials. Examples may include: using strong passphrases for keystores, protecting access to end systems or devices containing keystores, duplicating keystores and storing them elsewhere, using a PRC, using a credential backup service (e.g. part of Backup Services 393), using multiple accounts, making use of external authentication systems which host the credentials etc.

To this end, an agent may automatically and/or periodically prompt an end user to perform such safeguards, such as if the agent detects that the safeguards aren't in place or do not match a policy on safeguards. Examples may include:

- To backup credentials to a predefined location.
- To backup credentials to a credential backup service.
- To check for a locally stored EPB and that the corresponding PRC is stored in a passphrase-recovery box and/or in a passphrase assistance service.
- To create a revocation-custodian box and store a RM in it.
- To ensures members are invited to and/or review the members of a passphrase recovery box and/or a revocation-custodian box.

Users and/or agents may choose to use remote credentials, such as from a credential backup service, rather than relying on locally stored credentials. In this case, the remote credentials may be retrieved and remain in memory for the duration of a single session. Generally, remote credentials may be preferable and/or necessary because the end-system is not able to store credentials locally and/or the end-system is less secure than the credential backup service. Particular examples include:

- If end-point security is insufficient, such as accessing the system from a public place e.g. a computer in an Internet Café
- If the end-point is not under the user's control e.g. using a friend's computer
- If the end-point is locked-down, such as if the user is using a virtualised desktop and/or has restricted ability to read and/or write to their system
- If a centralised authentication system is in use, such as a Virtual Private Network (VPN). In this case, the credentials may be delivered using an authentication extension protocol such as Protected Access Credentials (PAC).

4.6.4 Self-Management

Embodiments of the present invention may enable self-management. That is, management may be performed by agents without necessarily involving central administrators. Importantly, this self-management may be authoritative in that central administrators may have no means to influence, adjust, override or otherwise interfere with the way agents may manage aspects of embodiments of the present invention.

Examples of self-management may include:

- Making and/or removing contacts
- Inviting and/or un-inviting users
- Re-inviting an owner back to a box if the box owner was revoked and has obtained new credentials
- Provisioning and/or deprovisioning of managed-users such as clients
- Assigning and/or removing privileges to/from users e.g. the ability to invite other users to a box, the ability to create client boxes or other sub-boxes
- Backing up credentials Self-management may occur in combination with repository services. For example, box creation, box deletion, box ownership transfer, registration etc. Note that clean-up tasks may be driven by an agent and/or repository services. For example, if a box is deleted, the box and its content may be marked for deletion and then after a given time, the agent and/or repository services may delete and/or archive the deleted content.

Note that an aspect of provisioning is de-provisioning. In prior-art systems, de-provisioning may be problematic, for example, having manual processes to ensure that when an employee's role changes that all appropriate permissions are removed or if an employee leaves, removing all appropriate permissions. In embodiments of the present invention, removing privileges may be performed by rotating or rolling-over keys and/or severing access may be performed via revocation. Advantages of the latter approach may be relatively complete and/or timely removal of privileges as well as this deprovisioning may be performed without requiring the assistance or instigation by central administrators.

4.7 Operations

Yet another important aspect of embodiments of the present invention stem from the realisation that the distributed and/or decentralised nature of embodiments of the present invention may result in many operational advantages and benefits.

4.7.1 Low Administration

In embodiments of the present invention, agents may essentially be self-managing. As a result, the amount of administration required by centralised services, such as remote services and/or repository services, may be relatively small. In some respects, embodiments of the present invention may be pared down to a point where the only manual administration required may be to revoke users, and even this may be managed if individual users provide their own custodian or trusted users to manage their revocation.

Most administrative functions, normally manual in prior art, may be automated in embodiments of the present invention. For example, the issuance of certificates may not involve any paperwork as is the case with certification authorities. Revocation may simply mean clearing a path for re-registration. Mobility may be catered for by using a portable keystore and/or credential backup and/or a home box. Profile information need not be centrally administered and instead, be selectively conveyed to other users as appropriate.

A decentralised approach may remove many complexities. For example, prior art may require significant effort with membership management, including enrolment, privileges, group management etc. In particular, group management may be a relatively complex issue, e.g. because of the need to manage dynamic and/or conflicting requirements of groups which may be unpredictable, transient, complex, overlapping, disjoint, dormant, out-dated etc. In a decentralised approach end-users determine their own group scope, and/or may dynamically build groups in context of the sharing required at the time it is required via the distribution of keys.

4.7.2 Agent Mobility

Users may be mobile and/or need credential portability. In this case, their credentials and/or keystore and/or agent data (e.g. Agent Store 330) may need to be portable and/or be backed-up remotely. Portable credentials may mean storing such data on a portable memory device, USB drive or any other suitable storage device.

An agent (e.g. Agent 340) may have working data (e.g. Working Data 343). Agent data may be stored locally (e.g. Agent Store 330) or remotely in an agent data box or "home" box (e.g. one of Agent Boxes 382) or via a hibernate service. In order to establish a home box, the agent may interact with a resource service (e.g. Repository Services 391) and/or a remote service (e.g. Remote Services 370) or hibernate service which is typically done at registration time. Remotely storing agent data may have many advantages. For example:
- To backup agent data. This allows agent data to be retrieved in the event of a local failure.
- To avoid an agent having to store agent data locally. This may be important if the end system is not fully trusted, such as at an Internet Café.
- To enable a user to make use of an agent on another end system. For example information on a work computer may also need to be available on a home computer.

4.7.3 Scalability

Embodiments of the present invention may be highly scalable. This may be because most processing, computations, management etc is performed by the end-systems making the overall system highly distributed. Adding more end-systems is not necessarily dependent on the processing or administrative scaling of central servers. This may be unlike prior art in which central servers and/or central administration may become a bottleneck.

In particular, requirements on remote services or storage services may be relatively low, thus making the system scalable. For example:
- Processing requirements may be minimal for remote services as most processing is performed client-side e.g. cryptographic functions, compression, etc.
- Trust requirements may be minimal as the main function of remote services may be to store and return data correctly. Note that agents may be able to detect corrupted and/or compromised data via the use of digital signatures.
- Security requirements of intermediate systems may be minimal as remote services may only store encrypted data making it valueless in the case of any security breach such as hacker attacks or malicious or accidental disclosure. For efficiency, remote services may limit access to just the set of encrypted blobs that a user requires, for example, the set of encrypted content associated with each box that the user has access to.
- Privacy requirements may be minimal as remote services may be relatively "blind" as to the way data is being shared, who is doing the sharing and/or any characteristics or behaviour surrounding the sharing. Client-side encryption also ensures that data is protected against unauthorised access or secondary uses by the remote provider.
- Service requirements may be minimal as higher level services may be provided by a repository service e.g. notifications, billing etc.
- Symmetric keys may be used wherever possible, including wrapping keys, so as to limit public key operations which may be relatively computationally expensive.

4.7.4 Flexibility

Embodiments of the present invention may have flexibility. This may result from the layered and/or modular approach to security, privacy, trust, control etc. A number of examples follow.

Different and/or multiple identity systems may be leveraged and/or incorporated. For example, the interface to corporate identity systems, the leveraging of PKIs or WoTs etc. This flexibility may be because the use of credentials, particularly certificate-based credentials, may be relatively independent from other aspects of embodiments of the present invention.

Different and/or multiple cryptographic modules may be used. For example, use of a Hardware Security Module (HSM), use of a government certified cryptographic providers etc.

Different and/or multiple remote and/or storage systems may be leveraged and/or incorporated. For example, "cloud" storage services, "cloud" broker services, "cloud" aggregator services, Web-based Distributed Authoring and Versioning (WebDAV) servers, File Transfer Protocol (FTP) servers etc. This flexibility may be facilitated with the use of repository services which may normalise features and/or overlay features useful for embodiments of the present invention. A benefit may be that agents may not be tied to any particular remote service and/or it may be relatively easy to change intermediate storage and/or transport providers.

Different and/or multiple mechanisms for recovery may be used as required. For example: passphrase recovery box, revocation custodian box, credential backup service, passphrase assistance service, key escrow service etc. The use of any one or any combination of these mechanisms may give the flexibility for people and/or organisations to choose a balance between risk, convenience and safety to suit their requirements.

Different and/or multiple mechanisms for encrypted keys may be used. For example: encrypted content keys may be stored with content or separate from it; encrypted meta-data may be stored in the same shared box or in a separate (meta-data) box; community keys may directly encrypt content keys or may encrypt workspace keys which in turn are used to encrypt content keys etc.

Different and/or multiple access control and/or privilege techniques may be used. For example the use of remote services access controls, repository access controls, attribute certificates, temporary SSL certificates etc. The choice may depend on the types of risks that need to be mitigated.

Flexibility may also be evidenced by the range of privacy enabled applications which may make use of embodiments of the present invention. Examples are given in the next major section.

4.8 Recovery

In prior art encryption systems, there may be a trade-off between safety and security. Safety requires that keys are always recoverable, as if keys are lost, then encrypted data may be unusable. But security requires that keys are properly protected. The trade-off is that, in the case of recovery, keys need to be re-instated to users or applications who have claimed to have lost their keys. In prior art, this has generally resulted in centralised approaches to key administration so that safety can be assured, at the expense of security which is entrusted to central administrators with overriding control.

In embodiments of the present invention, a layered, iterative and/or decentralised approach may be taken to enhance safety and/or security. Safety may be enhanced as each participant in a box has copies of keys to that box. Security may be enhanced by separating the recovery of passphrase, the recovery of credentials, the recovery of certificates and the recovery of each set of box keys. Note that regaining credentials is not sufficient to regain previous access: in addition, it further requires obtaining copies of certificates and/or regaining access to each box. Regaining box keys is then dependent on re-establishing trust with the owner of the box, or a member in the case of a box-owner trying to regain their box.

In summary, recovery may be performed client-side using a relatively broad range of recovery options. This decentralised approach may give many advantages and benefits. Some examples are given below.

4.8.1 Credential Recovery

An aspect of embodiments of the present invention may be that if credentials are lost, they may be suitably re-instated (as previously described) in a way that allows the system to continue to function just as it had prior to revocation. In particular, the re-instatement of credentials may use a process which may be relatively robust, which may not be subject to attacks such as social engineering, as may be the case in prior art (as previously described).

If the keystore passphrase is forgotten then a PRC may be used to unlock a EPB in order to open the keystore. This may be considered a two factor system in that the PRC may be provided externally by a passphrase-recovery-box, a trusted third party, a passphrase assistance service etc, whilst the EPB is stored locally on the end-user's machine along with the keystore and or in any manner accessible by the agent or user. The recovery process may be extended to three-factor, for example by sending an encrypted PRC via one or more emails with the unlocking code sent via SMS or another email.

If credentials are lost or compromised, then credentials may be revoked preferably via a custodian of a revocation message (RM). To recover from revoked credentials, a user may need to re-register, then that user may need to follow procedures as if they only just joined the system. For example: re-establishing a home box, re-establishing trust relationships, re-establishing access to boxes etc.

A benefit of this approach is that it may avoid credentials being critical to system operation. For example, in embodiments of the present invention, encrypted data that is shared may be recovered from other parties.

4.8.2 Data Recovery

If an end-system loses its data, it may be retrieved from other parties in each shared box.

If an end-system loses data protected by at-rest encryption then the local keys may be obtained from the box that the at-rest encryptions files belong (as previously described).

If an end system loses credentials, the credentials may be re-instated and access to previous information may be re-gained via the contact and invitation process, without involving central administrators. If a box owner loses credentials, then they may be re-instated by one or more of the people who the owner trusted with the data in the first place.

If a user with end-system at-rest encryption loses credentials, then after re-invitation back to a box, the user may be able to recover the local encryption keys, such as from a shared box or home box, without involving central administrators.

4.8.3 Shared Box Recovery

Essentially, shared-box recovery leverages the fact that each user in a box has a copy of the box keys. This means that if keys are lost, they may be recovered via a re-invitation process which results in the distribution of the required keys. This decentralised and redundant approach may be considered preferable to prior art centralised key server approaches.

As described above, a user may recover keys for any shared box, by simply getting re-invited back to that box by another box member. The user may be given back keys to that box during this process. Note that this process is the same for a box owner, in which case any of the members may invite the owner back and pass them back keys to that box.

4.8.4 Single-user Box Recovery

In embodiments of the present invention, there may be ways to recover the content of a single user box, such as making use of another box and a special encrypted file.

For example, the components might be any one or any combination of:

A personal box for which the owner is the only user e.g. "box-A"

Another box that the user owns and has members e.g. "box-B"

A special encrypted file containing the key to box-A stored in box-A e.g. "B(A)" may be the box-A key encrypted with the box-B key A policy that allows access to box-A if the re-instated owner is invited back to one or more boxes In this example, a re-instated owner may be part of the following process:

The owner stores B(A) in box-A

If the owner is revoked, the owner re-registers and obtains new credentials

A user from box-B re-invites the owner back to box-B. This may provide the owner with the box-B key and/or trigger the policy to allow access to personal boxes The owner downloads from box-A the encrypted file B(A) and decrypts it using the key from box-B.

The result is that the owner has recovered their box-A keys.

The important point is that a box owner may insure themselves against losing access to their single user box in the event that they lose their credentials.

There may be many variations to the above process, for example:

The special file may be encrypted with a user-chosen passphrase.

The special file may be in two or more parts with each part been encrypted using different box keys from different boxes. For example, if the special file was encrypted in two parts, then this may cryptographically enforce the need to get re-invited to the appropriate two boxes before being able to recover personal box keys.

The special file may be stored in a "personal-box-recovery" box, in which case, one of the owner's custodians would need to invite them back to the box in order to recover their personal box keys.

4.8.5 Key Escrow

Considered as a last resort, encrypted data may also be recovered via a key escrow service. For example, a government may mandate that keys are escrowed, a large corporation may mandate the escrowing of employee keys or an institution like a bank may use a key escrow as a safety measure to insure against customers losing their keys to a bank provided electronic vault.

Preferably, key escrow would only involve the escrowing of encryption private keys. The escrowing of signing private keys is considered not necessary and a security risk as any breach in security may result in obtaining signing keys which may subsequently allow impersonation of the real user.

Preferably, escrowed keys are stored in systems with strong security, monitoring and auditing. Such systems should be independent and preferably logically, physically and administratively separate from remote services and/or repository services.

Preferably, escrowed keys are stored encrypted by a computationally difficult means of obtaining them. This may make it difficult to steal a large number of keys, as decrypting a large number of escrow keys may require relatively large amounts of computing power.

Preferably, access to an escrow server would involve legal and/or procedural constraints, such as needing a court order or signed military order, requiring multiple signatories and/or approvals etc.

Preferably, access by officials to repository services should use temporary SSL keys using a separate trust anchor. This may be so that the repository services can recognise an official accessing the system in order to obtain box keys from a user's home box. In this way, the repository can enforce strong authentication and restrictions such as read-only access, send notifications etc.

Preferably, key escrow should only be used in extreme cases, such as for national security, criminal investigation or disaster recovery.

Note that for users which have had key escrow imposed on them, their other credentials may remain safe, as all other private keys are protected in the user's private keystore. For example, their signing credentials, SSL credentials, email credentials and registrar credentials.

Note also that users which are not subject to escrow, may remain safe because there may be no way for key escrow administrators to get keys to those other boxes that contain only outside users.

5 Privacy Enabled Applications

Embodiments of the present invention may be implemented in a relatively diverse range of application scenarios in order to provide enhanced security, privacy, control, trust and other end-to-end capabilities.

For example, an agent may be used to facilitate peer-based management, data-centric security/privacy, strong cryptography, trusted communities, secure sharing, private collaboration, distributed processing etc. In particular, data-centric encryption may provide self-enforcing, end-to-end, persistent security and privacy which may be in contrast to the server centric approach of prior art which may be hard to enforce, transient and/or point-to-point.

5.1 Certificate Enabled Applications

An advantage of embodiments of the present invention may be that agents may automatically distribute, update and/or remove certificates in end-system certificate stores in order enable certificate-based applications.

In embodiments of the present invention, agents may be used to address the issuance, distribution and disabling problem that has traditionally been difficult in prior art:

The certificate "issuance" problem may be addressed via the bilateral Make Contact process, not necessarily involving a third party. This process may also be used for "machine-to-machine" trust, such as when multiple computing devices need to co-operate securely and/or privately.

The certificate "distribution" problem may be addressed via a "push" mechanism, again not necessarily involving a third party. At the agent level, this may involve distributing certificates to other agents, for example, during the Make Contact process and/or the Certificate Update process. When an agent receives certificates (e.g. Contact Certificates 462), it may update local knowledge (e.g. Home Box 411) and/or update a local certificate store (e.g. Certificate Store 314) for use by the local operating system and/or local applications.

The certificate "disabling" problem may be addressed via messages sent to agents to remove certificates from certificate stores, for example if they are revoked, expire, become obsolete etc.

The management of a local certificate store may be in accordance to a predetermined policy. For example, agents may initiate management actions based on user instigation, time of day, link stability, idle time, frequency, periods, time of day, on demand, certificate type, certificate expiry, revocation event etc.

The management of a local certificate store may be useful to a significant number of applications which may assume certificates in place in order to have their own control channels protected by asymmetric cryptography. This local certificate management may include updating certificates when they need renewing, removing certificates when they expire and/or revoked, further distributing certificates to multiple device etc.

The following sections give further examples of certificate enabled applications.

5.1.1 Secure Email

Email, especially the most common form using Simple Mail Transfer Protocol (SMTP) may have poor security and privacy. For example:

Copies of emails may reside on one or many intermediate email relays.

The format is basically text and so may be viewable by any intermediate party.

There may be few, if any, checks for integrity and so email may be relatively easily tampered with including modifying contents, spoofing the sender etc.

As a result there may be a need for secure email. In some jurisdictions, laws may mandate the use of secure email to protect personal information.

Secure email may generally fall into two categories—a hosted solution which necessarily involves a trusted third party, or an end-to-end solution which may involve asymmetric cryptography. The international standard for end-to-end email encryption is Secure/Multipurpose Internet Mail Extensions (S/MIME) which is built into most modern email software.

S/MIME lets users encrypt outgoing messages and attachments so that only intended recipients who have a certificate, can read them. In addition S/MIME allows users to digitally sign a message, which provides the recipients with a way to verify the identity of the sender and/or prove that the message hasn't been tampered with.

In order for users to use end-to-end encryption, it is usually necessary to have certificates in place and/or for the users to manage these certificates. For example, S/MIME usually requires a PKI to be in place. For self-signed certificates, such as Pretty Good Privacy (PGP), there may be an assumption that a WoT is in place. In prior art, users may have to manually manage the obtaining and maintenance of certificates on their end-system. A further problem in prior-art may be the quality of certificates being used, as a user may not understand the appropriateness of certificates they receive. Overall setting up end-to-end encrypted email may be a manual, arduous, complex, technical and/or relatively difficult process that requires end-users to have expert knowledge and thus is often cited as a major reason why S/MIME has not had widespread adoption.

In embodiments of the present invention, the management of certificates may be managed by agents interfacing with local email applications and/or operating system functions. This may require agents interfacing to certificate databases which may be kept by the operating system and/or email specific software.

In the case of web-based email, an agent in conjunction with a web browser plug-in may provide S/MIME capabilities. Making encrypted email available as a Web browser extension may make end-to-end authenticated and encrypted e-mail accessible to a much wider set of people.

Having an agent manage certificates for email enabled applications may also have other benefits, for example:

The use of standards-based protocols (S/MIME) and government-endorsed cryptography may help meet stringent regulatory requirements, such as eHealth laws, data privacy laws, payment card industry requirements etc.

By including trust anchors from well-known certification authorities (CAs) may allow email access to a wide variety of providers.

The use of client-side cryptography may allow email integration into existing smartcards, USB tokens, and other cryptographic devices.

5.1.2 Secure Communications

The security of many distributed applications currently relies on client-side certificates. For example, many real-time communication applications such as those using the Extensible Messaging and Presence Protocol (XMPP). XMPP is used by a wide range of applications including instant messaging (IM), presence, multi-party chat, forums, voice and video calls, collaboration, lightweight middleware, content syndication, gaming, monitoring, geolocation, remote control systems and generalized routing of XML data.

In embodiments of the present invention an agent may manage XMPP certificates. The interface between an XMPP client and an agent may include registering and obtaining certificates, exchanging XMPP certificates with other clients/applications, rolling over certificates, revoking a certificate etc.

An advantage of embodiments of the present invention is the ability to centrally store histories of those communications in a highly secure and private way. This addresses a severe limitation of most peer-to-peer (P2P) systems, such as IM, chat, forums, voice calls, video calls etc because they rely on end systems to maintain logs and/or histories, which may have limited storage space and/or not suitable for long term reliable storage. This may be especially important for voice and/or video, which may generate significant amounts of data. Further, with the use of a VFS, these histories may be kept encrypted on the end-systems.

5.1.3 Client Side Authentication

Many applications use certificates for client-side authentication. Examples include: Virtual Private Network (VPN) authentication, Wireless authentication, Web authentication, Single sign on (SSO) etc.

In embodiments of the present invention, agents may keep synchronised an operating system certificate store and/or one or more application certificate stores. This may be achieved by an agent interfacing to an associated application programming interface (API) in order to manage certificates e.g. add, modify, delete, update etc. Once certificates are setup and/or maintained, end-system applications may use a "client certificate" for strong security and/or privacy and/or integrity.

5.1.4 Document Control

Document management applications or document management systems (DMS) may use certificates for document control. Examples include document signing, document encryption and document approval workflow. A motivation for using these capabilities may be because end-users may want to treat the DMS as only semi-trusted, for example for the DMS to manage the overall storage and management of documents but the end-user can maintain privacy via encryption and ensure integrity using digital signatures.

In embodiments of the present invention, a local certificate store for client-side certificates may be used by a document management system. Agents may be used to manage the distribution and maintenance of certificates to the end-points of members with access to the document management system.

Agents may also be used facilitate members outside the document management system as members may send documents to non-members that also make use of an agent. This allows embodiments of the present invention to be used as a "gateway" between internal systems and external people.

5.1.5 Document Signing

Conveying a legally binding digital signature on a document may involve a paper version of the document being physically signed by one or more parties either in person and/or remotely and then scanned, printed or faxed and/or sent via courier to one or more other parties. Such a signing process for documents may be costly and/or time consuming.

In embodiments of the present invention, a user's credentials and digital signatures may be used as a basis for legal signatures. As described herein, documents may by digitally signed and this may be used by the end user and/or other system, e.g. a document management system, for the purpose of a legal digital signature. Digital signatures may be made visible to the user, for example with a signing indicator and/or a way to view the certificate used to verify the signature. Documents may then be involved in a workflow which may involve further signatures between and/or with further parties. In this latter case, signatures may envelope each other to form a chain of custody and/or evidence.

Note that legally binding digital signatures may require a high level of assurance especially associated with reliability, evidence and/or intent. As described herein, reliably may be achieved with respect to managing many aspects of the life cycle and/or workflow around the use of digital signatures including provisioning, creation, use, verification etc. As described herein, evidence may be achieved with respect to the many provisions that embodiments of the present invention provide for security, privacy, recovery, auditability, authenticity, trust etc. Further, as described herein, intent may be shown because parties may voluntarily and explicitly make contact and be involved in an invitation process in order to enable collaboration and/or exchanging documents.

5.2 Key Serving Applications

Key management may involve the generation, exchange, storage, use, and replacement of cryptographic keys. In prior art, it is often regarded as the most difficult aspect of cryptosystems because of the manual processes that must be implemented around the lifecycle and/or management of keys.

In embodiments of the present invention, agents may effectively become an authority for keys and thereby allow the decentralisation of key management to those who are responsible for the data, such as box owners or delegated administrators or privileged members within boxes.

5.2.1 Enterprise Key Management

Encryption may be used for protecting data. Generally, encryption may fall into three categories relating to who controls the keys:

Communications encryption—where transient or session keys are used to encrypt a network link e.g. SSL, TLS.

Host encryption—where an operating system or other application ensures that stored information is protected e.g. disk encryptors, volume encryptors, hardware security modules (HSMs) etc. Here, storage keys are maintained by an operating system or device level hardware and/or software.

Data encryption—where data is encrypted so that it is protected from intermediate parties and/or servers. Here keys should only exist at the endpoints.

Where encryption is persistent, such as storage or data encryption, especially in corporate environments, there may be a large number of data objects and/or groups of data objects that need different encryption keys. Each encryption key and/or group of encryption keys may need to be managed throughout its lifecycle e.g. how they are generated, stored, rolled over, assigned, etc. This may result in an expensive and complex key management problem.

As data requirements grow, companies may increasingly deploy cloud solutions, including, virtual data centres, public cloud, private cloud and hybrid cloud solutions. This may result in the need to manage more encryption keys, often with stringent key lifecycle requirements. Further, there is a trend of companies needing encryption to secure data as it moves outside traditional corporate boundaries, such as to mobile devices and to customers and partners. As a result, there may be a compounding problem of number of keys, complexity in managing the lifecycle of keys and diversity in applications requiring keys. In this context, the key management problem may become exceedingly difficult.

Prior art solutions have tended to follow a centralised "key-server" or ticketing server approach. These key-servers become an authoritative server for managing keys. Key-servers typically maintain a database of secret keys and/or master keys and/or algorithmically derive keys. However key-servers may have significant problems, for example:

Having a concentrated source of keys may make key-servers a significant target for attack.

There needs to be very strong controls around the security and administrators of key-servers as a single breach may compromise an entire system.

If keys need to be shared across organisations, then there may be significant jurisdiction and/or governance and/or liability problems with running key-servers.

In embodiments of the present invention, each box or data owner may effectively be a key authority and/or publisher. Since agents may communicate in a virtual peer-to-peer like way, keys may be distributed by box owners without the need for centralised key-servers and/or administrators. This may have the significant advantage of being able to support distributed applications across arbitrary sets of people and/or organisations without the need for trusted third parties.

Embodiments of the present invention may avoid the need for TTPs and/or centralised mechanisms for distributing keys. Instead, a user, via their agent, may effectively manage the secure distribution and authorisation of keys. Keys may be stored in a home box and/or a meta-box and/or a shared-box controlled by the owner. Keys may be distributed via messages such as using a contact box and/or posted to a meta-box and/or a shared-box for download by authorised parties.

Note that keys are protected using the same mechanisms as protecting user data—via possession of keys for access and encryption for enforcement. In embodiments of the present invention there may be several layers of encrypted keys. For example, content keys may be protected by workspace keys, workspace or box keys may be protected by community keys, community keys may be protected by certificates etc.

5.2.2 Enterprise Data Protection

A significant driver for enterprise encryption may be to protect confidential information, especially for competitive business reasons and/or compliance reasons. Organisations, particularly large ones, may have many and diverse projects that require the encryption of related content according to internal security and/or privacy policies. When a project is relatively small, key management tasks may be addressable with existing staff. However, key management becomes increasingly complex as the size of projects grow, as the number of projects goes, as the amount of staff changes in projects occur, as the richness of access levels increases etc. This results in increasing administrative burden, especially as projects go live and the responsibility may be passed to "operations". Prior art solutions often attempt to implement processes, such as entitlements or role management, to try to keep track of who needs access to what and why which may involve arduous sign-off procedures to try to ensure accuracy and relevance of people's access rights.

In embodiments of the present invention, data owners may retain responsibility for their data and the people that have access to it. This may avoid the need to pass administrative responsibility, such as to an IT department, who may not understand or be able to manage ongoing and/or changing requirements related to who needs access to what information and why.

Further, ensuring data owners retain responsibility for their data may help accountability and auditing and may reduce or eliminate the need for explicit entitlements or role management and/or sign-off procedures. This is because membership to a box may be tracked and therefore may be self-auditing.

5.2.3 Database Protection

Business databases, especially those storing financial information, may require field level encryption to avoid accidental, malicious or unauthorised access to sensitive data. For example, credit card holder information is vulnerable at each point in a financial processing stream. Though encryption may protect such information, the key management associated may be difficult and/or complex.

In embodiments of the present invention, applications may be authorised to access database fields through the distribution of keys. Groups of applications may be managed by membership and groups of related data may be managed by boxes. The box owner may authorise or de-authorise applications as required through the invite/un-invite process.

In implementation, applications may interface with an agent to handle the keys and/or encryption/decryption of data. Owners of the process may manage boxes. Database fields may be designed to contain a printable form of encrypted data supplemented by meta-data if required e.g. checksums, identifiers etc.

Note that both users and applications may be members of boxes. The users are typically one or more that own the process. The applications, particularly on different machines and/or environments, may perform the processing, especially distributed processing. Preferably multiple people are members of any given box to simplify recovery and/or administration.

5.2.4 Cloud Data Storage Protection

A sweeping trend in business may be the move away from internal data centres to virtual data centres and/or the use of cloud services such as IaaS, PaaS and SaaS. As enterprises take advantage of cloud computing environments, via both third-party services and custom-developed applications, the risk of exposing sensitive data may increase. Because cloud servers may not have a physical "location" security may be unpredictable and/or compliance with data residency regulations may become difficult.

In embodiments of the present invention, data outside the enterprise may be protected by encryption. Each data owner can create virtual storage, for example in a public or private cloud, but control keys such that the information is protected from the cloud storage provider.

In implementation, applications may interface with an agent using an API that may be similar to the underlying cloud storage service. The API provided by embodiments of the present invention may also supplement third party storage APIs.

Note that, for added security, some repository services and/or storage services may be kept on premise. For example, user boxes (e.g. User Boxes 381) may be stored in remote services, while agent boxes (e.g. Agent Boxes 382) and/or message boxes (e.g. Message Boxes 383) may be kept on premise. The on-premise protection may add an extra layer of protection by making it relatively impossible to obtain event the encrypted information.

5.2.5 Machine to Machine

Though much of the above description has used "users" as examples, embodiments of the present invention are equally applicable to applications and/or computers or machines with computing means.

In general, embodiments of the present invention may facilitate private, self-managing, cross-organisational, distributed applications. For example, in any one or any combination of the following areas:

Message Queues may be implemented in corporate or private cloud environments protected by encrypted transactions. This protects individual data elements, rather than relying on the message queue to secure the transport.

Service Buses may make use of encryption, especially by organisations that do not want passwords and account information to be passed over the bus where subscriber applications may be listening in. Similarly, applications that involve credit card information may need to use encryption across an Enterprise Service Bus (ESB) in order to comply with regulations or mandates, such as Payment Card Industry (PCI) requirements.

Federation may be facilitated as embodiments of the present invention may make use of organisational credentials, but limit sharing strictly to the applications required.

Remote Procedure Calls may make use of end-to-end encrypted messages.

Inter-organisation projects may make use of private cryptographic tunnels, for example for signalling, key management, configuration, software distribution, asset management etc.

Secure transaction management may use keys and encryption for machine authorisation such as for workload automation and/or other distributed processing systems. This is because such distributed systems require trust between the machines performing the work.

5.3 Collaboration Applications

Embodiments of the present invention may be integrated in to a broad range of information sharing applications that may require high levels of security, privacy, control etc. Such applications include secure file sharing, social networking, private messaging, private forums, content publishing, VoIP, virtual worlds, telephony, video conferencing, virtual worlds and any other collaboration application. Further examples are outlined in this section.

5.3.1 Private Portal

Agents may be embedded into a private portal. A private portal is typically a web page hosted on one-site but contains a view of another system, for example, makes it appear that an area of a page is running on or from a given website. The main advantage of a private portal may be that it may be very quick to setup, such as to add the capability to a web page using an "iframe", and may give significant security and privacy of user data without the necessity to have the website enforce such security and privacy. In particular, it may provide a facility to a website, for example a personalised and private area for clients and a business to exchange files, without needing to open up internal computing resources of the business to the internet.

A private portal may not need to be attached to a website. Instead a link may be used to invoke the portal in a blank web page. Such a link may safely be sent in an email, because it only identifies the portal, not the data in the portal.

A private portal may make use of managed-user credentials. This may be beneficial so that an end-user may get the appearance of just using a name and passphrase to log into a private portal, when in reality, the name and passphrase may have been used to provision a user in a credential backup service. Using the private portal, a user inputting the correct name and passphrase may result in the download of credentials to the portal agent and the user gets "logged in" to receive access to shared files, for example in a sub-box or client box.

In implementation, a private portal may make use of an agent capable of performing independent processing in a web browser, for example an applet or other plugin. The portal may be embedded into a webpage within a website using a Hypertext Transfer Markup Language (HTML) iframe. The portal agent, e.g. the applet in the iframe, may make use of mutual SSL to access storage and/or facility services which may be independent of the website hosting the web page. Options to the portal may be encoded into a parameter in the Uniform Resource Locator (URL), for example to hide modes of the private portal such as read-only, disable passphrase change, display of logos etc.

A private portal may have many advantages. For example:

The portal may give highly secure and private access to clients without the cost of requiring the website hosting to deliver that high level of security and privacy or opening access to a company's internal servers. For example, the business website may not support SSL, but SSL may be run between the agent and the remote and/or facility services.

The portal may reinforce the business brand. For example, a professional company, such as one that provides legal, financial, engineering, or any other type of advice, may use the portal to demonstrate to their customers how seriously they are about keeping confidential or other sensitive information secure and private.

The portal may allow clients to use a secure collaboration service without first registering and/or being aware that they are using strong credentials. By treating portal users as managed-users, a portal user may simply login using a provided name and passphrase.

A URL for the portal may be safely given out, e.g. via email, without giving away any information about what is being communicated. This may be quite different from prior art which may allow for the publication of URL's of content, which may be a security problem as the "secret" URL to a file can easily become known and may be a privacy problem because it gives away that content exists.

A private portal may be attached to a single parent box, allowing login by any client in a sub-box. Additionally, a private portal may be linked to more than one parent box, thus allowing login by any client in any of the sub-boxes of the linked parent boxes.

5.3.2 Secure File Sharing

Secure file sharing may cover a class of applications for storing and exchanging files or other content, especially files which may be sensitive, private and/or confidential. Examples users include accountants that need to share financial information with clients, lawyers that need to share drafts of legal documents, directors of companies that need to share board papers, agencies that need to share graphic designs, consultancies that need to share engineering plans, mediators that need to share dispute resolution documents, consultants giving advice to clients, entrepreneurs sharing information with investors, company executives and/or employees who need to share highly confidential and/or proprietary information with other company personnel or external consultants and/or board members, deal rooms, virtual data rooms etc.

Secure file sharing may be implemented using an agent application. In this case, an agent application may allow an owner to setup private workspaces and to selectively invite/un-invite people to shared boxes or workspaces as required. Members may be able to upload/download files as appropriate for the permissions given to them. The owner may delegate administrative rights or privileges, such as to invite other members and/or add sub-boxes and/or other access control permissions on files/folders such as delete, modify, read etc. The application may also provide notifications about activity and/or audit reports about that activity.

Secure file sharing may be made available using a private portal, as described above.

5.3.3 Secure Publishing

Many types of information sharing may involve the publication of information to very controlled sets of people. In this case, embodiments of the present invention may be used to protect valuable information with encryption and ensure that only authorised parties have access it to it via the distribution of keys.

Publication of content may involve large files such as multi-media files. As an example, media companies providing custom video or films, training companies needing to distribute audio and/or visual training materials, private multi-media networks etc. Using embodiments of the present invention the content may be locked and access to it is via issuance and distribution of a key which allows unlocking of the content.

Publication of content may involve physical distribution, such as via compact disc (CD) or digital video disk (DVD). In this case, the content may be protected by encryption and only accessible using a key provided by the content provider. This approach may be valuable when it is too expensive to deliver the content electronically, but still can deliver the keys electronically.

Publication of content may involve electronic distribution, for example, enabling copies of large files in multiple geographic locations. In this case, a repository service may facilitate this replication and advise agents as to where the nearest copy is located. Note that this replication may be independent from the enablement of viewing the content through the use of keys.

Publication of content may involve interfacing with third party document management systems where selected information needs to be provided to authorised people.

Publication of content of content may be synchronised by delaying the release of keys. In this case, content may be distributed, and later, an owner may distribute keys to a set of users who share the content at the same time. This may be for applications that need to synchronise the release of material at the same time, for example exams, tenders, entertainment, products, services etc.

Publication of content may make use of a private portal, as described above, so that information may be made available to external people, not necessarily requiring local credentials.

Publication of content may make use of repository services to enforce policy(s) or other controls. For example, a library or other information service may enable users to buy a certain number of documents and then download them as required. The repository service may restrict any given user's download to a set number and/or set value and/or restrict certain documents to be only downloaded once. When such limits and/or conditions are reached, the repository service may make further files inaccessible. An audit may be used to reconcile usage with user's account and/or privileges and/or allocations.

5.3.4 Archive and Backup

Archive management may benefit from encryption and sharing. Encryption may ensure that archived content may be safely stored online in inexpensive "cloud" storages. Sharing may be necessary because responsible people change over time, and so new people may be invited to the relevant boxes and outgoing people may be removed.

In a broader example, an organisation may provide an overall service, but may want to back-end it's storage and/or archive needs to cloud storage, for example, to make use of very low cost cloud economics. Encryption may safeguard this information from the storage provider, but sharing may still be required to provide independent access to stored data by other organisations, for example, trusted third parties for the purpose of independent audit, dispute resolution, escrow management or business continuity.

Archive management may also benefit from redundant backup, such as storing copies in alternative boxes which may be with different providers. Archive management may also benefit from certificate management and digital signatures, for example, to safeguard data provenance and/or to ensure authenticity and integrity that information has not been corrupted or tampered with.

Secure remote backup may also be used for information that may be important, sensitive, private or confidential. This may include system data such as licence keys, legal agreements, configuration settings and any other data that may be required, especially in a disaster recovery situation. Again, multiple users may need access to the backup to ensure key availability and continuity as responsible parties change.

5.3.5 Private Messaging

Private messaging may cover communications where it is important that no third party may overhear or eavesdrop a conversation nor be able to identify the identities of the communicating party. In embodiments of the present invention, such private messaging may be enabled using encryption and controlled using keys, in particular, long-term keys.

Private messaging may take many forms, such as private email, instant messaging, private forums, encrypted fax and other end-to-end applications that may require private but reliable delivery without the need for direct connections.

Private messaging may make use of remote or storage services such as using message boxes (as described above). This may be advantageous as the storage costs may be relatively low as the storage service may simply provide storage services and not necessarily related services such as user interfaces, notifications, searching etc. Higher level protection, such as security, privacy, control, trust etc may be provided via end-to-end encryption. Higher level features, such as notifications, routing etc may be provided by repository services.

Private messaging may make use of an external messaging or queuing service, especially "cloud" based messaging or queuing services. In this case, embodiments of the present invention may protect the security, privacy and integrity of end-user messages using encryption and leverage the messaging or queuing service as the mechanism for delivery.

Private messaging may enhance existing messaging systems including peer-to-peer. This is because prior-art messaging may not be private in several aspects of their operation, for example in the provision of a "directory" of registered users and/or storing of messages on behalf of users which relies on the security and privacy of the provided services. Using embodiments of the present invention, end-to-end encryption may add an extra layer of privacy and security to ensure that information is safe where ever it is stored or transiting intermediate infrastructure.

Further, agents may provide value added features and functions to private messaging such as delivery notifications, receipted delivery, signed acknowledgements, distribution lists, publish/subscribe etc.

5.3.6 Private Data Streams

Though many of the examples given relate to storage, embodiments of the present invention may equally be applied to encrypted data streams and/or peer-to-peer communications. Examples of data streams may include:

- Multi-media streams such as video, audio, pictures and any other type of on-demand data.
- Communications streams such as VOIP (Voice Over IP), HTTP (HyperText Transfer Protocol), instant messaging, telephony, video conferencing, shared collaboration or any other type of protocol.
- Application streams such as collaboration applications, screen sharing, monitoring, backups, database journals, logs, audit trails or any other type of runtime information.

If content is a stream then encryption may involve additional Message Authentication Codes (MACs) added into the stream at pre-determined intervals and/or a streaming cipher may be used.

An advantage of applying embodiments of the present invention to streams may be that any centralised storage and/or archive of streams is fully protected and only available for playback by the people with appropriate keys. In particular, embodiments of the present invention may provide long-term keys, which may be useful for extended and/or interrupted sessions, as opposed to prior art which tends to use one-time session keys and therefore is limited to those sessions.

Note that many prior art "peer-to-peer" systems, may promote their privacy and/or security via direct connections, e.g. SSL connections, but then may store sessions centrally which are accessible by central administrators e.g. instant messaging (IM), Voice over Internet Protocol (VoIP), telephony, video conferencing etc.

5.3.7 Client Services

Embodiments of the present invention may be used to provide client services.

Client services may include any services provided by a primary entity to a secondary entity. A primary entity may be an organisation, business, corporation, company, government body, club or any other entity that provides a service. Secondary entities may be clients, customers, consumers, partners, suppliers, affiliates, members, patients, constituents or any other entity associated with the primary entity.

Client services may involve an asymmetric relationship. For example, a primary entity such as a business may provide one or more services to one or more secondary entities such as clients. In this case there may be a "master-slave" relationship between business and clients. Staff in the business may be users of a parent box and may be able to see all activity in the sub-boxes of clients. Clients may be very simple users, in that provisioning of credentials may be managed by the business. The business may also control any sharing between clients, such as having project or client shared sub-boxes for clients sharing particular information, or broadcast sub-boxes such as for publishing a newsletter. Note that control remains with the business with no third party having overriding control and repository services may simply provide facilitating services relating to the management of users, sub-boxes, shared boxes, etc.

Client services may include any one or combination of services described herein. For example, a private portal may provide a secure "repository" for customer information, secure file sharing, secure publishing, messaging, chat, IM, forums, VoIP, video conferences etc. An electronic vault or electronic safety deposit box may be provided where client entrusts information to a primary entity with associated assurances of safety should the client lose their credentials or method of access.

5.3.8 Structured Data Interception

Embodiments of the present invention may be used to protect data inside applications without the applications necessarily being aware that its data is being intercepted and replaced with encrypted and/or tokenised versions of the data.

For example a Customer Relationship Management (CRM) system may involve a client CRM portion run by a user and a server CRM portion run in some remote service. Problems in the prior art is that users and/or businesses making use of the CRM may have highly sensitive information in the CRM which could be accessed by the CRM provider.

In embodiments of the present invention, an agent may, according to predetermined policy, intercept data in the client CRM application, such as particular fields like credit card numbers or client names etc and replace that data, such as those fields, with encrypted or tokenised versions. Encrypted versions may use a box key relating sets of data together, for example fields of the same type. Tokenisation may be necessary if fields are small and/or do not lend themselves to safe encryption. Tokens may be random values, and the corresponding real values may be encrypted and stored in an associated box. Tokens may also have algorithmic relations to facilitate searching in the remote service application.

Advantages of such an approach may mean that remote services, such as public cloud services, which normally an organisation may refrain from using because of concerns about security and privacy, may safely be used as the sensitive data is protected.

5.4 at-Rest Encryption Application

An aspect of embodiments of the present invention may be that agents in a distributed network may access encrypted data by replicating the encrypted data to end-system data stores. In this case, information remains encrypted at-rest, such as on-disk, protected by appropriate keys and only decrypted as required.

This approach may be different from prior art approaches in a number of ways, as follows:

- Agents may use file-based encryption rather than use volume or disk encryption as is common in the prior art.
- Encrypted information may be sharable unlike prior-art which may be end-system specific.

Encrypted information may be recovered from other shared parties, unlike prior art which may not have provider independent recovery means.

Content and/or keys may be protected using strong credentials, unlike prior art which tends to use passwords.

Integrity may be ensured using digital signatures, unlike prior art which may have little or no way of knowing if a file was corrupt and/or been tampered with.

Agents may replicate encrypted content according to a policy. Preferably any policies in effect are approved by the user. Such a synchronisation policy may include conditions such as controlling upload/download based on time of day, file size, link stability, idle time, frequency, time of day, on demand, workgroup category etc.

5.4.1 Local File Encryption

Files that remain locally encrypted may add an additional layer of security and/or privacy to the end-system. Using agents to control at-rest encryption may be preferred as credentials may be lost and re-instated without losing access to data, unlike prior-art loss of credentials, such as a password, which may result in encrypted data becoming inaccessible.

In implementation, there may be a special file extension to indicate that the file is encrypted which may be associated with an agent application and/or application plugin. When the encrypted file is accessed the agent application or plugin may decrypt the file and pass to the relevant application. When content is saved, the agent application and/or plugin may encrypt the file, and may use the special file extension. For example a file "x.doc" may on-disk exist as "x.doc.enc" but when passed to/from the application, it appears as "x.doc".

Local file encryption may cover ad hoc usage, such as "do-it-yourself" (DIY) encryption and decryption in which case the user may manually invoke the encryption/decryption.

5.4.2 Content Distribution

Encrypted content may be distributed in a "pull" or "push" manner.

In the "pull" model, encrypted content may be accessible in a centralised way. For example, encrypted content may reside on a network disk or any other remote disk or "cloud" storage service. In this case, the operating system or application controlling the network disk need not necessarily maintain access control lists on files. Instead, embodiments of the present invention may allow end users to create files and/or directories and/or data sets etc protected by encryption and controlled via keys. In addition to security and privacy advantages, the remote storage may be a cluster or any other combination of services.

In the "push" model, encrypted content may be accessible in a replicated way. For example, a content "producer" may provide encrypted content to a content "distributor" who may replicate the encrypted content to any one or any combination of geographic locations for download by content "consumers". The content may also be pushed to the end-system of those consumers.

Using embodiments of the present invention, the content producer may separately control the distribution of keys for content, for example to appropriately licensed content consumers. In this way, the content producer may ensure their content is only usable by consumers they have given the appropriate keys to and protects them from security risks and/or operational risks by content distributers.

5.4.3 Rights Management

At-rest file encryption in combination with an enforcing application may be used to enforce rights attached to documents. The enforcing application may be a special client-side reader, viewer or application which enables specific rights either directly granted to the user or obtained in real-time from a rights management server. Rights management may include restricting and/or controlling saving, printing, copy to clipboard, access times etc.

An agent may leverage other applications that enforce digital rights management (DRM) for example, as a plug-in. In this case, the agent may provide the access protection via encryption and the DRM application may control what actions users may perform on the document or protected content.

Time based controls can be implemented with embodiments of the present invention. This may involve control when keys are distributed, or when encrypted content is accessible, when content is visible, when invites are sent out and/or confirmed etc.

Examples where time-based controls may be useful include:

Synchronising access to a box for all or selected members at the same time. For example if a tender, exam etc was being made available at a given time.

Restricting the availability of content. This may be achieved by restricting the availability of keys, such as content keys. For example, content may only be decrypted based on certain policies of the application e.g. time of day, location, paid subscription etc.

Sequencing of content. For example, content may be available sequentially depending on predefined criteria, such as parts of a training video is only made available after end of section tests have been passed.

5.4.4 Storage Overlay

Local file encryption may be extended to implement a storage overlay and/or overlaying an encryption capability over ordinary file sharing applications. In this case, the underlying ordinary file sharing application may manage the synchronisation of files, for example with a central service, and an agent may overlay an encryption means, so that only encrypted content is being shared in the ordinary file sharing service. The agent may manage keys, so that only authorised parties have access to the encrypted content. The overlay may make use of public areas of the underlying ordinary file sharing service.

This capability may be especially useful because there may be a large number of online file sharing companies, many of them free, but few, if any, are able to offer strong security or privacy. Using an overlay, then the benefits of embodiments of the present invention may be realised while using the third party file sharing service, for example:

Strong security through the use of certificate based credentials.

Strong privacy through the use of client-side or end-to-end encryption.

Authenticity through the use of digital signatures.

Integrity through the use of digital signatures.

Credential assurance through the use of revocation checking.

5.4.5 File-Encrypted VFS

Local file encryption and/or a storage overlay may be extended using a Virtual File System (e.g. VFS 313). In this case, "on-the-fly" encryption may be used to read, write and manage files as previously described.

The VFS may have usability advantages. For example, there may be no need for plugins, connectors and other custom applications as the VFS makes encrypted content look like part of an ordinary file system and/or folder. In particular, the VFS may enable common operating systems functions like drag-and-drop, cut and paste etc. Also, functions within applications may work transparently such as Open, Import, Save As etc. In all of these cases, the manipulating application may be unaware that information being read is automatically being decrypted and information being written is being automatically encrypted.

Versioning may be supported by the VFS, for example, by creating new versions whenever files are updated and storing those previous versions in case they need to be recovered.

Note also that the VFS may work while the user is offline. This may mean that an agent manages synchronisation with remote services in the background and/or according to policies e.g. when to automate or make manual uploads/downloads based on time of day, size, idle time, document type, values in attributes or any other policy rule.

5.4.6 Mobile Data Protection

A driver for enterprise encryption may be to protect confidential information, especially for competitive business reasons and/or compliance reasons. In particular, mobile devices, such as laptops, tablets or smart phones may be relatively easily lost, stolen or broken into and so keeping data encrypted on those devices may prove vital to prevent this avenue of data breaches.

Embodiments of the present invention may be used to maintain information encrypted on remote devices, using local file encryption and/or a VFS as described above. The mobile device may have its own credentials and/or have credentials managed by an agent on another computer. The mobile device may also have an agent that independently manages credentials for that device.

An advantage of embodiments of the present invention is it may supplement security and privacy controls on the end device. Mobile devices typically have processing restraints and operating system security and privacy functions may be limited. Further, embodiments of the present invention may provide relatively high levels of security and privacy without necessarily relying on the capabilities of the end device.

5.4.7 Remote Destroy/Purge

A further requirement, particularly by enterprises, is that if a mobile device is lost or stolen, that information on it may be destroyed and/or purged. In embodiments of the present invention, such functionality may be achieved by rotating or rolling-over keys, thereby making encrypted information on the compromised device inaccessible for attackers.

5.4.8 Ephemeral Communications

Embodiments of the present invention may be used in short lifespan communications. For example, being able to destroy data immediately after it is read such as text messages, video messages, email messages etc. Whilst some prior art may do this at the session level, embodiments of the present invention may store encrypted data locally and facilitate its erasure by destroying keys.

In concept, this capability for one-time or other short lived data communications is sometimes known as "burn after read" or "self-destroying data" or "digital shredding" applications. Such ability might be advantageous in hostile environments where there is a need to avoid surveillance.

5.4.9 Redaction and Classifications

Sometimes, different parts of a file or document may have different levels of sensitivity and/or classifications. In this case, various versions of a document may be produced, corresponding to the possible different levels of authorisation of the target users and each version encrypted with an appropriate key and/or stored separately in different boxes according to those authorisation combinations. Alternatively, the document may be encrypted with multiple keys, so that a user may only be able to unlock those parts of the file or document for which they have keys for.

6 General

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where an application or method is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, EcmaScript or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g. a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

Throughout this specification the use of words in singular form may be taken as reference to words in plural and vice versa.

The invention claimed is:

1. A method of enabling the provisioning of keys between a first user and a second user, the first user having a first computer, a first key and a first bootstrap key, and the second user having a second computer and a second key, the method comprising the steps of:
    the first computer encrypting the first key with the first bootstrap key;
    the first user providing the encrypted first key to the second user via a first data store;
    the first user providing to the second user the first bootstrap key and in a manner independent of the first data store;
    the second computer decrypting the encrypted first key with the first bootstrap key for use by the second user;
    the second computer encrypting the second key with the first key;
    the second user providing the encrypted second key to the first user via a second data store; and
    the first computer decrypting the encrypted second key with the first key for use by the first user.

2. The method as claimed in claim 1, wherein the first data store and the second data store are the same data store.

3. The method as claimed in claim 1, further comprising the step of:
    a third user having a third computer and a third key;
    the first user having a second bootstrap key;
    the first computer encrypting the first key with the second bootstrap key;
    the first user providing the encrypted first key to the third user via a third data store;
    the first user providing to the third user the second bootstrap key and in a manner independent of the third data store;
    the third computer decrypting the encrypted first key with the second bootstrap key for use by the third user;
    the third computer encrypting the third key with the first key;
    the third user providing the encrypted third key to the first user via a fourth data store; and
    the first computer decrypting the encrypted third key with the first key for use by the first user.

4. The method as claimed in claim 3, wherein any one or any combination of the first data store, the second data store, the third data store and the fourth data store are the same data store.

5. The method as claimed in claim 1, wherein any encrypted key is provided to any data store at different times.

6. The method as claimed in claim 1, further comprising any one or any combination of encrypted keys is replicated from any data store to any further data store(s).

7. The method as claimed in claim 1, further comprising:
    reusing any key to enable the encryption of further keys.

8. The method as claimed in claim 1, wherein at least one user is any one of or any combination of an agent(s), entity(s), person(s), organisation(s), application(s), service(s), any other interface(s).

9. The method as claimed in claim 1, further comprising the first and/or second key is used to encrypt any one or any combination of:
Certificate(s)
Key(s)
Task(s)
Message(s)
Authorisation(s)
Token(s)
Content
Information
Data
Meta-data
Stream(s)
Packet(s)
Box Data
Application Data
Application Field(s)
Database Field(s)
Anything communicable in digital form.

10. The method as claimed in claim 1, wherein at least one user can create and/or manage the lifecycle of and/or rollover and/or distribution of keys.

11. The method as claimed in claim 1, further comprising the first and/or second key being used by at least one user to decentralise any one or any combination of:
access management
authorisation management
certificate management
content management
credential management
entitlements management
identity management
key management
provisioning management
privacy management
privilege management
recovery management
rights management
role management
security management
storage management
trust management.

12. The method as claimed in claim 1, further comprising: providing a credential layer adapted to establish the existence of credentials for each user.

13. The method as claimed in claim 1, further comprising: providing a trust layer adapted to enable communication via the data store of encrypted data between the users and to enable the exchange of encrypted keys.

14. The method as claimed in claim 1, further comprising: providing a control layer adapted to manage symmetric keys and other system information protected by encryption.

15. The method as claimed in claim 1 further comprising: providing a sharing layer adapted to encrypt content or other end user information.

16. The method as claimed in claim 1, wherein at least one of the first key and the second key is a part of a certificate of a certificate based credential.

17. The method as claimed in claim 16, wherein the certificate-based credential may be obtained from any provider or be of any format.

18. The method as claimed in claim 16, further comprising: providing a digital signature in association with any one or any combination of encrypted keys.

19. A computer readable storage medium for storing in non-transient form an application for executing a method of enabling the provisioning of keys between a first user and a second user, the first user having a first computer, a first key and a first bootstrap key, and the second user having a second computer and a second key, the method comprising the steps of:
the first computer encrypting the first key with the first bootstrap key;
the first user providing the encrypted first key to the second user via a first data store;
the first user providing to the second user the first bootstrap key and in a manner independent of the first data store;
the second computer decrypting the encrypted first key with the first bootstrap key for use by the second user;
the second computer encrypting the second key with the first key;
the second user providing the encrypted second key to the first user via a second data store; and
the first computer decrypting the encrypted second key with the first key for use by the first user.

20. A system operative on the basis of a provisioning of keys between a first user and a second user, comprising:
a first computer operable by the first user, the first computer having access to a first key and a first bootstrap key,
a second computer operable by the second user, the second computer having access to a second key, and
at least one data store,
wherein the first computer is operative to encrypt the first key with the first bootstrap key;
wherein the encrypted first key is provided to the second user via a first data store;
wherein the first user provides to the second user the first bootstrap key and in a manner independent of the first data store;
wherein the second computer is operative to decrypt the encrypted first key with the first bootstrap key for use by the second user;
wherein the second computer is operative to encrypt the second key with the first key;
wherein the second user provides the encrypted second key to the first user via a second data store; and
wherein the first computer is operative to decrypt the encrypted second key with the first key for use by the first user.

21. The system as claimed in claim 20, wherein the first data store and the second data store are the same data store structure.

22. The system as claimed in claim 20, further comprising:
a third computer operable by a third user, the third computer having access to a third key; and
a third data store and a fourth data store,
wherein the first user has access to a second bootstrap key;
wherein the first computer is operative to encrypt the first key with the second bootstrap key;
wherein the first user provides the encrypted first key to the third user via the third data store;
wherein the first user provides to the third user the second bootstrap key and in a manner independent of the third data store;
wherein the third computer is operative to decrypt the encrypted first key with the second bootstrap key for use by the third user;

wherein the third computer is operative to encrypt the third key with the first key;

wherein the third user provides the encrypted third key to the first user via the fourth data store; and wherein the first computer is operative to decrypt the encrypted third key with the first key for use by the first user.

23. The system as claimed in claim 22, further comprising a computer reusing any key to enable the encryption of further keys.

24. The system as claimed in claim 20, wherein at least one user is any one of or any combination of an agent(s), entity(s), person(s), organisation(s), application(s), service(s), any other interface(s).

25. The system as claimed in claim 20, wherein the first and / or second key is used to encrypt any one or any combination of:

Certificate(s)
Key(s)
Task(s)
Message(s)
Authorisation(s)
Token(s)
Content
Information
Data
Meta-data
Stream(s)
Packet(s)
Box Data
Application Data
Application Field(s)
Database Field(s)
Anything communicable in digital form.

* * * * *